(12) United States Patent
Schlangen et al.

(10) Patent No.: US 11,607,920 B2
(45) Date of Patent: *Mar. 21, 2023

(54) VEHICLE

(71) Applicant: Polaris Industries Inc., Medina, MN (US)

(72) Inventors: Adam J. Schlangen, Rush City, MN (US); Jason K. Raska, New Richmond, WI (US)

(73) Assignee: Polaris Industries Inc., Medina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/406,508

(22) Filed: Aug. 19, 2021

(65) Prior Publication Data

US 2022/0032701 A1 Feb. 3, 2022

Related U.S. Application Data

(60) Continuation of application No. 16/528,051, filed on Jul. 31, 2019, now Pat. No. 11,104,194, which is a
(Continued)

(51) Int. Cl.
*B60G 3/20* (2006.01)
*B60K 11/04* (2006.01)
(Continued)

(52) U.S. Cl.
CPC .............. *B60G 3/20* (2013.01); *B60G 9/022* (2013.01); *B60G 13/003* (2013.01); *B60G 15/067* (2013.01); *B60K 11/04* (2013.01); *B62D 1/163* (2013.01); *B62D 3/02* (2013.01); *B62D 7/16* (2013.01); *B60G 2204/128* (2013.01); *B60G 2204/143* (2013.01); *B60G 2300/07* (2013.01); *B60K 17/346* (2013.01)

(58) Field of Classification Search
CPC ...... B60G 3/20; B60G 9/022; B60G 2300/07; B62D 1/163; B60K 17/34; B60K 17/344; B60K 17/346
See application file for complete search history.

(56) References Cited

U.S. PATENT DOCUMENTS 2,309,432 A 1/1943 Alden
2,672,103 A 3/1954 Hohmes
(Continued)

FOREIGN PATENT DOCUMENTS

AU 2013317853 A1 4/2015
AU 2015266694 A1 1/2017
(Continued)

OTHER PUBLICATIONS

American Sport Works, Zircon, http://www.amsportworks.com/pdf/gokarts-minibikes/zircon-hangtag.pdf, Apr. 9, 2013; 2 pages.
(Continued)

*Primary Examiner* — Brian L Swenson
(74) *Attorney, Agent, or Firm* — Faegre Drinker Biddle & Reath LLP

(57) ABSTRACT

A utility vehicle with ergonomic, safety, and maintenance features is disclosed. A vehicle is also disclosed with improved cooling, suspension and drive systems. These features enhance the utility of the vehicle.

25 Claims, 41 Drawing Sheets

Related U.S. Application Data continuation of application No. 15/864,209, filed on Jan. 8, 2018, now Pat. No. 10,399,401, which is a division of application No. 15/235,644, filed on Aug. 12, 2016, now Pat. No. 9,895,946, which is a division of application No. 14/031,950, filed on Sep. 19, 2013, now Pat. No. 9,440,671.

(60) Provisional application No. 61/703,383, filed on Sep. 20, 2012.

(51) Int. Cl.
| | |
|---|---|
| B62D 3/02 | (2006.01) |
| B62D 1/16 | (2006.01) |
| B60G 9/02 | (2006.01) |
| B60G 15/06 | (2006.01) |
| B60G 13/00 | (2006.01) |
| B62D 7/16 | (2006.01) |
| B60K 17/346 | (2006.01) |

(56) References Cited

U.S. PATENT DOCUMENTS

| | | |
|---|---|---|
| 3,259,211 A | 7/1966 | Ryskamp |
| 3,336,074 A | 8/1967 | Barnes et al. |
| 3,422,918 A | 1/1969 | Musser et al. |
| 3,600,768 A | 8/1971 | Romanzi et al. |
| 3,727,712 A | 4/1973 | Colloton |
| 3,814,201 A | 6/1974 | O Brien |
| 3,833,253 A | 9/1974 | Butler |
| 3,856,323 A | 12/1974 | Arning et al. |
| 3,858,902 A | 1/1975 | Howells et al. |
| 3,917,310 A | 11/1975 | Mitsuishi |
| 4,027,892 A | 6/1977 | Parks |
| 4,045,075 A | 8/1977 | Pulver |
| 4,046,403 A | 9/1977 | Yoshida |
| 4,089,542 A | 5/1978 | Westerman |
| 4,098,414 A | 7/1978 | Abiera |
| 4,340,124 A | 7/1982 | Leonard |
| 4,457,525 A | 7/1984 | Tanaka et al. |
| 4,561,323 A | 12/1985 | Stromberg |
| D286,760 S | 11/1986 | Ooba et al. |
| 4,626,024 A | 12/1986 | Swann |
| 4,627,512 A | 12/1986 | Clohessy |
| 4,641,854 A | 2/1987 | Masuda et al. |
| 4,650,210 A | 3/1987 | Hirose et al. |
| 4,657,271 A | 4/1987 | Salmon |
| 4,679,450 A | 7/1987 | Hayakawa et al. |
| 4,695,089 A | 9/1987 | Fukutomi et al. |
| 4,700,982 A | 10/1987 | Kuraoka et al. |
| D300,011 S | 2/1989 | Oba et al. |
| 4,817,985 A | 4/1989 | Enokimoto et al. |
| 4,821,825 A | 4/1989 | Somerton-Rayner |
| 4,934,737 A | 6/1990 | Nakatsuka |
| D312,989 S | 12/1990 | Murata et al. |
| 5,036,939 A | 8/1991 | Johnson et al. |
| 5,042,835 A | 8/1991 | Burns |
| 5,057,062 A | 10/1991 | Yamasaki et al. |
| 5,078,229 A | 1/1992 | Kikuchi et al. |
| 5,086,858 A | 2/1992 | Mizuta et al. |
| 5,107,951 A | 4/1992 | Kawamura |
| 5,251,713 A | 10/1993 | Enokimoto |
| 5,306,044 A | 4/1994 | Tucker |
| 5,327,989 A | 7/1994 | Furuhashi et al. |
| 5,393,194 A | 2/1995 | Smith |
| 5,429,290 A | 7/1995 | Greene, Jr. |
| 5,573,300 A | 11/1996 | Simmons |
| 5,704,866 A | 1/1998 | Pritchard et al. |
| 5,738,471 A | 4/1998 | Zentner et al. |
| 5,752,791 A | 5/1998 | Ehrlich |
| 5,753,300 A | 5/1998 | Wessels et al. |
| 5,779,272 A | 7/1998 | Panek et al. |
| 5,816,650 A | 10/1998 | Lucas, Jr. |
| 5,842,732 A | 12/1998 | Daggett et al. |
| 5,863,277 A | 1/1999 | Melbourne |
| 5,895,063 A | 4/1999 | Hasshi et al. |
| 5,950,750 A | 9/1999 | Dong et al. |
| 5,971,434 A | 10/1999 | Neufeld et al. |
| 6,029,750 A | 2/2000 | Carrier |
| 6,070,689 A | 6/2000 | Tanaka et al. |
| 6,092,877 A | 7/2000 | Rasidescu et al. |
| 6,113,328 A | 9/2000 | Claucherty |
| 6,126,227 A | 10/2000 | Bitelli |
| 6,149,540 A | 11/2000 | Johnson et al. |
| 6,161,853 A | 12/2000 | Jung |
| 6,199,894 B1 | 3/2001 | Anderson |
| 6,202,777 B1 | 3/2001 | Surridge |
| D442,119 S | 5/2001 | Murata et al. |
| 6,293,588 B1 | 9/2001 | Clune |
| 6,293,605 B2 | 9/2001 | Neubrand |
| 6,293,610 B1 | 9/2001 | Howard |
| 6,295,713 B1 | 10/2001 | Hilliard et al. |
| 6,309,024 B1 | 10/2001 | Busch |
| D453,912 S | 2/2002 | Hettich et al. |
| 6,412,797 B1 | 7/2002 | Park |
| 6,416,108 B1 | 7/2002 | Elswick |
| 6,431,569 B2 | 8/2002 | Handa |
| 6,457,543 B1 | 10/2002 | Wooldridge |
| 6,467,787 B1 | 10/2002 | Marsh |
| D467,200 S | 12/2002 | Luo et al. |
| 6,557,922 B1 | 5/2003 | Hommel |
| 6,582,004 B1 | 6/2003 | Hamm |
| 6,622,968 B1 | 9/2003 | St et al. |
| 6,695,566 B2 | 2/2004 | Rodriguez Navio |
| 6,725,962 B1 | 4/2004 | Fukuda |
| 6,752,235 B1 | 6/2004 | Bell et al. |
| 6,767,022 B1 | 7/2004 | Chevalier |
| 6,786,526 B1 | 9/2004 | Blalock |
| D497,324 S | 10/2004 | Chestnut et al. |
| 6,799,779 B2 | 10/2004 | Shibayama |
| 6,799,781 B2 | 10/2004 | Rasidescu et al. |
| 6,827,371 B2 | 12/2004 | Greil |
| D500,707 S | 1/2005 | Lu |
| 6,837,324 B2 | 1/2005 | Nagai et al. |
| D503,657 S | 4/2005 | Katoh |
| D504,638 S | 5/2005 | Tanaka et al. |
| 6,916,142 B2 | 7/2005 | Hansen et al. |
| 6,923,507 B1 | 8/2005 | Billberg et al. |
| D511,317 S | 11/2005 | Tanaka et al. |
| 6,978,857 B2 | 12/2005 | Korenjak |
| 7,014,241 B2 | 3/2006 | Toyota et al. |
| 7,055,454 B1 | 6/2006 | Whiting et al. |
| 7,124,853 B1 | 10/2006 | Kole, Jr. |
| 7,125,134 B1 | 10/2006 | Hedlund et al. |
| 7,165,702 B1 | 1/2007 | Billberg |
| 7,210,547 B2 | 5/2007 | Nojima |
| 7,222,882 B2 | 5/2007 | Boucher |
| 7,232,156 B2 | 6/2007 | Rife et al. |
| 7,237,789 B1 | 7/2007 | Herman |
| 7,239,032 B1 | 7/2007 | Wilson et al. |
| 7,240,472 B2 | 7/2007 | Evers |
| 7,240,960 B2 | 7/2007 | Fallis et al. |
| 7,281,753 B2 | 10/2007 | Curtis et al. |
| D555,036 S | 11/2007 | Eck |
| 7,331,896 B1 | 2/2008 | Kroppe |
| 7,380,805 B1 | 6/2008 | Turner |
| 7,387,181 B2 | 6/2008 | Adoline et al. |
| D574,297 S | 8/2008 | Carl |
| D575,675 S | 8/2008 | Williams et al. |
| 7,410,182 B1 | 8/2008 | Giese et al. |
| D578,433 S | 10/2008 | Kawaguchi et al. |
| D578,934 S | 10/2008 | Tanaka et al. |
| 7,431,024 B2 | 10/2008 | Buchwitz et al. |
| 7,451,844 B2 | 11/2008 | Kunikata |
| 7,475,748 B2 | 1/2009 | Nakamura et al. |
| 7,475,750 B2 | 1/2009 | Tokuhara |
| 7,485,984 B2 | 2/2009 | Fulks et al. |
| 7,500,709 B2 | 3/2009 | Heselhaus |
| D592,998 S | 5/2009 | Woodard et al. |
| D595,613 S | 7/2009 | Lai et al. |
| 7,559,596 B2 | 7/2009 | Garska et al. |
| 7,565,944 B2 | 7/2009 | Sakamoto et al. |
| 7,568,732 B2 | 8/2009 | Schlup, Jr. |

(56) References Cited

U.S. PATENT DOCUMENTS

| | | |
|---|---|---|
| 7,578,523 B2 | 8/2009 | Kosuge et al. |
| 7,610,132 B2 | 10/2009 | Yanai et al. |
| D604,201 S | 11/2009 | Kawaguchi et al. |
| D605,555 S | 12/2009 | Tanaka et al. |
| D606,900 S | 12/2009 | Flores |
| 7,625,048 B2 | 12/2009 | Rouhana et al. |
| D607,377 S | 1/2010 | Shimomura et al. |
| 7,665,792 B1 | 2/2010 | Flynn |
| 7,677,599 B2 | 3/2010 | Kuerten et al. |
| 7,677,634 B2 | 3/2010 | Flynn |
| 7,677,646 B2 | 3/2010 | Nakamura |
| 7,717,495 B2 | 5/2010 | Leonard et al. |
| 7,762,567 B2 | 7/2010 | Marur |
| D621,423 S | 8/2010 | Nakanishi et al. |
| D622,631 S | 8/2010 | Lai et al. |
| 7,782,000 B2 | 8/2010 | Suzuki |
| 7,795,602 B2 | 9/2010 | Leonard et al. |
| D624,848 S | 10/2010 | Shimomura |
| D625,662 S | 10/2010 | Li |
| 7,819,220 B2 | 10/2010 | Sunsdahl et al. |
| 7,841,624 B2 | 11/2010 | Kobayashi et al. |
| 7,845,452 B2 | 12/2010 | Bennett et al. |
| D631,395 S | 1/2011 | Tandrup et al. |
| 7,871,106 B2 | 1/2011 | Leonard et al. |
| RE42,086 E | 2/2011 | Saito et al. |
| D633,006 S | 2/2011 | Sanschagrin et al. |
| 7,896,422 B2 | 3/2011 | Willard et al. |
| 7,900,743 B2 | 3/2011 | Kaku et al. |
| 7,913,505 B2 | 3/2011 | Nakamura |
| D636,704 S | 4/2011 | Yoo et al. |
| 7,922,201 B2 | 4/2011 | Kuerten et al. |
| 7,950,486 B2 | 5/2011 | Van et al. |
| D640,598 S | 6/2011 | Zhang |
| 7,967,365 B2 | 6/2011 | Gerhardt et al. |
| D641,288 S | 7/2011 | Sun |
| 7,971,904 B2 | 7/2011 | David |
| D642,493 S | 8/2011 | Goebert et al. |
| 8,029,021 B2 | 10/2011 | Leonard et al. |
| 8,037,959 B2 | 10/2011 | Yamamura et al. |
| 8,052,202 B2 | 11/2011 | Nakamura |
| 8,056,928 B2 | 11/2011 | Ijaz et al. |
| 8,100,434 B2 | 1/2012 | Miura |
| 8,104,524 B2 | 1/2012 | Manesh et al. |
| 8,118,125 B2 | 2/2012 | Suzuki et al. |
| 8,176,957 B2 | 5/2012 | Manesh et al. |
| 8,191,952 B2 | 6/2012 | Mokhtari et al. |
| 8,205,910 B2 | 6/2012 | Leonard et al. |
| 8,215,694 B2 | 7/2012 | Smith et al. |
| 8,240,748 B2 | 8/2012 | Chapman |
| 8,256,561 B2 | 9/2012 | Mochizuki et al. |
| 8,312,949 B2 | 11/2012 | Hirukawa et al. |
| 8,328,235 B2 | 12/2012 | Schneider et al. |
| 8,353,534 B2 | 1/2013 | Arnold et al. |
| 8,371,408 B2 | 2/2013 | Kawashiri et al. |
| 8,382,130 B2 | 2/2013 | Nakamura |
| 8,403,404 B2 | 3/2013 | Kihara et al. |
| 8,453,775 B2 | 6/2013 | Belzile et al. |
| 8,454,041 B2 | 6/2013 | Fujii et al. |
| 8,464,824 B1 | 6/2013 | Reisenberger |
| 8,465,050 B1 | 6/2013 | Spindler et al. |
| 8,544,582 B2 | 10/2013 | Kaku et al. |
| 8,548,710 B1 | 10/2013 | Reisenberger |
| 8,596,405 B2 | 12/2013 | Sunsdahl et al. |
| 8,596,709 B2 | 12/2013 | Ugolini |
| 8,613,335 B2 | 12/2013 | Deckard et al. |
| 8,640,814 B2 | 2/2014 | Deckard et al. |
| D703,102 S | 4/2014 | Eck et al. |
| 8,746,719 B2 | 6/2014 | Safranski et al. |
| 8,781,705 B1 | 7/2014 | Reisenberger |
| 8,827,025 B2 | 9/2014 | Hapka |
| 8,827,028 B2 | 9/2014 | Sunsdahl et al. |
| 8,944,465 B2 | 2/2015 | Shinbori |
| 8,967,666 B2 | 3/2015 | Iardella et al. |
| 8,973,693 B2 | 3/2015 | Kinsman et al. |
| 8,979,124 B2 | 3/2015 | Shinbori et al. |
| 8,994,494 B2 | 3/2015 | Koenig et al. |
| 8,997,908 B2 | 4/2015 | Kinsman et al. |
| 9,150,182 B1 | 10/2015 | Schlangen et al. |
| 9,152,607 B2 | 10/2015 | Wetterlund et al. |
| 9,283,992 B2 | 3/2016 | Deschamps |
| 9,393,894 B2 | 7/2016 | Steinmeiz et al. |
| 9,440,671 B2 | 9/2016 | Schlangen et al. |
| 9,566,858 B2 | 2/2017 | Hicke et al. |
| 9,592,782 B2 | 3/2017 | Raska et al. |
| 9,623,912 B2 | 4/2017 | Schlangen |
| 9,650,078 B2 | 5/2017 | Kinsman et al. |
| 9,776,481 B2 | 10/2017 | Deckard et al. |
| 9,895,946 B2 | 2/2018 | Schlangen et al. |
| 9,932,073 B2 | 4/2018 | Dube et al. |
| 9,981,519 B2 | 5/2018 | Despres-Nadeau et al. |
| 9,988,083 B1 | 6/2018 | Smith |
| 10,160,497 B2 | 12/2018 | Wimpfheimer et al. |
| 10,207,554 B2 | 2/2019 | Schroeder et al. |
| 10,214,100 B2 | 2/2019 | Ajisaka |
| 10,239,571 B2 | 3/2019 | Kennedy et al. |
| 10,246,153 B2 | 4/2019 | Deckard et al. |
| 10,399,401 B2 | 9/2019 | Schlangen et al. |
| 10,464,386 B2 | 11/2019 | Hisada et al. |
| 10,486,748 B2 | 11/2019 | Deckard et al. |
| 10,668,780 B2 | 6/2020 | Despres-Nadeau et al. |
| 10,800,224 B2 | 10/2020 | Sellars et al. |
| 10,800,470 B2 | 10/2020 | Barkey et al. |
| 10,850,582 B2 | 12/2020 | Despres-Nadeau et al. |
| 10,967,694 B2 | 4/2021 | Brady et al. |
| 10,981,448 B2 | 4/2021 | Safranski et al. |
| 11,014,420 B2 | 5/2021 | Sawai et al. |
| 11,104,194 B2 | 8/2021 | Schlangen et al. |
| 2001/0031185 A1 | 10/2001 | Swensen |
| 2002/0011374 A1 | 1/2002 | Brister |
| 2002/0107101 A1 | 8/2002 | Bowen et al. |
| 2002/0135175 A1 | 9/2002 | Schroth |
| 2002/0147072 A1 | 10/2002 | Goodell et al. |
| 2002/0178968 A1 | 12/2002 | Christensen |
| 2003/0001409 A1 | 1/2003 | Semple et al. |
| 2003/0089166 A1 | 5/2003 | Mizuno et al. |
| 2003/0211913 A1 | 11/2003 | Spitale |
| 2003/0233732 A1 | 12/2003 | Kohlstrand et al. |
| 2004/0026948 A1 | 2/2004 | Novajovsky |
| 2004/0079561 A1 | 4/2004 | Ozawa et al. |
| 2004/0108159 A1 | 6/2004 | Rondeau et al. |
| 2004/0124028 A1 | 7/2004 | Lachapelle et al. |
| 2004/0195797 A1 | 10/2004 | Nash et al. |
| 2004/0242090 A1 | 12/2004 | Gibbs |
| 2005/0040000 A1 | 2/2005 | Kelley et al. |
| 2005/0073140 A1 | 4/2005 | Boucher |
| 2005/0073177 A1 | 4/2005 | Bendel et al. |
| 2005/0073187 A1 | 4/2005 | Frank et al. |
| 2005/0077098 A1 | 4/2005 | Takayanagi et al. |
| 2005/0173177 A1 | 8/2005 | Smith et al. |
| 2005/0173180 A1 | 8/2005 | Hypes et al. |
| 2005/0173940 A1 | 8/2005 | Smith et al. |
| 2005/0248116 A1 | 11/2005 | Fanson |
| 2005/0257989 A1 | 11/2005 | Iwami et al. |
| 2005/0279330 A1 | 12/2005 | Okazaki et al. |
| 2006/0006696 A1 | 1/2006 | Umemoto et al. |
| 2006/0043754 A1 | 3/2006 | Smith |
| 2006/0169514 A1 | 8/2006 | Lim et al. |
| 2006/0273566 A1 | 12/2006 | Hepner et al. |
| 2007/0214818 A1 | 9/2007 | Nakamura |
| 2007/0225105 A1 | 9/2007 | Bowen |
| 2007/0290493 A1 | 12/2007 | David |
| 2008/0023240 A1 | 1/2008 | Sunsdahl et al. |
| 2008/0023249 A1 | 1/2008 | Sunsdahl et al. |
| 2008/0084091 A1 | 4/2008 | Nakamura et al. |
| 2008/0093883 A1 | 4/2008 | Shibata et al. |
| 2008/0150249 A1 | 6/2008 | Murata |
| 2008/0256738 A1 | 10/2008 | Malone |
| 2008/0284124 A1 | 11/2008 | Brady et al. |
| 2009/0025997 A1 | 1/2009 | Ishii et al. |
| 2009/0184531 A1 | 7/2009 | Yamamura et al. |
| 2009/0301830 A1 | 12/2009 | Kinsman et al. |
| 2009/0308682 A1 | 12/2009 | Ripley et al. |
| 2010/0012412 A1 | 1/2010 | Deckard et al. |
| 2010/0060026 A1 | 3/2010 | Bowers |

(56) References Cited

U.S. PATENT DOCUMENTS

| | | |
|---|---|---|
| 2010/0090430 A1 | 4/2010 | Weston |
| 2010/0090797 A1 | 4/2010 | Koenig et al. |
| 2010/0194086 A1 | 8/2010 | Yamamura et al. |
| 2010/0314184 A1 | 12/2010 | Stenberg et al. |
| 2010/0314191 A1 | 12/2010 | Deckard et al. |
| 2011/0062748 A1 | 3/2011 | Kaita et al. |
| 2011/0139529 A1 | 6/2011 | Eichenberger et al. |
| 2011/0155087 A1 | 6/2011 | Wenger et al. |
| 2011/0156433 A1 | 6/2011 | Horiuchi et al. |
| 2011/0240395 A1 | 10/2011 | Hurd et al. |
| 2011/0297462 A1 | 12/2011 | Grajkowski et al. |
| 2011/0298189 A1 | 12/2011 | Schneider et al. |
| 2012/0031688 A1 | 2/2012 | Safranski et al. |
| 2012/0031693 A1 | 2/2012 | Deckard et al. |
| 2012/0161468 A1 | 6/2012 | Tsumiyama et al. |
| 2012/0161477 A1 | 6/2012 | Furman et al. |
| 2012/0193163 A1 | 8/2012 | Wimpfheimer et al. |
| 2012/0223500 A1 | 9/2012 | Kinsman et al. |
| 2013/0033070 A1 | 2/2013 | Kinsman et al. |
| 2013/0048409 A1 | 2/2013 | Fujii |
| 2013/0199097 A1 | 8/2013 | Spindler et al. |
| 2013/0240272 A1 | 9/2013 | Gass et al. |
| 2013/0256050 A1 | 10/2013 | Novotny et al. |
| 2013/0277937 A1 | 10/2013 | Keller et al. |
| 2013/0319785 A1 | 12/2013 | Spindler et al. |
| 2014/0124279 A1 | 5/2014 | Schlangen et al. |
| 2014/0210234 A1 | 7/2014 | Ricketts et al. |
| 2014/0262583 A1 | 9/2014 | Url |
| 2014/0353956 A1 | 12/2014 | Bjerketvedt et al. |
| 2015/0014974 A1 | 1/2015 | Cotnoir et al. |
| 2015/0165886 A1 | 6/2015 | Bennett et al. |
| 2015/0175114 A1 | 6/2015 | Schroeder et al. |
| 2015/0197128 A1 | 7/2015 | Miller et al. |
| 2015/0210319 A1 | 7/2015 | Tiramani |
| 2016/0032625 A1 | 2/2016 | Suzuki |
| 2016/0347350 A1 | 12/2016 | Heon et al. |
| 2017/0137059 A1 | 5/2017 | Ohba et al. |
| 2017/0274935 A1 | 9/2017 | Deckard et al. |
| 2018/0154717 A1 | 6/2018 | Neu et al. |
| 2018/0170134 A1 | 6/2018 | Schlangen et al. |
| 2019/0118883 A1 | 4/2019 | Spindler et al. |
| 2019/0118884 A1 | 4/2019 | Spindler et al. |
| 2020/0001673 A1 | 1/2020 | Schlangen et al. |
| 2020/0122776 A1 | 4/2020 | Schlangen et al. |
| 2021/0061036 A1 | 3/2021 | Despres-Nadeau et al. |
| 2022/0281274 A1 | 9/2022 | Schlangen et al. |
| 2022/0281275 A1 | 9/2022 | Schlangen et al. |

FOREIGN PATENT DOCUMENTS

| | | |
|---|---|---|
| AU | 2017204255 A1 | 7/2017 |
| CA | 2265693 A1 | 3/1998 |
| CH | 317335 A | 11/1956 |
| CN | 1724283 A | 1/2006 |
| CN | 101115635 A | 1/2008 |
| CN | 101177110 A | 5/2008 |
| CN | 201597405 U | 10/2010 |
| CN | 101903205 A | 12/2010 |
| CN | 201679362 U | 12/2010 |
| CN | 101952164 A | 1/2011 |
| CN | 103249578 A | 8/2013 |
| CN | 105377672 A | 3/2016 |
| CN | 105730221 A | 7/2016 |
| DE | 0037435 | 10/1886 |
| DE | 0116605 | 2/1900 |
| DE | 0351667 C | 4/1922 |
| DE | 1755101 | 4/1971 |
| DE | 3033707 | 4/1982 |
| DE | 3516671 A1 | 11/1986 |
| DE | 4122690 A1 | 1/1992 |
| DE | 102009038853 A1 | 3/2011 |
| DE | 102010017784 A1 | 1/2012 |
| EP | 0238077 A2 | 9/1987 |
| EP | 0709247 A2 | 5/1996 |
| EP | 0794096 A2 | 9/1997 |
| EP | 1215107 A1 | 6/2002 |
| EP | 1493624 A1 | 1/2005 |
| EP | 1557345 A2 | 7/2005 |
| EP | 1564123 A2 | 8/2005 |
| EP | 2057060 A2 | 5/2009 |
| EP | 3328717 A1 | 6/2018 |
| FR | 2914597 A1 | 10/2008 |
| GB | 2036659 A | 7/1980 |
| JP | 57-205277 A | 12/1982 |
| JP | 62-218209 A | 9/1987 |
| JP | 63-025977 | 5/1988 |
| JP | 07-040783 A | 2/1995 |
| JP | 11-334447 A | 12/1999 |
| JP | 2000-177434 A | 6/2000 |
| JP | 2001-130304 A | 5/2001 |
| JP | 3385382 B2 | 3/2003 |
| JP | 2003-237530 A | 8/2003 |
| JP | 2007-038709 A | 2/2007 |
| JP | 2010-083192 A | 4/2010 |
| JP | 2010-095106 A | 4/2010 |
| JP | 2015-517430 A | 6/2015 |
| JP | 2018-523603 A | 8/2018 |
| WO | 97/46407 A1 | 12/1997 |
| WO | 98/12095 A2 | 3/1998 |
| WO | 2008/016377 A2 | 2/2008 |
| WO | 2011/152817 A1 | 12/2011 |
| WO | 2012/018896 A2 | 2/2012 |
| WO | 2012/109546 A1 | 8/2012 |
| WO | 2013/166310 A1 | 11/2013 |
| WO | 2014/047488 A1 | 3/2014 |
| WO | 2014/059258 A1 | 4/2014 |
| WO | 2015/071904 A1 | 5/2015 |
| WO | 2015/184354 A1 | 12/2015 |
| WO | 2017/023726 A1 | 2/2017 |

OTHER PUBLICATIONS

Artic Cat, Company Website, Prowler XT650 H1, undated; 9 pages.
BRP Can-Am Commander photo, undated; 1 page.
Buyer'S Guide Supplement, 2006 Kart Guide, Powersports Business Magazine; 6 pages.
Club Car, Company Website, product pages For XRT 1500 SE, undated; 2 pages.
Honda Hippo 1800 New Competition for Yamaha's Rhino, Dirt Wheels Magazine, Apr. 2006, pp. 91-92.
International Preliminary Report on Patentability issued by the European Patent Office, dated Apr. 14, 2015 for International Patent Application No. PCT/US2013/064516; 18 pages.
International Preliminary Report on Patentability issued by the European Patent Office, dated Mar. 8, 2013, for International PCT Application No. PCT/US2012/024664; 24 pages.
International Preliminary Report on Patentablility issued by the European Patent Office, dated Nov. 4, 2014, for International PCT Application No. PCT/US2013/039304; 7 pages.
International Search Report and Written Opinion issued by the European Patent Office, dated Jan. 14, 2014, for International Application No. PCT/US2013/064516; 24 pages.
International Search Report and Written Opinion issued by the European Patent Office, dated Jul. 23, 2013, for International PCT Application No. PCT/US2013/039304; 11 pages.
International Search Report and Written Opinion issued by the European Patent Office, dated Jun. 28, 2012, for International PCT Application No. PCT/US2012/024664; 19 pages.
Kawasaki Mule The Off-Road Capable 610 4 .times. 4 XC Brochure 2011, Copyrgt. 2010, 6 pages.
Kawasaki Mule Utility Vehicle Brochure 2009, .Copyrgt. 2008; 10 pages.
Kawasaki Teryx 750 F1 4×4 Sport Brochure 2011, (Copyrights) 2010; 6 pages.
Kawasaki Teryx Recreation Utility Vehicle Brochure 2009, (Copyrights) 2008; 8 pages.
Office Action dated Apr. 7, 2016 issued by the Australian Patent Office in Australian Patent Application No. 2013329090; 3 pages.
Office Action issued by the European Patent Office, dated Dec. 14, 2016, for European Patent Application No. 13784068.2; 4 pages.

(56) References Cited

OTHER PUBLICATIONS

Office Action issued by the European Patent Office, dated Jun. 9, 2017, for European Patent Application No. 13784068.2; 5 pages.
Owner's Manual. Trail Master-300XRX Dune Buggy. Jul. 29, 2011 [online], [retrieved on May 23, 2013], Retrieved from the Internet <URL: http://gokartsusa.com/pdf/TrailMaster-300-XRX-Owners-Manual.pdf>.
Polaris Ranger Brochure 2009, .Copyrgt. 2008, 32 pages.
Polaris Ranger Brochure 2011, (Copyright) 2010, 22 pages.
Polaris Ranger Brochure ATVs and Side .times. Sides Brochure 2010, .Copyrgt. 2009, 26 pages.
Polaris Ranger Off-Road Utility Vehicles Brochure 2004, .Copyrgt. 2003; 20 pages.
Polaris Ranger RZR Brochure 2011, .Copyrgt. 2010; 16 pages.
Polaris Ranger Welcome to Ranger Country Brochure 2006, .Copyrgt. 2005, 24 pages.
Polaris Ranger Work/Play Only Brochure 2008, .Copyrgt. 2007, 28 pages.
Ray Sedorchuk, New for 2004, Yamaha Rhino 660 4×4, ATV Connection Magazine, (Copyrights) 2006; 3 pages.
Yamaha, Company Website, 2006 Rhino 450 Auto 4 .times. 4, Copyrgt. 2005, 3 pages.
Yamaha, company website, 2006 Rhino 660 Auto 4.times.4 Special Edition, Copyright 2006, 4 pgs.
Yamaha, Company Website, Rhino 660 Auto 4×4 Exploring Edition Specifications, (Copyrights) 2006; 3 pages.
Brochure, Fully Equipped LTATV Sales, accessed Jul. 15, 2014, copyright 2010-2011; available at http://chrishainesoffroad.com/vheciles.pdf, last accessed Jul. 15, 2014, copyright 2010-2011; 2 pages.
Brochure, Strike Razer, Advanced Mobile Systems for Rapid Response; 5 pages.
Examination Report issued by the Intellectual Property of India, dated Aug. 20, 2019, for Indian Patent Application No. 2145/DELNP/2015; 6 pages.
Examination Report No. 1 issued by the Australian Government IP Australia, dated Nov. 19, 2018, for Australian Patent Application No. 2016303426; 3 pages.
Extended Search Report issued by the European Patent Office, dated Apr. 24, 2020, for European Patent Application No. 20153935.0; 8 pages.
International Preliminary Report on Patentability issued by the European Patent Office, dated Feb. 6, 2018, for International Patent Application No. PCT/US2016/044630; 6 pages.
International Preliminary Report on Patentability issued by the European Patent Office, dated Sep. 8, 2016, for International Application No. PCT/US2015/033327; 13 pages.
International Preliminary Report on Patentability received for PCT Patent Application No. PCT/US13/61002, dated Apr. 2, 2015, 9 pages.
International Preliminary Report on Patentability received for PCT Patent Application No. PCT/US2016/044630, dated Feb. 15, 2018, 7 pages.
International Search Report and Written Opinion issued by the European Patent Office, dated Aug. 27, 2008, for related International Patent Application No. PCT/US2008/003485; 15 pages.
International Search Report and Written Opinion issued by the European Patent Office, dated Oct. 2, 2008, for related International Patent Application No. PCT/US2008/003483; 18 pages.
International Search Report and Written Opinion issued by the European Patent Office, dated Oct. 5, 2016, for International Patent Application No. PCT/US2016/044630; 8 pages.
International Search Report and Written Opinion of the International Searching Authority, issued by the European Patent Office, dated Jan. 3, 2014, for International Application No. PCT/US2013/061002; 14 pages.
International Search Report and Written Opinion received for PCT Patent Application No. PCT/US2016/044630, dated Oct. 5, 2016, 8 pages.
International Search Report and Written Opinion, issued by the European Patent Office, dated Aug. 6, 2015, for International Patent Application No. PCT/US2015/033327; 8 pages.
Office Action issued by the Canadian Intellectual Property Office, dated Apr. 29, 2021, for Canadian Patent Application to. 2,946,343; 4 pages.
Office Action issued by the Japanese Patent Office, dated Feb. 13, 2019, for Japanese Patent Application No. 2018-500917; 5 pages.
Patent Examination Report No. 1 issued by IP Australia, dated Jun. 28, 2018, for Australian Patent Application No. 2017204255; 3 pages.
Patent Examination Report No. 1 issued by the Australian Government IP Australia, dated Jul. 24, 2017, for Australian Patent Application No. 2015266694; 4 pages.
Patent Examination Report No. 1 issued by the Australian Government IP Australia, dated Mar. 18, 2016; 5 pages.
Patent Examination Report No. 1 issued by the Australian Government IP Australia, dated Sep. 29, 2016; for Australian Patent Application No. 2013317853; 5 pages.
Strike Razor: Light Tactical Vehicle, Advanced Mobile Systems, copyright 2011, 2 pages.
Webpage, RP Advanced Mobile Systems: Military SxS Tactical Defense Vehicles, available at http://web.archive.org/web/20120324210549/http://www.rpadvancedmobilesyst-ems.com/, available as early as Mar. 24, 2012, last accessed Jul. 15, 2014; 4 pages.
Written Opinion issued by the European Patent Office, dated Sep. 1, 2008, for related International Patent Application No. PCT/US2008/003480; 12 pages.

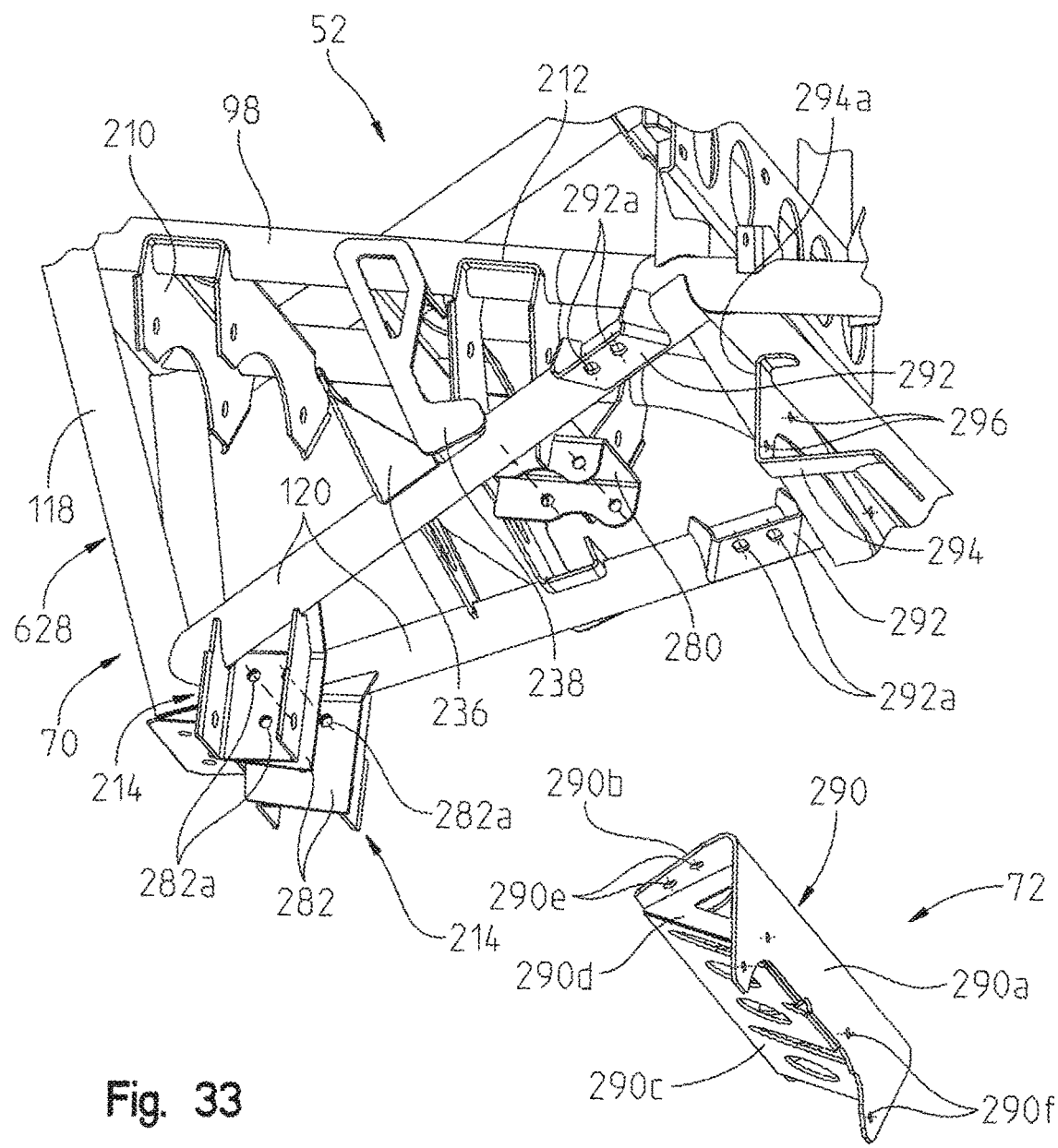
Fig. 33
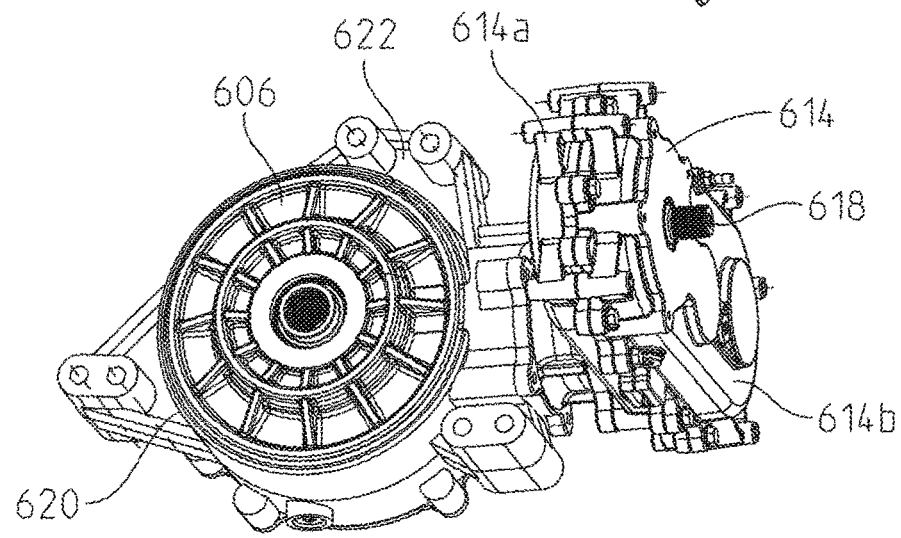

VEHICLE

CROSS-REFERENCE TO RELATED APPLICATIONS

The present application is a continuation of U.S. patent application Ser. No. 16/528,051, filed Jul. 31, 2019, and now patented as U.S. Pat. No. 11,104,194 on Aug. 31, 2021, which is a continuation of U.S. patent application Ser. No. 15/864,209, filed Jan. 8, 2018, now U.S. Pat. No. 10,399,401, which is a divisional of U.S. patent application Ser. No. 15/235,644, filed Aug. 12, 2016, now U.S. Pat. No. 9,895,946, which is a divisional of U.S. patent application Ser. No. 14/031,950, filed Sep. 19, 2013, now U.S. Pat. No. 9,440,671, which claims priority to U.S. Provisional Patent Application Ser. No. 61/703,383, filed Sep. 20, 2012, entitled "VEHICLE," the complete disclosures of which are expressly incorporated by reference herein.

FIELD OF THE INVENTION

The present invention relates generally to a vehicle and in particular to a vehicle with ergonomic, safety, maintenance, and other features.

BACKGROUND AND SUMMARY OF THE INVENTION

Vehicles including utility vehicles, all-terrain vehicles, tractors, and others are known. It is known to provide vehicles with forward and rear covered storage compartments such as trunks. It is also known to provide vehicles with rear platforms covered by roofs and with exposed rear cargo beds. It is also known to attach sub-assemblies having axles, such as trailers, to vehicle hitches in a pivotal manner.

Utility vehicles are also available which comprise a plurality of ground engagement members, a main frame supported by a first portion of the plurality of ground engagement members, an engine supported by the main frame and configured to provide power to at least one of the plurality of ground engaging members, an operator area supported by the main frame, the operator area including seating for at least two occupants in a side-by-side arrangement, steering controls operatively coupled to at least a portion of the plurality of ground engagement members, and engine controls operatively coupled to the engine.

For example, a utility vehicle of the type disclosed above is shown in our U.S. Pat. No. 6,923,507. It is desirable to provide a vehicle of this general type which might be used for military capable operations. It is also desirable to provide such a vehicle with a somewhat smaller overall footprint, yet maintaining very mobile attributes, both in the suspension and in an all wheel drive characteristic.

In one embodiment, a utility vehicle has a main frame; a plurality of ground engaging members adapted to support the main frame above the ground. The ground engaging members comprise front and rear ground engaging members. A first seating area is supported by the main frame. An engine is supported by the main frame, forward of the first seating area. A front suspension is also provided. The front suspension comprises a lower control arm coupled to the frame at first and second coupling points; an upper control arm coupled to the frame at third and fourth coupling points; and a shock absorber coupled to the frame at an upper end thereof and to the lower control arm, the shock being positioned between the second and fourth coupling points.

In another embodiment, a utility vehicle has a main frame; a plurality of ground engaging members adapted to support the main frame above the ground. The ground engaging members comprise front and rear ground engaging members. A first seating area is supported by the main frame. An engine is supported by the main frame, forward of the first seating area. A rear suspension is also provided. The rear suspension comprises rear trailing arms coupled to the frame at a front end thereof and to the axle at a rear end thereof; rear alignment arms are coupled to the frame at a front end thereof and to the axle at a rear end thereof; and a shock absorber is coupled to the frame at an upper end thereof and to the rear trailing arm at a lower end thereof.

Another embodiment includes a utility vehicle comprising a frame having a front section, a midsection, and a rear section. The frame defines a cab rearward of the front section. The utility vehicle further comprises a plurality of ground engaging members operably coupled to the frame and configured for use on a ground surface; and a plurality of body panels. The body panels include a hood, a first side panel, and a second side panel coupled to the front section of the frame. The utility vehicle further comprises an engine supported by the frame and operably coupled to the ground engaging members; and a cooling assembly fluidly coupled to the engine and supported by the front section of the frame. The cooling assembly is angled relative to the longitudinal direction and is spaced apart from a line of sight extending from the cab.

A further embodiment includes a utility vehicle comprising a frame extending along a centerline of the utility vehicle and having a front section, a midsection, and a rear section. The frame defines a cab rearward of the front section. The utility vehicle further comprises a plurality of ground engaging members operably coupled to the frame. Additionally, the utility vehicle comprises an engine supported by the frame along the centerline of the utility vehicle; a drive shaft spaced apart from the engine; a transfer case operably coupled to the drive shaft and supported by the front section of the frame; and a front differential operably coupled to the transfer case and supported by the frame. The differential is positioned along the centerline of the utility vehicle.

Another embodiment includes a utility vehicle comprising a frame extending along a centerline of the utility vehicle; a plurality of ground engaging members operably coupled to the frame; and a drivetrain assembly supported by the frame. The drivetrain assembly includes an engine supported by the frame; and a drive shaft off-center from the centerline of the utility vehicle. The drive shaft has an input end operably coupled to the engine and an output end. The drivetrain assembly further includes a differential positioned along the centerline of the utility vehicle. The differential has an input end operably coupled to the drive shaft and an output end operably coupled to the ground engaging members. Additionally, the drivetrain assembly includes a transfer case positioned intermediate the drive shaft and the differential. The transfer case is perpendicular to the output end of the drive shaft and is perpendicular to the input end of the differential.

A further embodiment includes a utility vehicle comprising a frame extending along a centerline of the utility vehicle; a plurality of ground engaging members operably coupled to the frame; a drivetrain assembly supported by the frame; and a suspension assembly operably coupled to the ground engaging members. The suspension assembly includes upper control arms, lower control arms, and shock absorbers. The utility vehicle further comprises a steering assembly configured to move the ground engaging members. A portion of the steering assembly is positioned between the upper control arms and is elevated relative to the lower control arms.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 33 is an exploded view of the frame and the front differential of the drivetrain assembly of FIG. 30;

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, snowmobiles, and golf carts.

Figure 1:
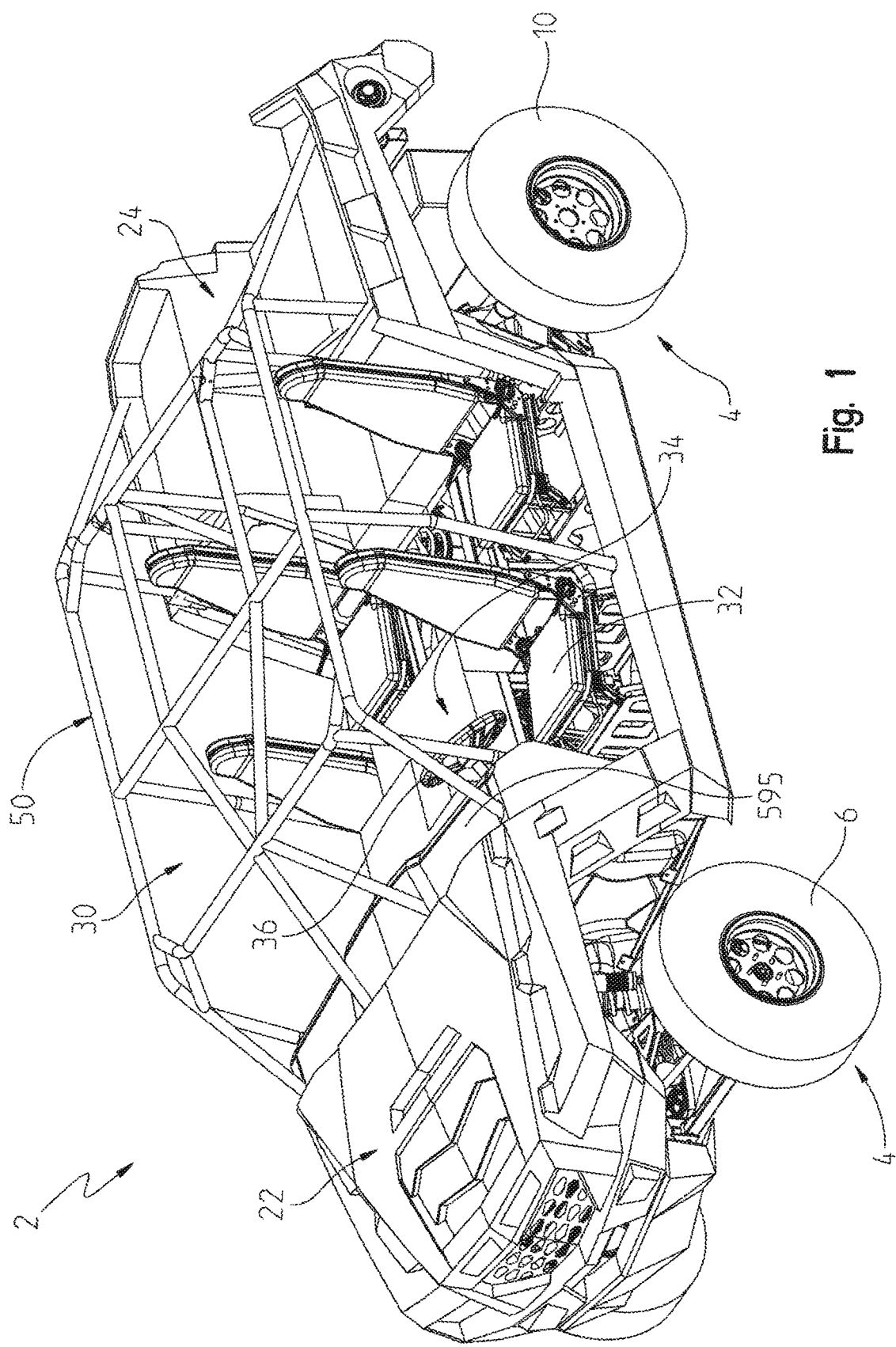
FIG. 1 is a front left perspective view of a vehicle according to the present disclosure.
Figure 6:
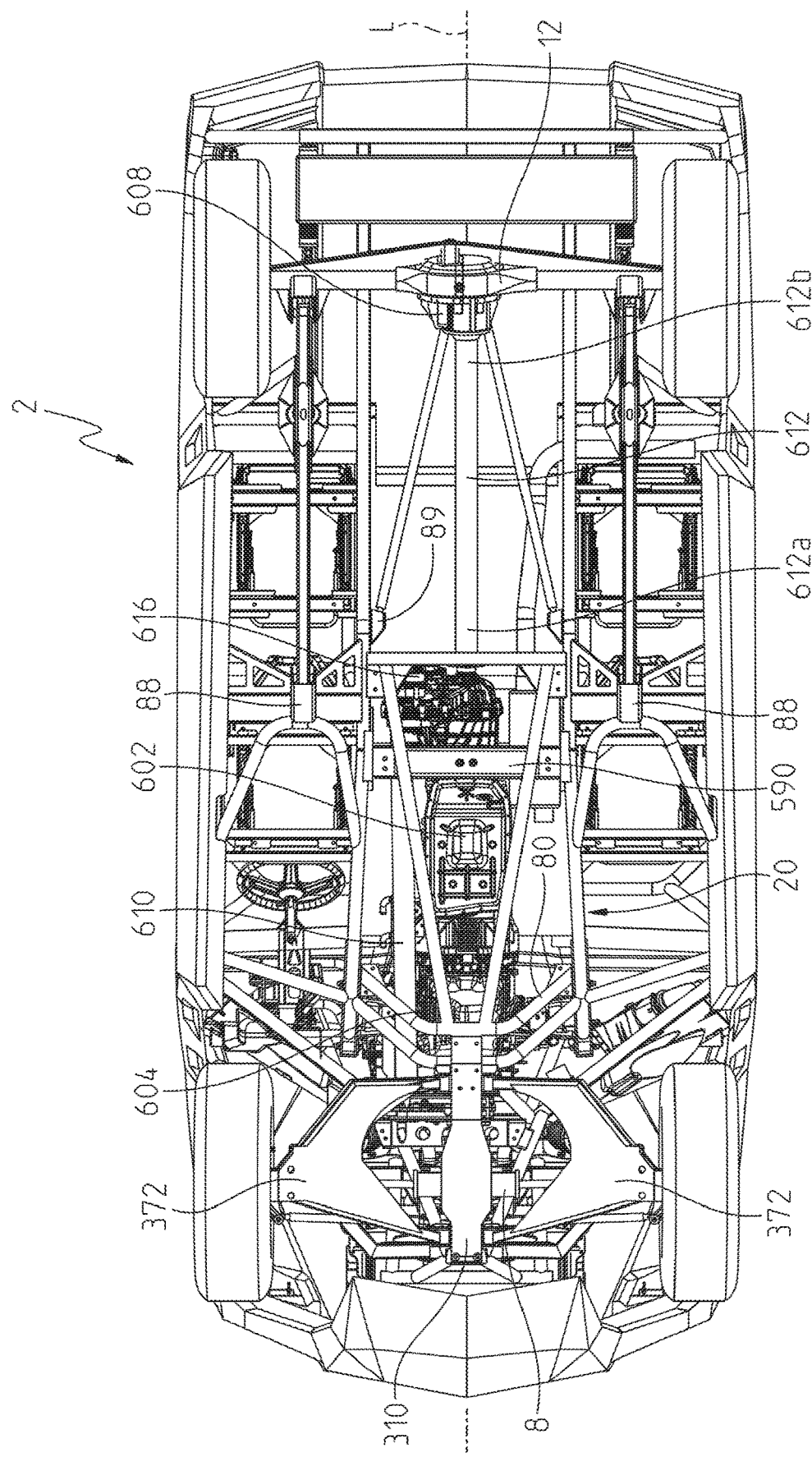
FIG. 6 is a bottom view of the vehicle FIG. 1.
Figure 7:
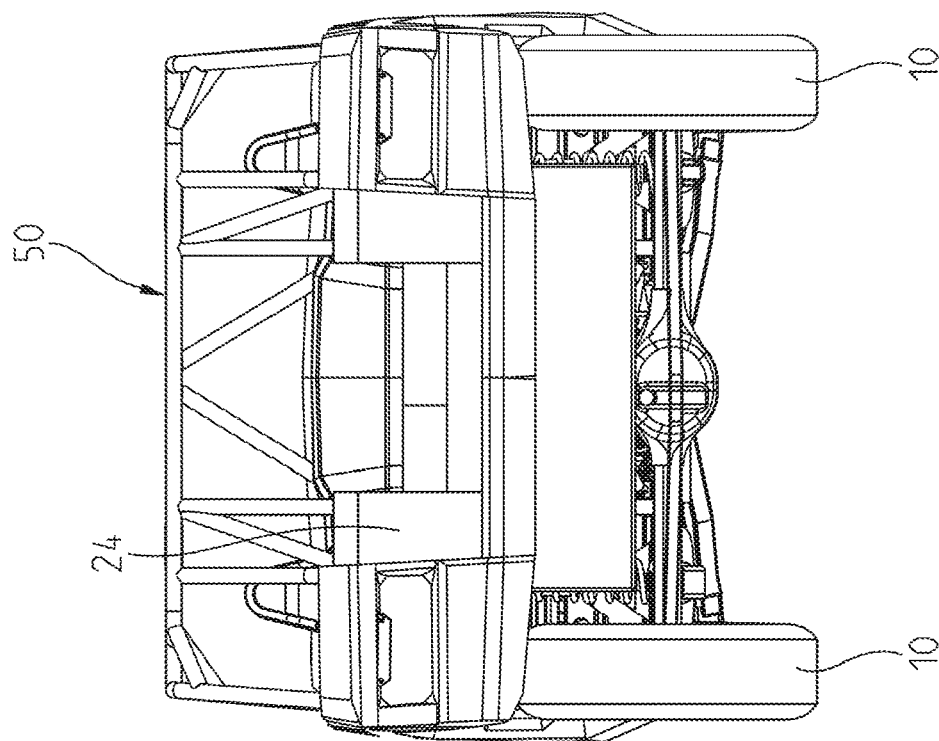
FIG. 7 is a front view of the vehicle of FIG. 1.
Figure 8:
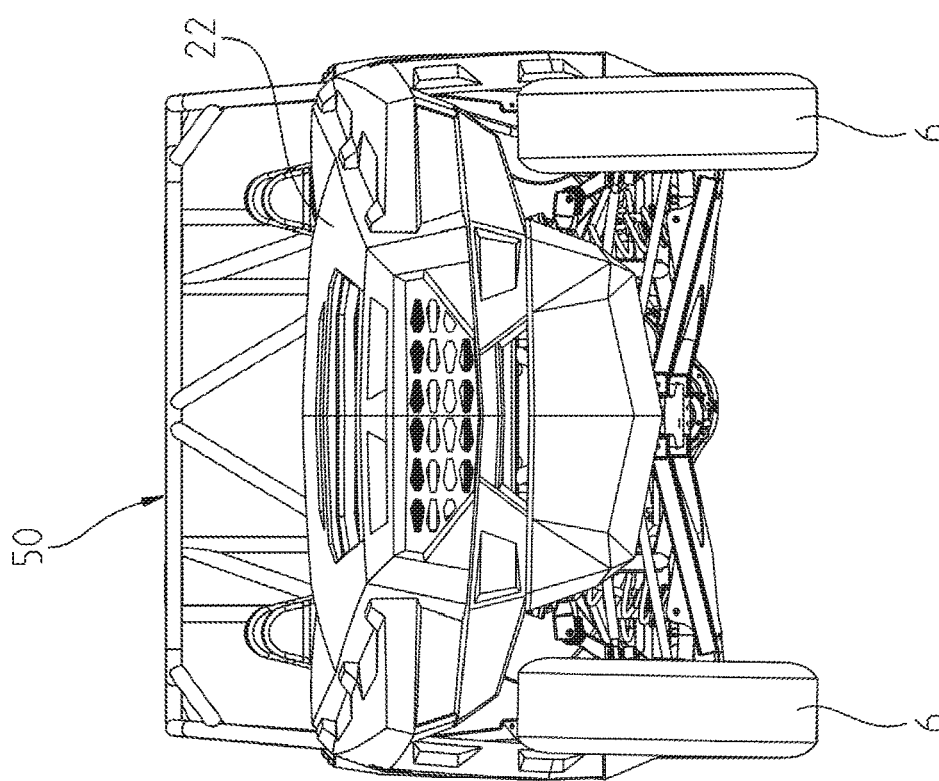
FIG. 8 is a rear view of the vehicle of FIG. 1.

Referring to FIG. 1, an illustrative embodiment of a vehicle 2 is shown. Vehicle 2 as illustrated includes a plurality of ground engaging members 4, illustratively wheels. A first set of wheels 6, one on each side of vehicle 2, generally correspond to a front axle 8 (FIG. 6). A second set of wheels 10, one on each side of vehicle 2, generally correspond to a rear axle 12 (FIG. 6). It should be understood that the vehicle described herein could include any of the components of previous military vehicles as described and depicted in U.S. Pat. Nos. 7,795,602; 8,029,021; 7,717,495; and 8,205,910; the subject matter of which is incorporated herein by reference.

In one embodiment, one or more of the wheels may be replaced with tracks, such as the Prospector II Tracks available from Polaris Industries, Inc. located at 2100 Highway 55 in Medina, Minn. 55340. As shown, wheels include pneumatic tires mounted on standard steel rims. Alternatively, tires could be non-pneumatic tires as shown in U.S. Pat. Nos. 8,176,957; 8,104,524 or in U.S. Patent application 61/611,300, the subject matter of which is incorporated herein by reference.

Vehicle 2 further includes a frame 20 (FIG. 6) supported by the plurality of ground engaging members 4. Frame 20 supports a vehicle body 22 and a rear cargo support area 24. Vehicle 2 defines an operator area 30 which includes seating 32 for one or more passengers. Operator area 30 further includes a plurality of operator controls 34 by which an operator may provide input into the control of vehicle 2.

Operator area 30 and controls 34 may further include a portion of an HVAC system for the comfort of the operator and the passengers.

Controls 34 include a steering wheel 36 which is rotated by the operator to change the orientation of one or more of ground engaging members 6, to steer vehicle 2. Controls 34 also include a first foot pedal 38 actuable by the operator to control the acceleration and speed of vehicle 2 through the control of an engine described in more detail herein. Controls 34 also include a second foot pedal 40 to control the braking and deceleration of vehicle 2.

Figure 3:
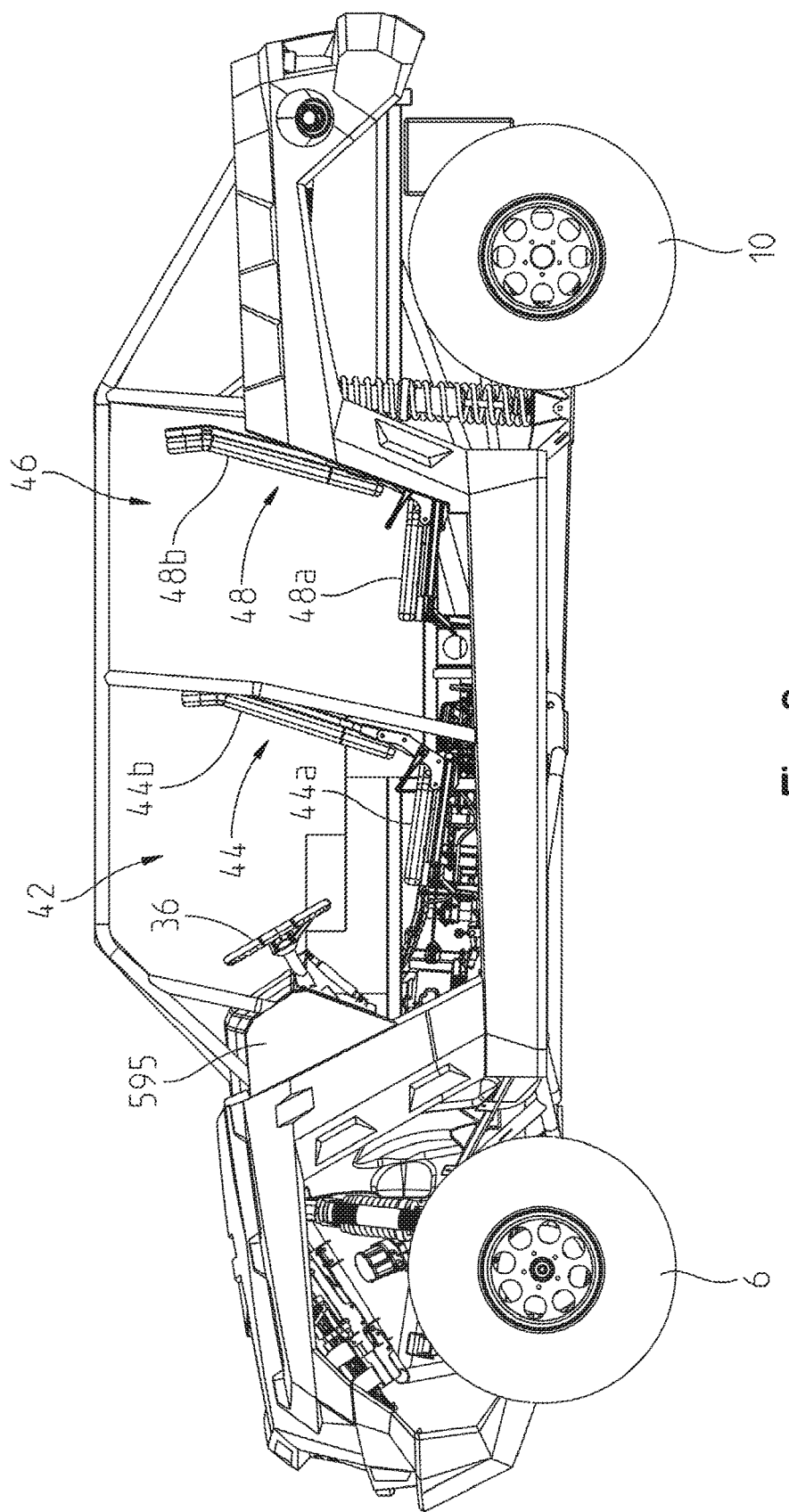
FIG. 3 is a left side view of the vehicle of FIG. 1.
Figure 4:
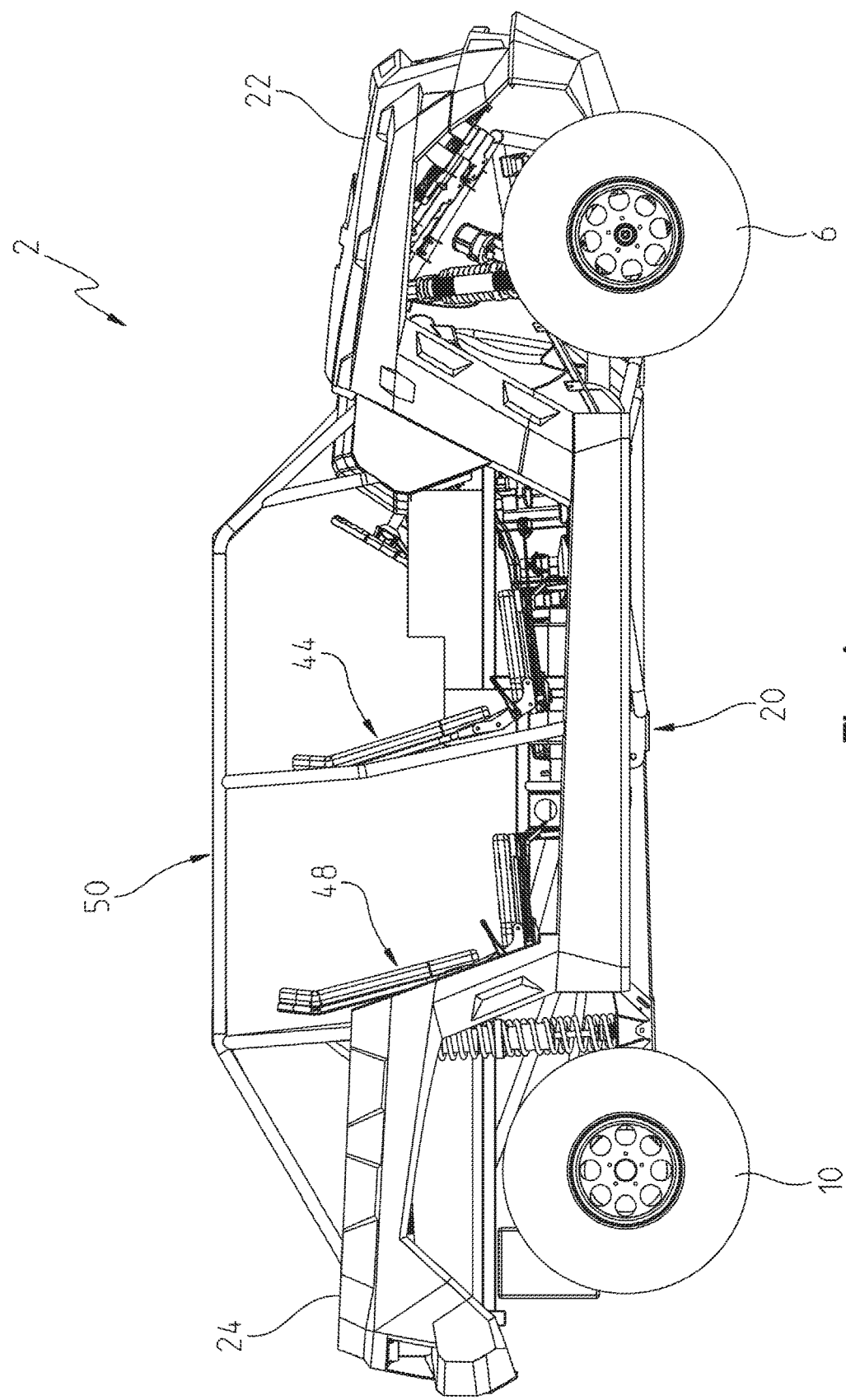
FIG. 4 is a right side view of the vehicle of FIG. 1.
Figure 5:
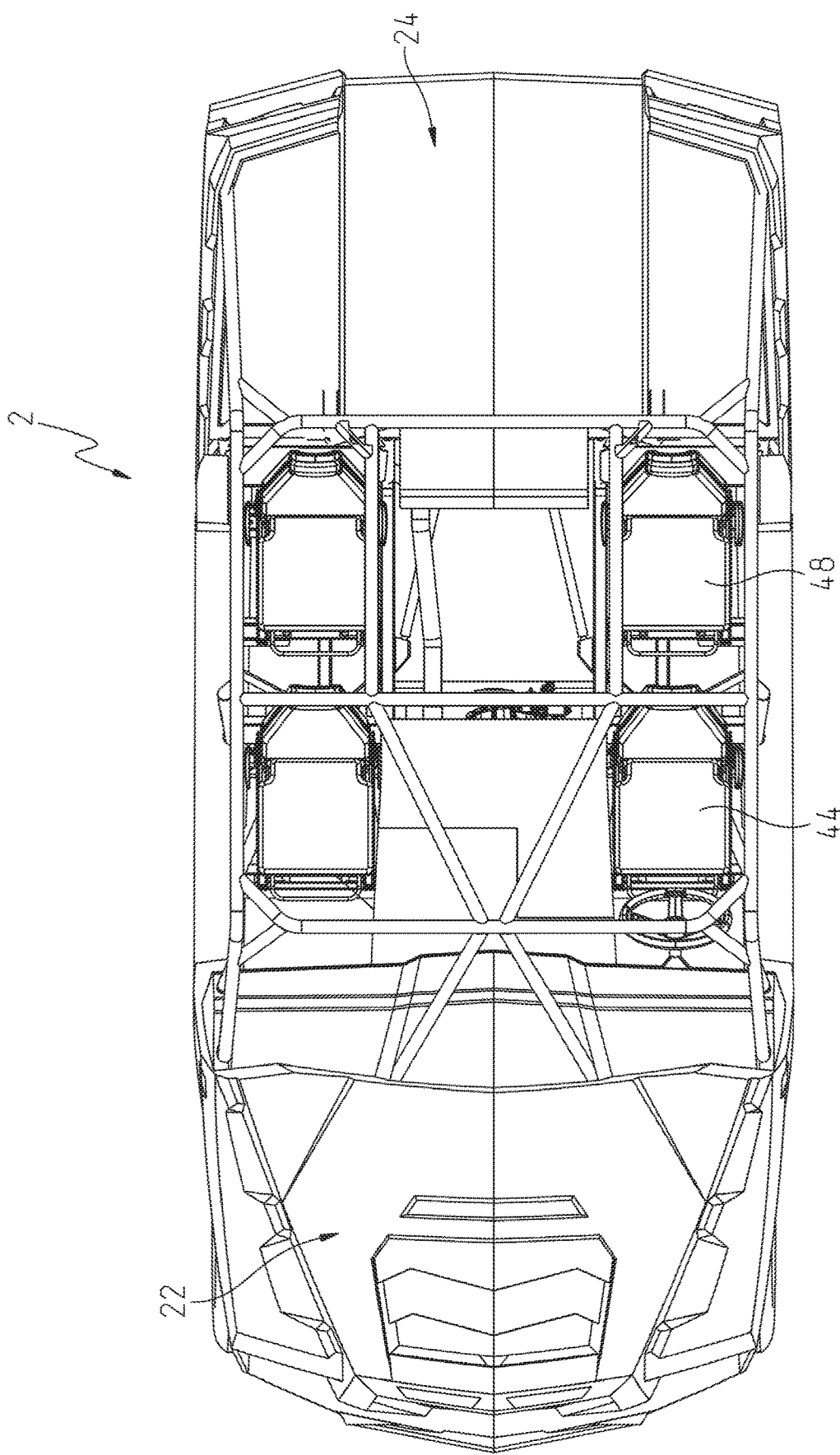
FIG. 5 is a top view of the vehicle of FIG. 1.

As shown in FIG. 3, operator area 30 further includes a front seating area 42 having front seats 44, with seat bottoms 44a and seat backs 44b; and rear seating area 46 having seats 48, with seat bottoms 48a and seat backs 48b. While not shown operator area 30 could further includes passenger seat belts and harnesses for securing the passenger in their respective seats 44, 48, as more fully described in U.S. patent application Ser. No. 12/484,888, incorporated herein by reference. Furthermore, operator area could include side nets, again to add further security to the passengers, as more fully described in U.S. patent application Ser. No. 12/796,495 incorporated herein by reference.

Frame 20 includes a portion 50 extending above operator area 30. Portion 50 is provided to protect the occupants of operator area 30 if vehicle 2 tips or rolls over. In the illustrated embodiment, portion 50 is a roll cage. In one embodiment, portion 50 may be moveable from a first position protecting operator area 30 to a second position which provides vehicle 2 with a smaller envelope than when portion 50 is in the first position. Additional details about exemplary moveable portions are provided in U.S. Pat. No. 7,871,106. In a second embodiment, portion 50 may be collapsible from a first position to a second position as shown in U.S. Patent application Ser. No. 61/617,844, the subject matter of which is incorporated herein by reference.

Figure 9:
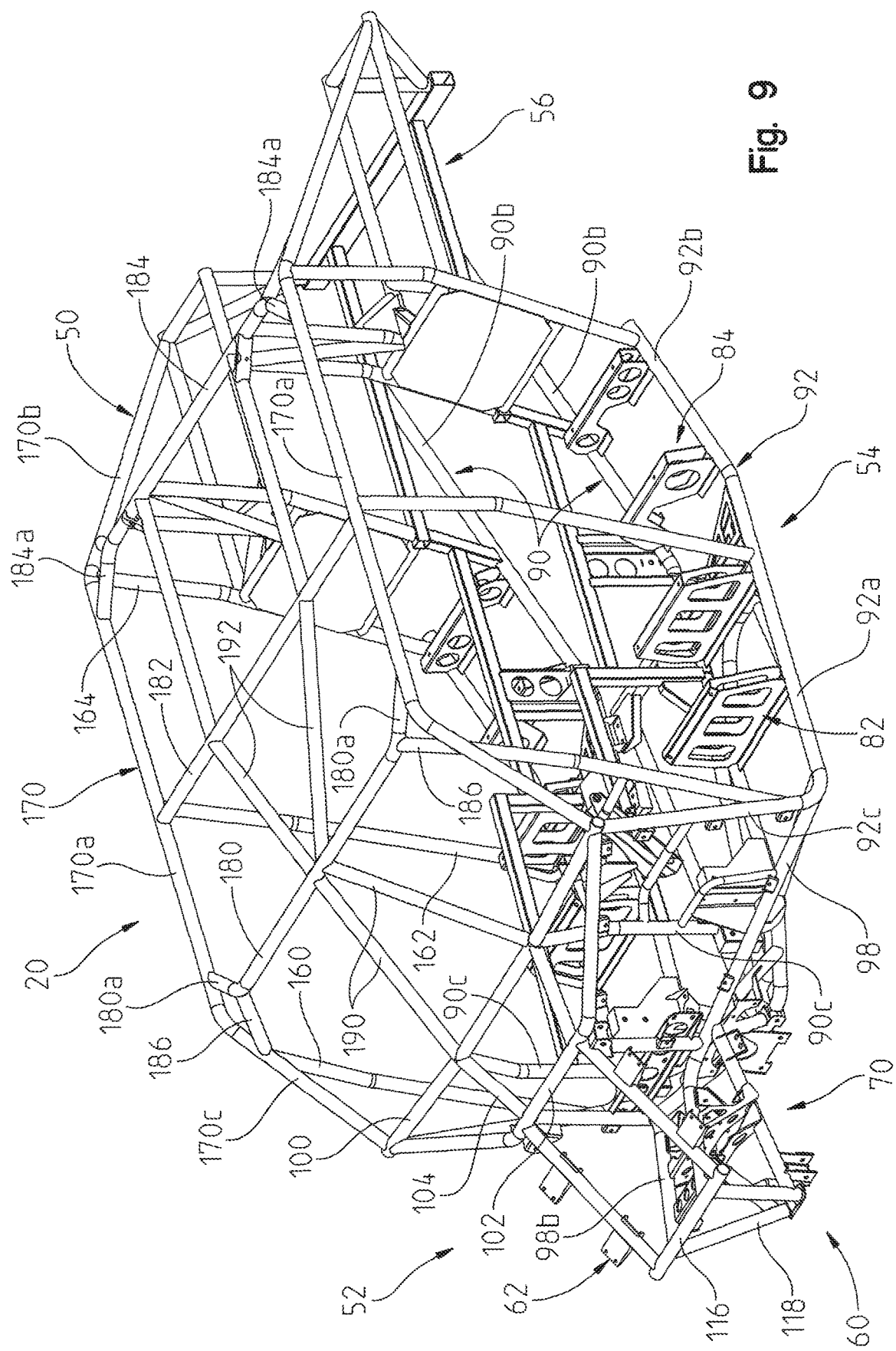
FIG. 9 is a front left perspective view of the frame for the vehicle of FIG. 1.
Figure 10:
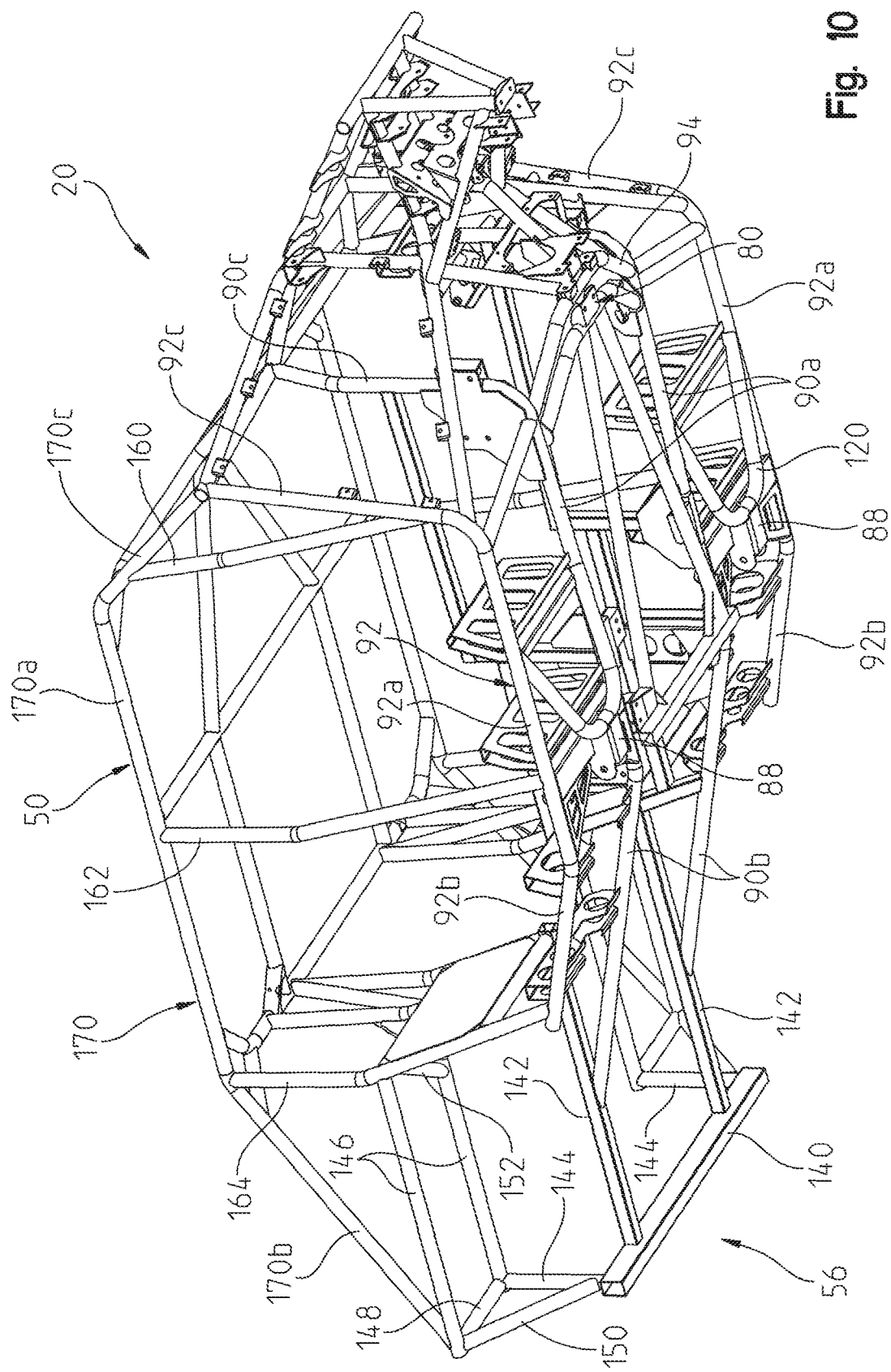
FIG. 10 is a front underside perspective view of the frame of FIG. 9.
Figure 16:
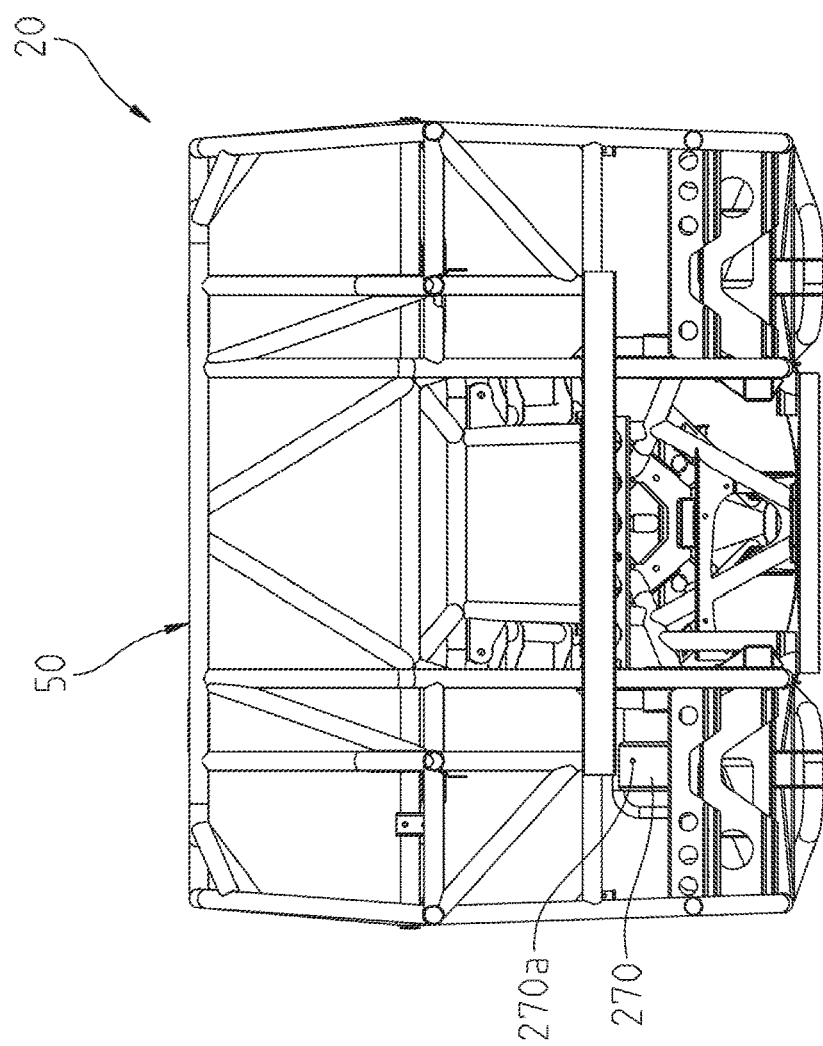
FIG. 16 is a rear view of the frame of FIG. 9.
Figure 17:
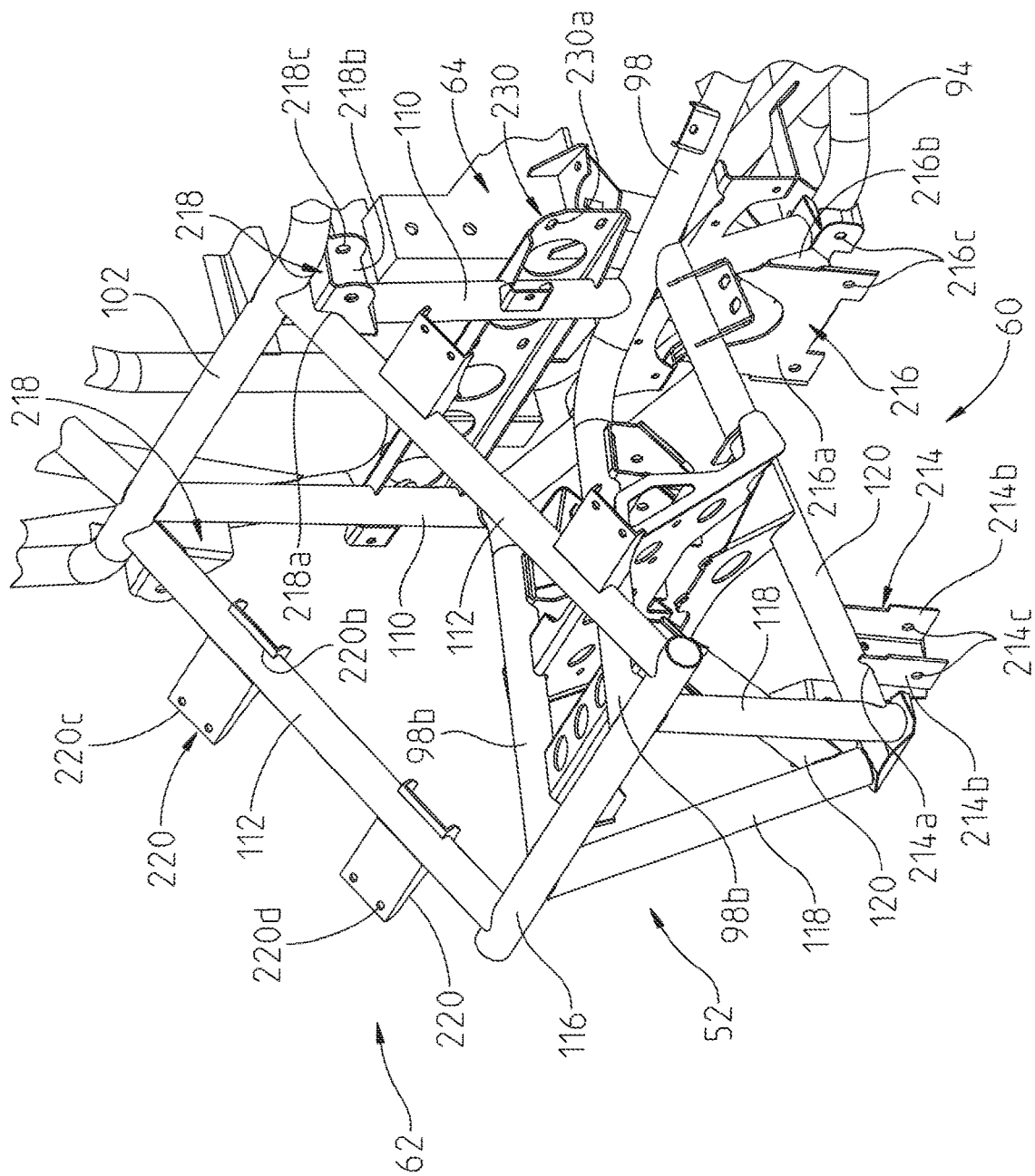
FIG. 17 is an enlarged perspective view, partially broken away, of the frame shown in FIG. 9.
Figure 18:
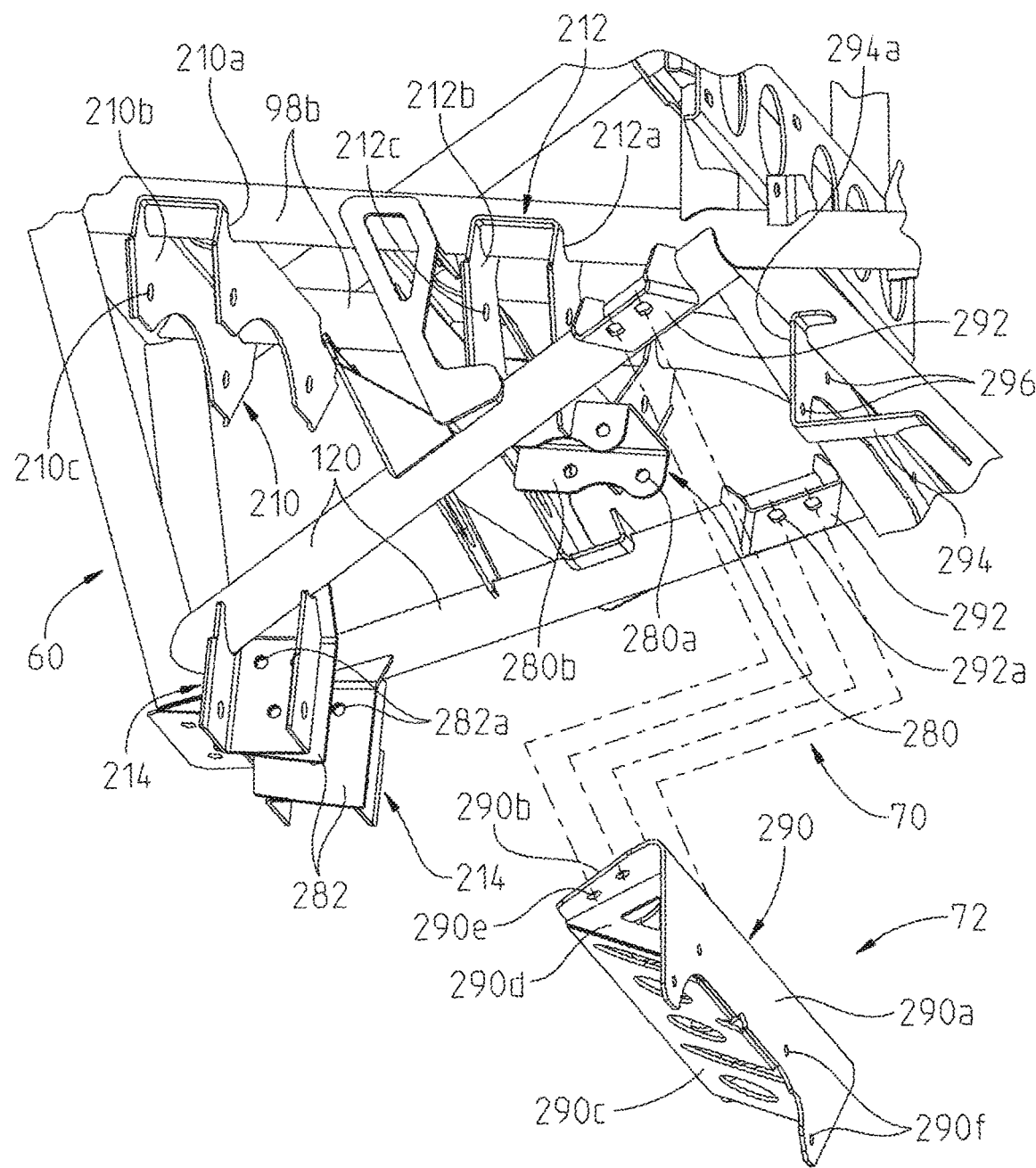
FIG. 18 is an underside perspective view, partially broken away, of the frame showing the front transfer case mount.

With reference now to FIGS. 9-18, frame 20 will be described in greater detail. As shown best in FIG. 9, frame 20 includes front section 52, midsection 54, and rear section 56. In addition to providing the structural rigidity for the vehicle, each frame section provides mounting accessories for mounting various vehicle components. Front section 52 includes a front suspension mount 60, radiator mount 62, steering mount 64 (FIG. 11), engine mount 66 (FIG. 11), controls mount 68 (FIG. 11), front differential mount 70 (FIG. 9), and front transfer case mount 72 (FIG. 18). As shown in FIG. 10, frame 20 further includes a removable section 80 providing lower access to the frame for the addition and removal of a powertrain as described herein in greater detail.

Figure 22:
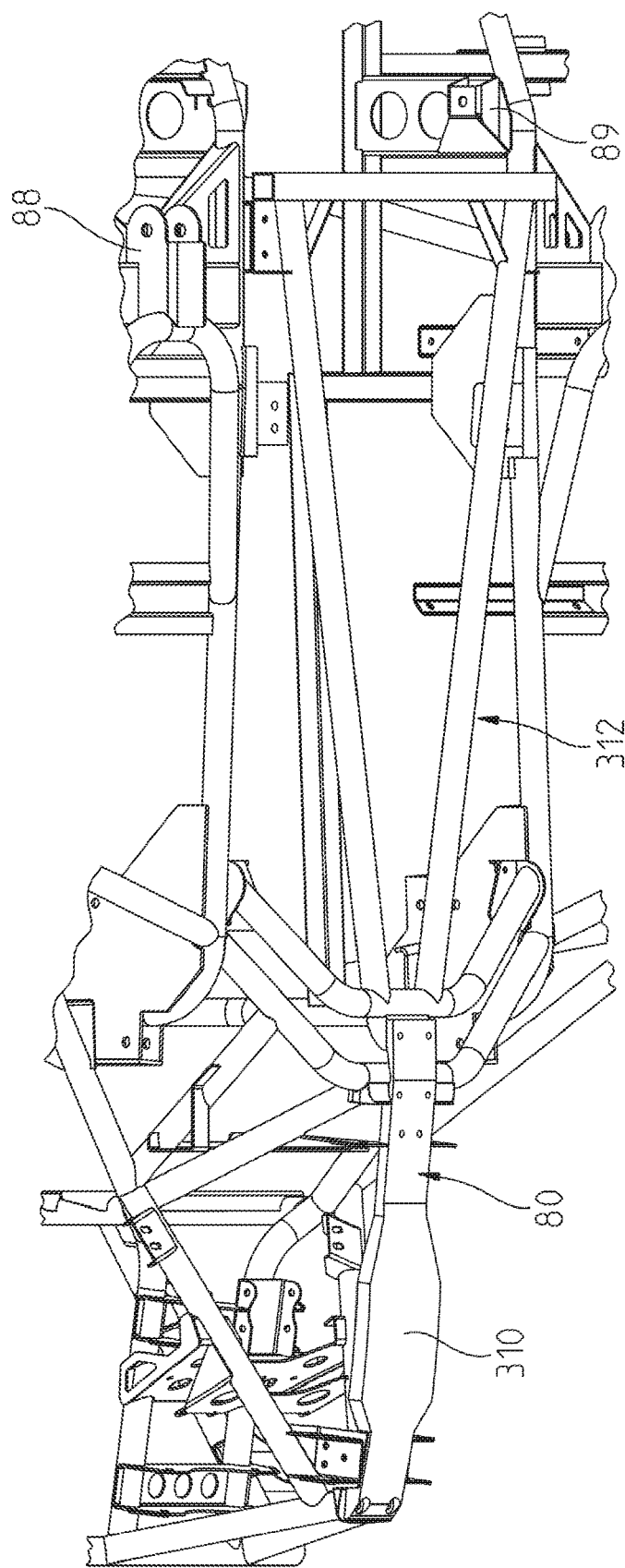
FIG. 22 shows an underside perspective view of the frame, and in particular, the removable portion of the frame.

Midsection 54 includes front seating supports 82 and rear seating supports 84. Finally, rear section 56 includes rear shock mounts 86 (FIG. 11), and rear suspension mounts 88 (FIG. 10) and 89 (FIG. 22). With reference now to FIGS. 9-18, the structural components of the frame will be described in greater detail.

Figure 14:
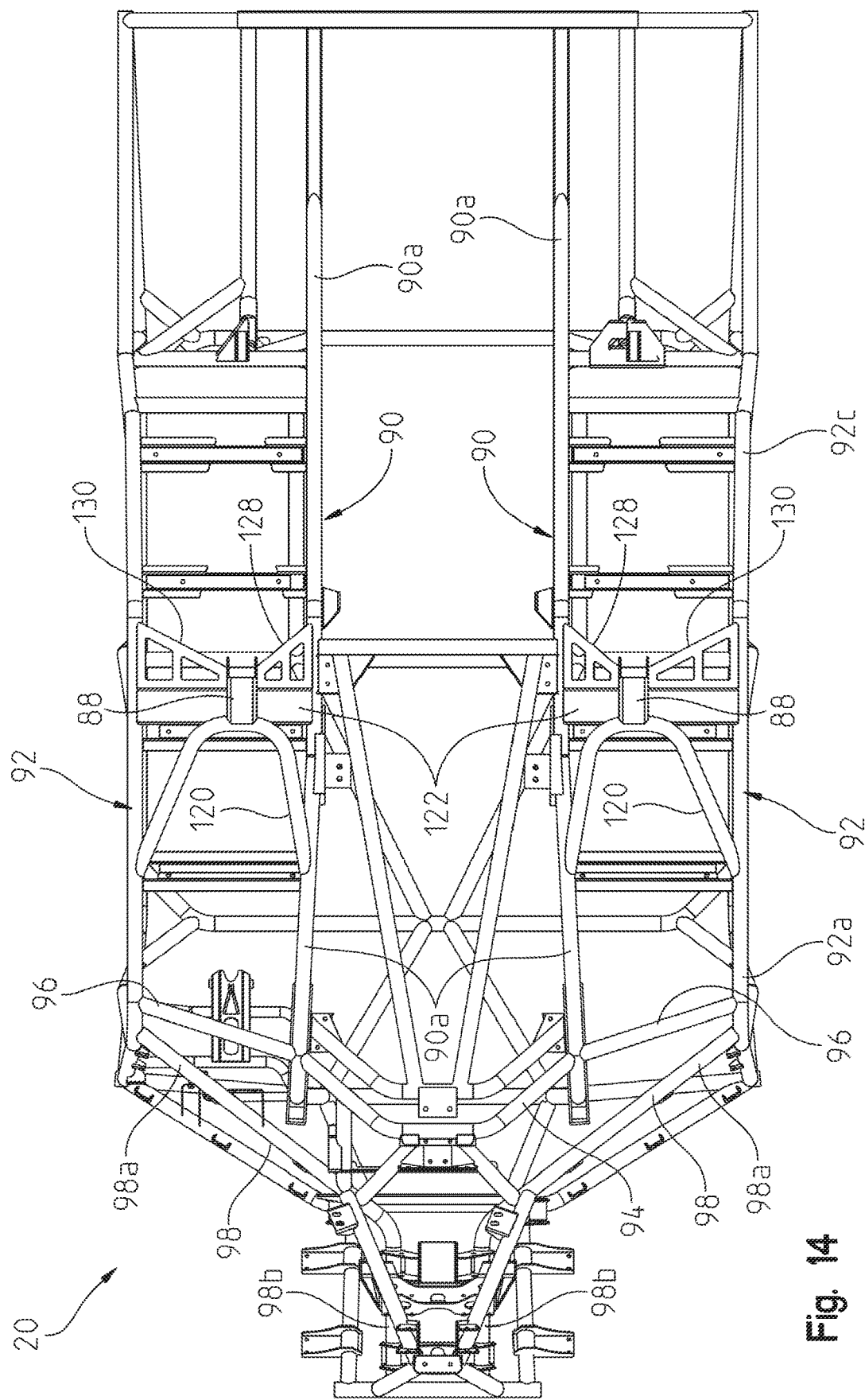
FIG. 14 is a bottom view of the frame of FIG. 9.

As shown best in FIGS. 9 and 14, frame 20 includes longitudinally extending frame tubes 90, which include generally horizontally extending portions 90a (FIG. 10) and rearwardly and upwardly extending portions 90b. Meanwhile a vertically extending portion 90c extends vertically upwardly from the generally horizontally extending portions 90a. Frame tubes 92 extend generally parallel to frame tube 90 having generally horizontally extending sections 92a, rearwardly and upwardly extending sections 92b and front and vertically extending sections 92c. As shown in FIG. 10, frame tubes 92 flank frame tubes 90 and sections 90a, 92a; 90b, 92b; and 90c and 92c are generally parallel with each other.

As shown best in FIG. 14, a U-shaped tube 94, couples frame tubes 90 together from an inside position and frame tubes 96 couple together frame tubes 90 and 92. As shown in FIGS. 9 and 14, frame tubes 98 couple to frame tubes 92 at a portion 98a, and couple to frame tube portion 92a at a portion 98b. Tube portions 98a extend in a generally longitudinally extending direction and in a closely spaced apart position as shown in FIG. 14. As shown best FIG. 9, cross tube 100 extends across frame 20 and is coupled to top ends of frame tubes 90c and 92c. A second cross tube 102 extends in a somewhat C-shape and is coupled at it ends to cross tube 100 and is further coupled by frame tubes 104.

With reference now to FIG. 17, upstanding frame tubes 110 extend between frame tubes 98 and cross tube 102, and frame tubes 112 extend forwardly from cross tube 102 and couple to cross tube 116. Front frame tubes 118 extend downwardly from cross tube 116 and couple with frame tubes 120, which in turn couple with frame tubes 98. As best shown in FIG. 14, frame 20 further includes U-shaped frame tubes 120, which extend between frame tubes 90 and 92, and couple with channels 122 to which rear suspension mounts 88 are mounted, as described in greater detail herein. Frame 20 is further fortified by triangular truss plates 128, 130.

With reference now to FIG. 10, rear frame portion 56 will be described. Rear frame portion 56 includes rear cross tube 140 coupled to frame tubes 142, which in turn couple to frame tubes 90b. Rear frame portion 56 further includes upstanding frame tubes 144, longitudinally extending frame tubes 146, and connecting tubes 148, 150 and 152.

Figure 11:
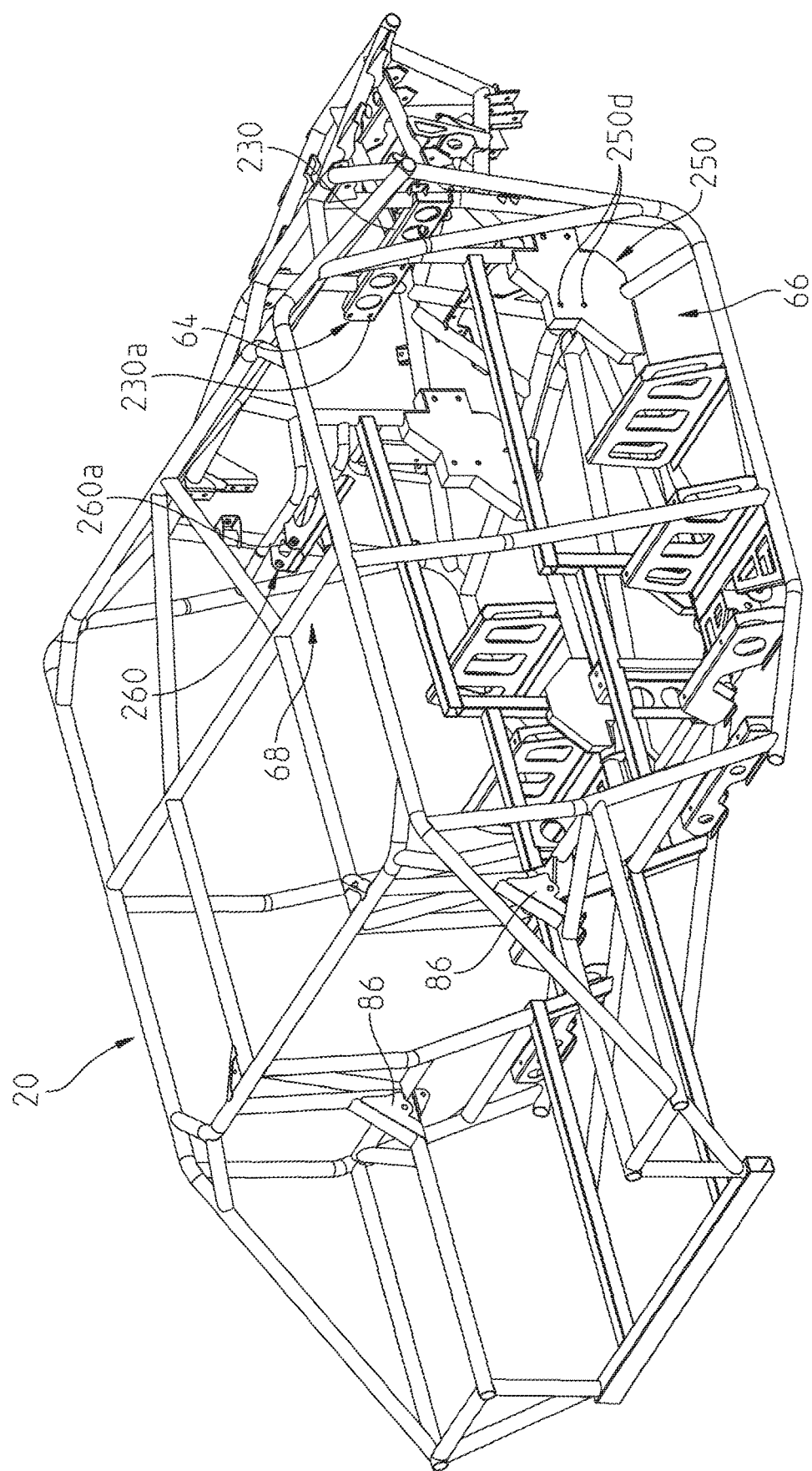
FIG. 11 is a topside perspective view of the frame of FIG. 9.
Figure 12:
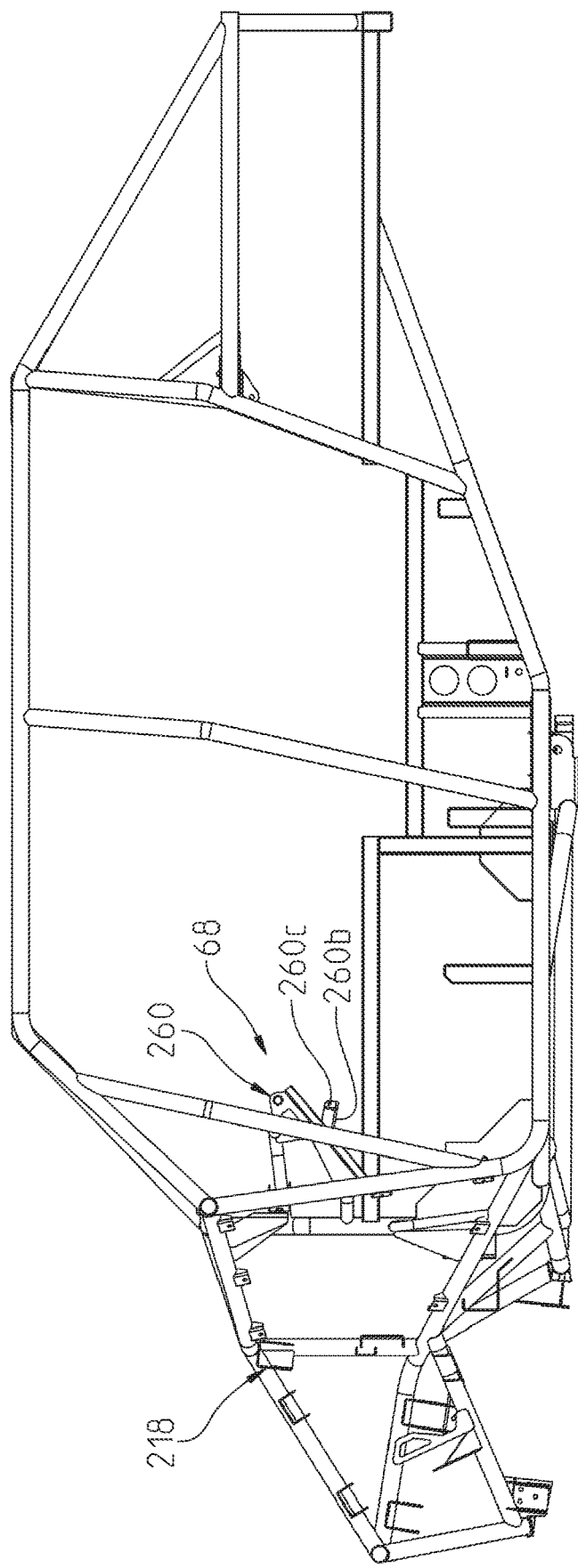
FIG. 12 is a left side view of the frame of FIG. 9.
Figure 13:
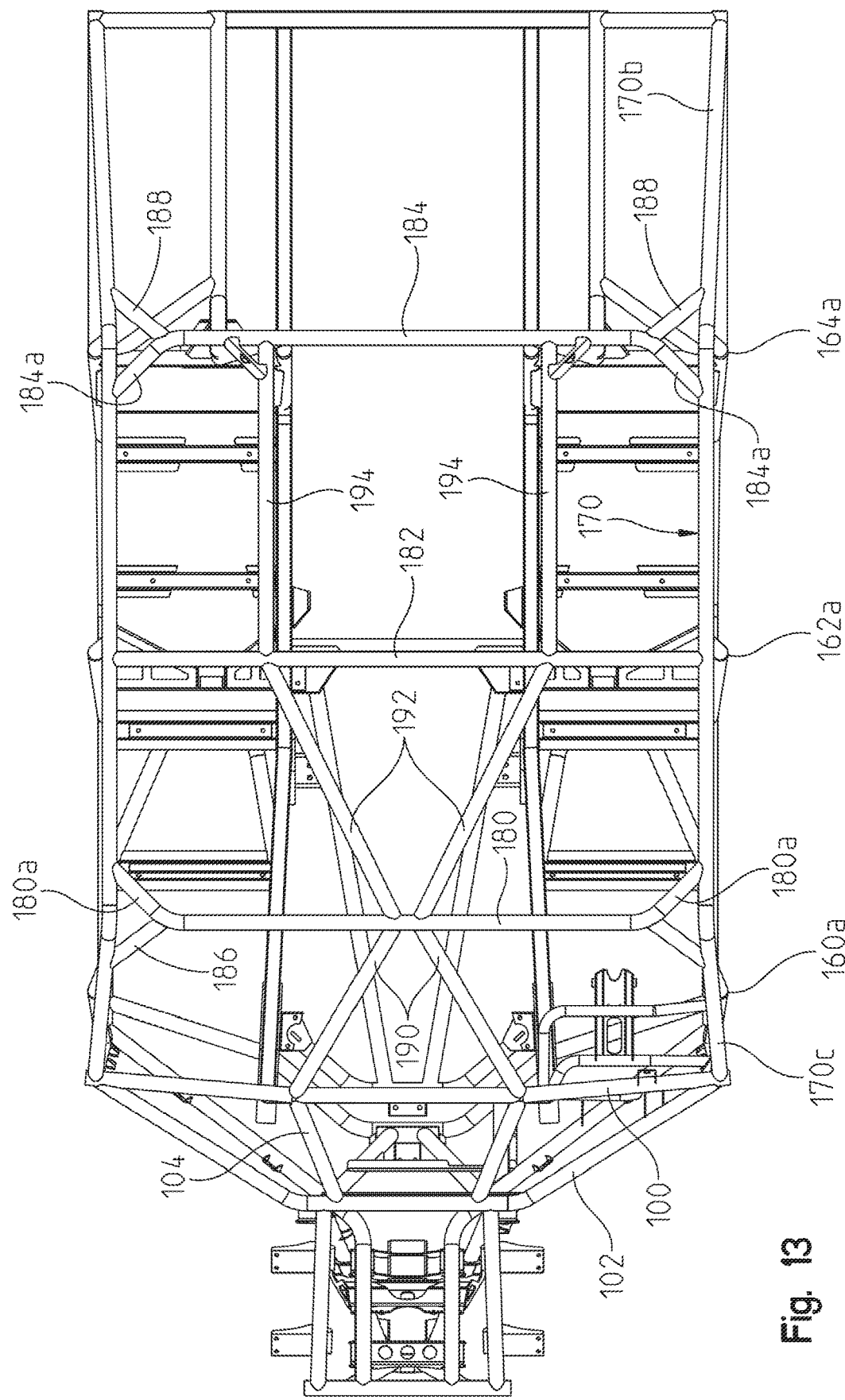
FIG. 13 is a top view of the frame of FIG. 9.

With reference now to FIGS. 9-13, upper structure 50 will be described in greater detail. As shown first in FIG. 10, upper structure 50 includes outer vertically extending members 160, 162, and 164. An outer and upper tube 170 is coupled to a top portion of each of the vertically extending members 160, 162, 164 and includes a generally horizontal section 170a, a rearwardly and downwardly extending section 170b, and a front and generally downwardly extending section 170c. As shown, vertically extending members 162 and 164 are coupled to tube portion 170a, and vertically extending member 160 is coupled to front section 170c. Rearward portion 170b extends between vertically extending member 164 and frame tubes 146. As shown in FIG. 13, each of the vertically extending members 160, 162, and 164, include an outward most point 160a, 162a, 164a, respectively, which is wider than the frame in order to protect the occupants of the vehicle in case of a rollover.

As shown best in FIG. 9, three cross tubes 180, 182, and 184, together with upper tubes 170a forming a substantial part of the overhead canopy. Cross tubes 180 are coupled to frame tubes 170 at end portions 180a and by two portions 186 forming a triangular connection point. Cross tube 180 is coupled to cross tube 100 by way of frame tubes 190, and cross tube 180 is coupled to cross tube 182 by way of frame tubes 192. Rear cross tube 184 is coupled to frame tubes 170 by way of sections 184a and by way of coupling tubes 188 (FIG. 13). Cross tube 182 is coupled to cross tube 184 by way of frame tubes 194.

With the structural frame as described above, the mounting sections will now be described with reference to FIGS. 9-18.

With reference now to FIGS. 17 and 18, front suspension mount 60 will be described in greater detail. With reference first to FIG. 18, front suspension mount 60 includes first and second brackets 210, 212 which are coupled between front frame tube portions 98b. Each of the brackets 210 and 212 include U-shaped cut-out portions 210a, 212a, respectively, to receive therein the tube portions 98B. Each of the brackets further includes sidewalls 210b and 212b, respectively, having apertures 210c and 212c, respectively, for mounting of the front suspension as further described herein. In a like manner, front suspension mount 60 includes a lower bracket 214; (FIG. 17), having a cylindrical cutout 214a for coupling to tube 120. Bracket 214 also includes sidewalls 214b providing an aperture at 214c for mounting a suspension arm as further provided herein. As also shown in FIG. 17, front suspension mount 60 includes a bracket 216 having sidewalls 216a, 216b defining apertures 216c for mounting a lower control arm of front suspension as further described herein. Bracket 216 also includes apertures 216d (FIG. 23) at an underside thereof, as described in further detail herein. Front suspension mount 60 further includes a top bracket 218 having U-shaped cutouts at 218a for attachment to frame tubes 112, sidewalls 218b, and apertures 218c. Brackets 218 provide a mounting structure for a front shock absorber as described herein.

With reference now to FIG. 17, radiator mount section is shown at 62 being defined by brackets 220 and having U-shaped cutouts at 220b to be received over frame tubes 112. This positions a top face 220c of bracket 220 in a planar relationship with other brackets 220 for mounting of a radiator as further described herein.

Figure 20:
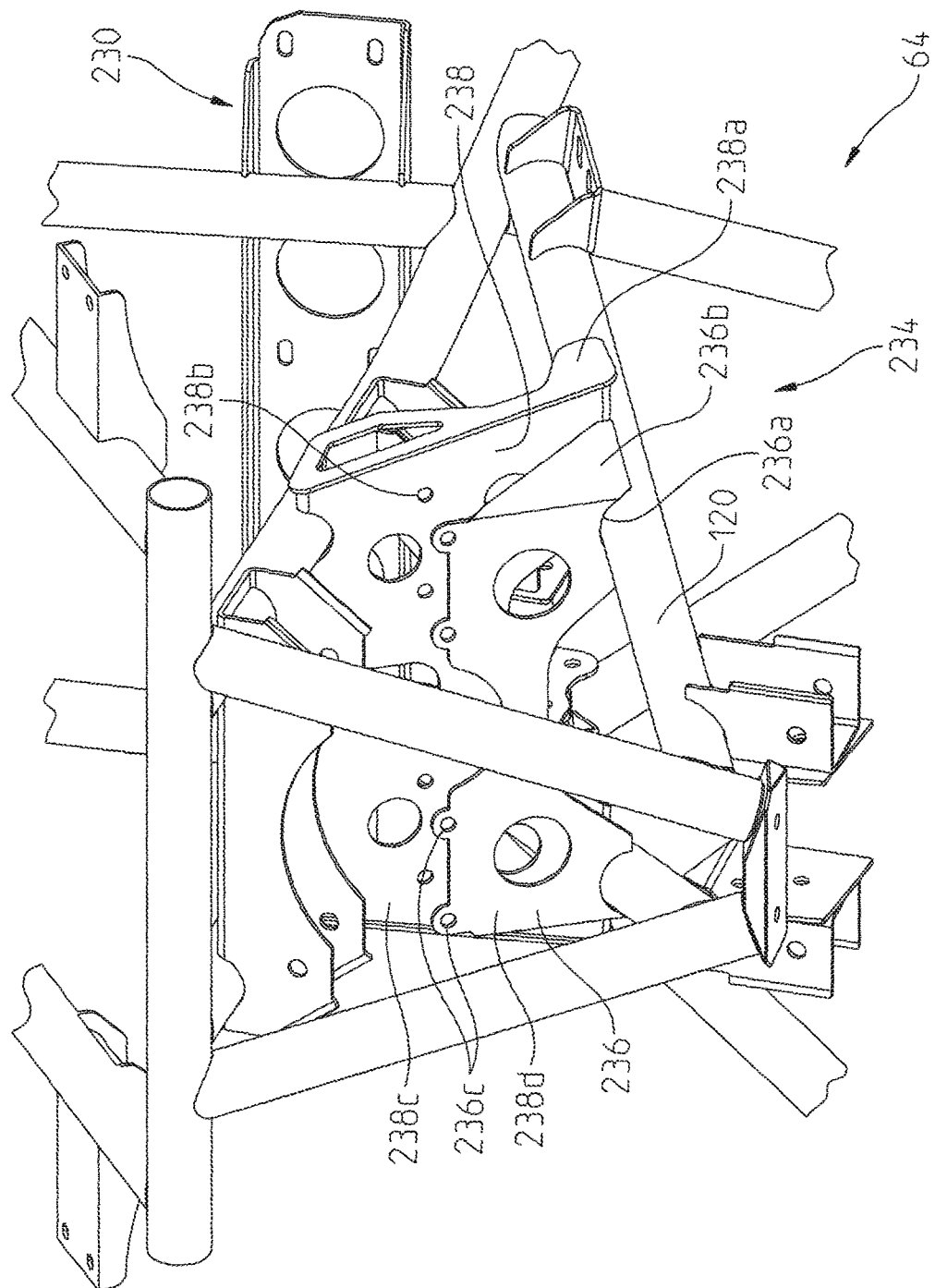
FIG. 20 is a front perspective view, partially broken away, of the frame showing the steering rack and pinion mount.

With reference now FIGS. 11 and 17, steering mount section 64 will be described in greater detail. As shown, a first bracket 230 is provided, which extends across and is coupled to vertical frame tubes 110. A plurality of apertures 230a are provided for coupling a first steering mechanism as further described herein. With reference now to FIG. 20 steering mount section 64 includes a second bracket assembly 234. Bracket assembly 234 includes a first bracket 236 having a cutout portion at 236a and a flange 236b for mounting of the bracket 236 to frame tubes 120. Mounting apertures 236c are provided on bracket plate portion 238d for mounting of the steering assembly as further described herein. Bracket assembly 234 includes a second bracket 238 having a flange 238a for mounting bracket 238 to the frame tubes 120. Mounting apertures 238b are provided on bracket plate portion 238c for mounting of the steering assembly as further described herein. As shown, apertures 236c are longitudinally aligned with apertures 238b, for receiving a fastener therethrough as described herein.

Figure 19:
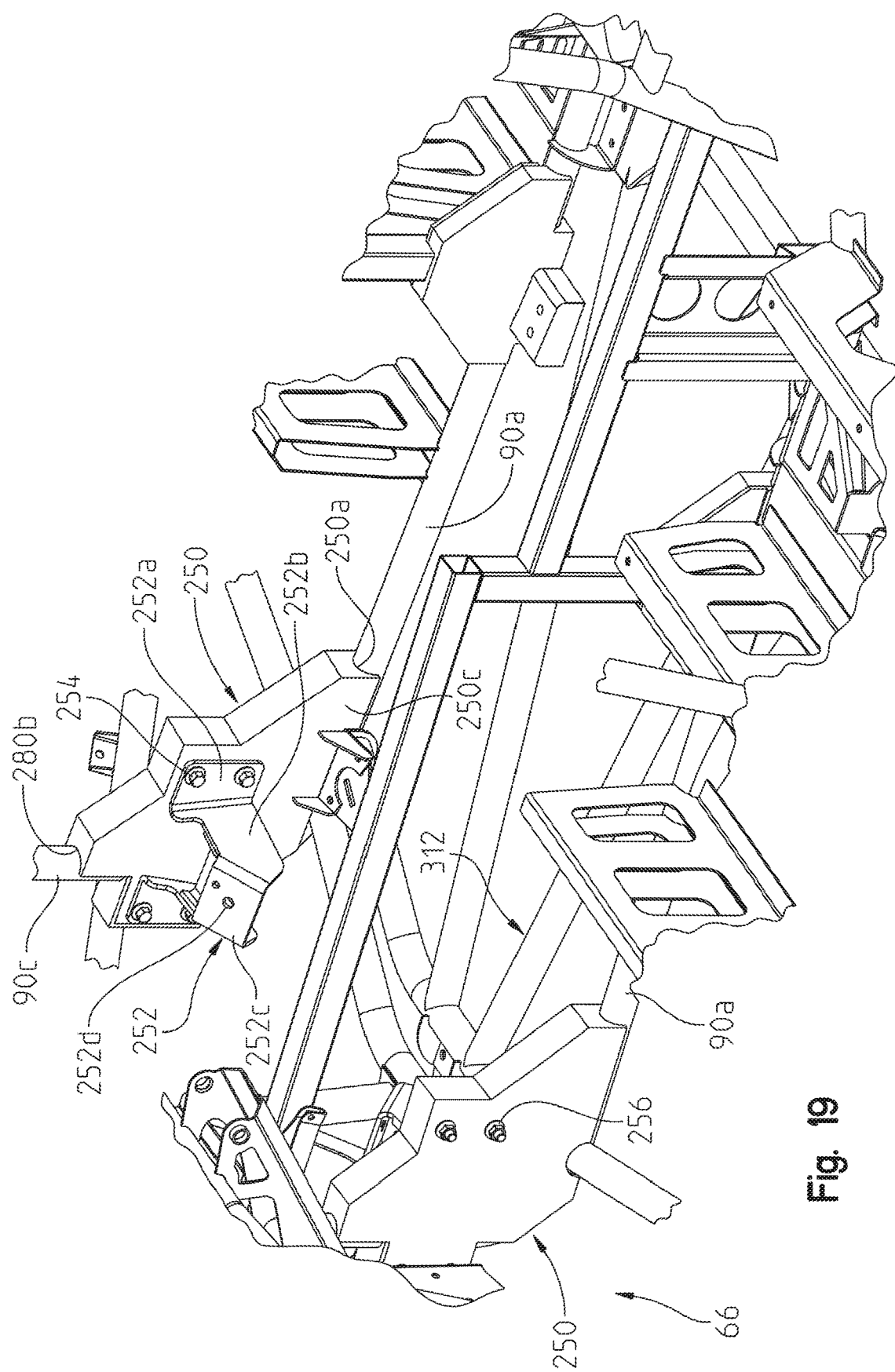
FIG. 19 is a perspective view, partially broken away, of the frame showing the engine mount.

With reference now to FIGS. 11 and 19, engine mount section 66 will be described in greater detail. As shown best in FIG. 19, engine mount section 66 includes a bracket 250 having U-shaped cutouts 250a for overlying frame tube 90a and U-shaped cutouts 250b for overlying frame tube portion 90c. Bracket 250 includes an internal surface 250c having a bracket 252 mounted thereto. Bracket 250 receives fasteners 254 therethrough, and fasteners 254 and 256 attach bracket 252 thereto. Bracket 252 includes flanges 252a for mounting against surface 250c and for receipt therethrough of fasteners 254. Bracket arms 252b and support plate 252c are also provided for support of an engine as described further herein. An aperture 252d allows mounting of the engine to bracket 252 as described in further detail herein.

Figure 15:
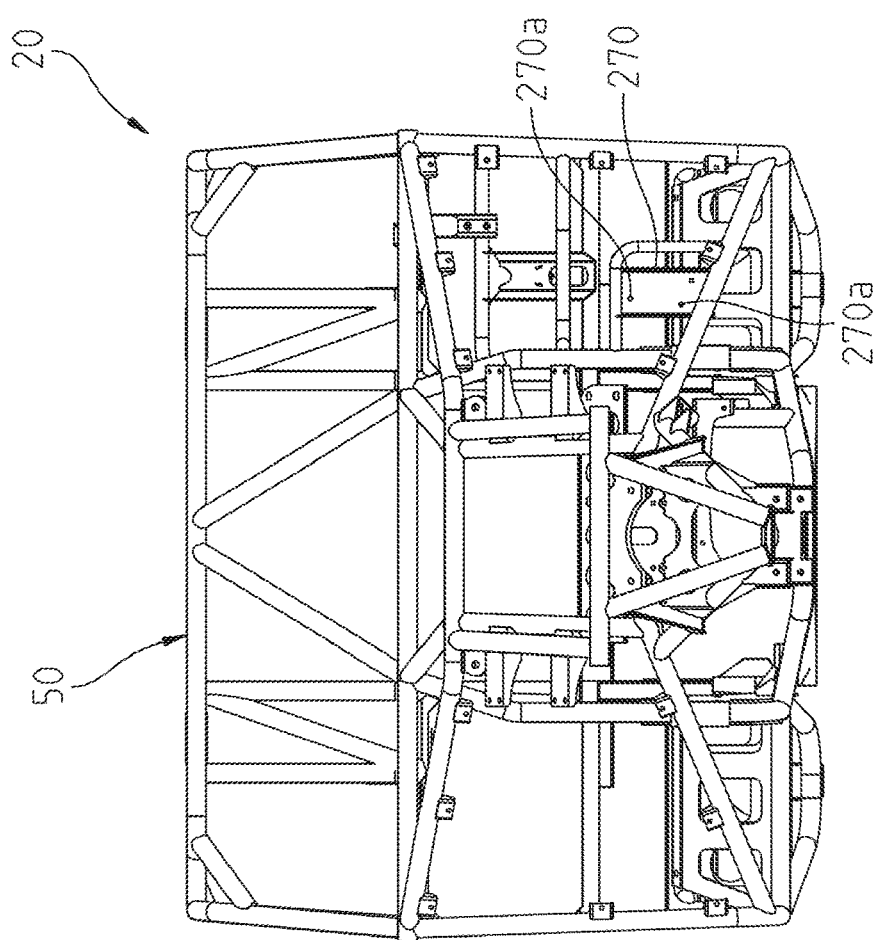
FIG. 15 is a front view of the frame of FIG. 9.

With reference now to FIGS. 11, 12, 15, and 16, the controls mount 68 will be described in greater detail. As shown in FIGS. 11 and 12, the controls mounts 68 includes a steering control bracket 260 coupled to the frame 20 defined as a U-shaped channel (FIG. 11) having a mounting aperture at 260a, and a mounting leg at 260b (FIG. 12) providing a mounting aperture at 260c. As shown in FIGS. 15 and 16, a bracket 270 is shown for at least one foot control having apertures at 270a.

With reference again to FIG. 18, front differential mount 70 will be described. As shown, a bracket 280 is coupled to a lower edge of bracket 212 having mounting apertures 280a positioned through sidewalls 280b of bracket 280. Furthermore, bracket 214 includes two plate portions 282 attached thereto defining apertures 282a for attachment to front differential, as described further herein.

With reference still to FIG. 18, front transfer case mount 72 will be described. As shown, mount 72 includes bracket 290 configured in a substantially folded and triangular configuration comprising a rear wall 290a, a front wall 290b, lower wall 290c, and sidewalls 290d. Front wall 290b includes apertures 290e. Rear wall 290a includes mounting apertures 290f. As also shown in FIG. 18, brackets 292 are attached to frame tubes 120 and include apertures at 292a. It should be appreciated that apertures 290e of brackets 72 and apertures 292e of brackets 292 align with each other and that bracket 290 is fixed by way of fasteners through apertures 290e and 292a.

Figure 21:
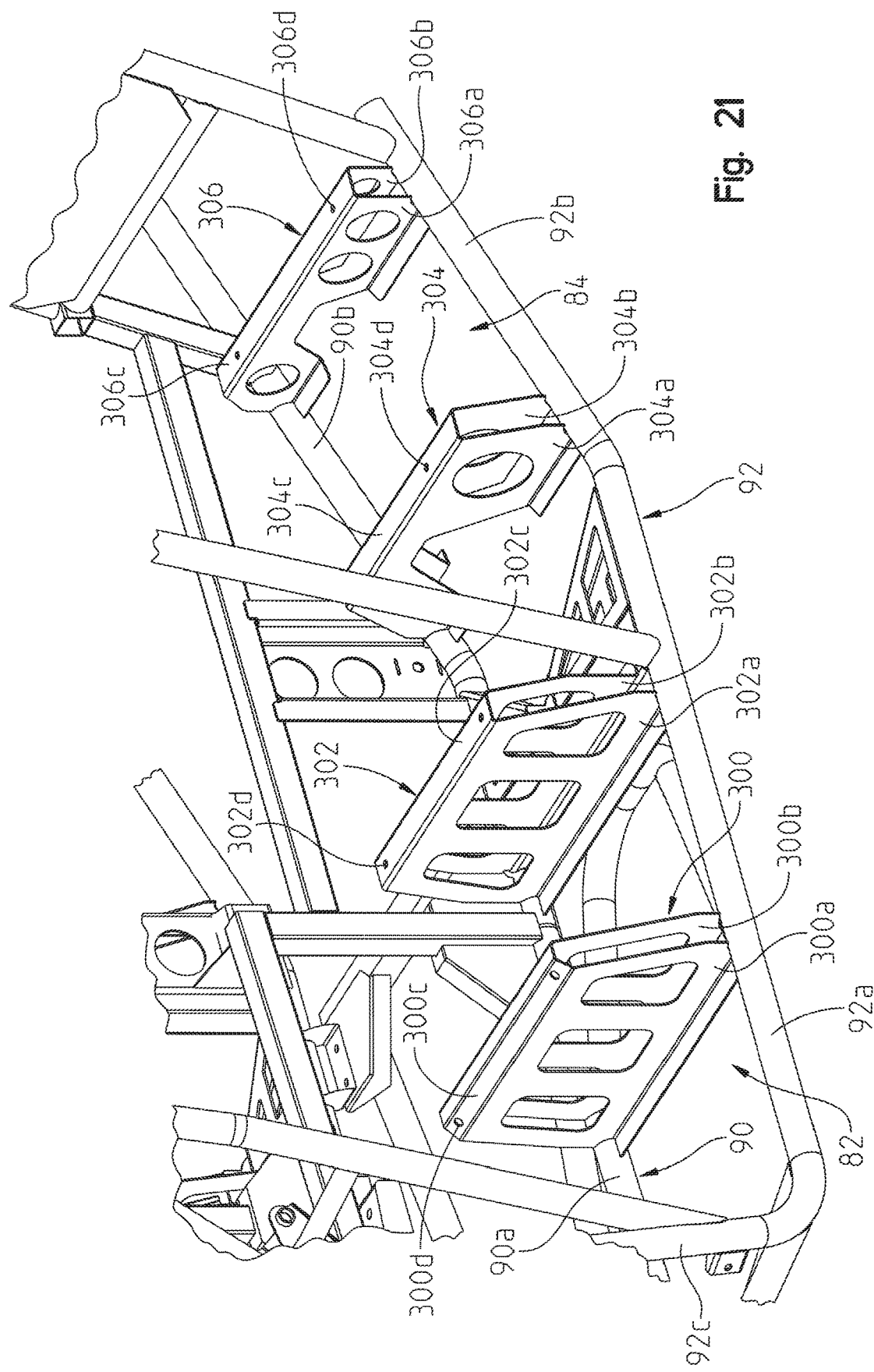
FIG. 21 is an enlarged front perspective view, partially broken away, of the frame showing the seat mounts.

With reference now to FIG. 21, front seating support 82 will be described in greater detail. As shown, support 82 includes first bracket 300 having parallel plate portions 300a, 300b fixedly retained between longitudinal frame tubes 90, 92 and attached at tube portions 90a, 92a. Bracket 300 includes a front edge portion 300c having apertures 300d for attachment of seating as described herein.

With reference still to FIG. 21, front seating support 82 includes second bracket 302 having parallel plate portions 302a, 302b fixedly retained between longitudinal frame tubes 90, 92 and attached at tube portions 90a, 92a. Bracket 302 includes a top edge portion 302c having apertures 302d for attachment of seating as described herein.

With reference still to FIG. 21, rear seating support 82 includes first bracket 304 having parallel plate portions 304a, 304b fixedly retained between longitudinal frame tubes 90, 92 and attached at tube portions 90a, 92b. Bracket 304 includes a top edge portion 304c having apertures 304d for attachment of seating as described herein.

With reference still to FIG. 21, rear seating support 82 includes second bracket 306 having parallel plate portions 306a, 306b fixedly retained between longitudinal frame tubes 90, 92 and attached at tube portions 90b, 92b. Bracket 306 includes a top edge portion 306c having apertures 306d for attachment of seating as described herein.

Figure 23:
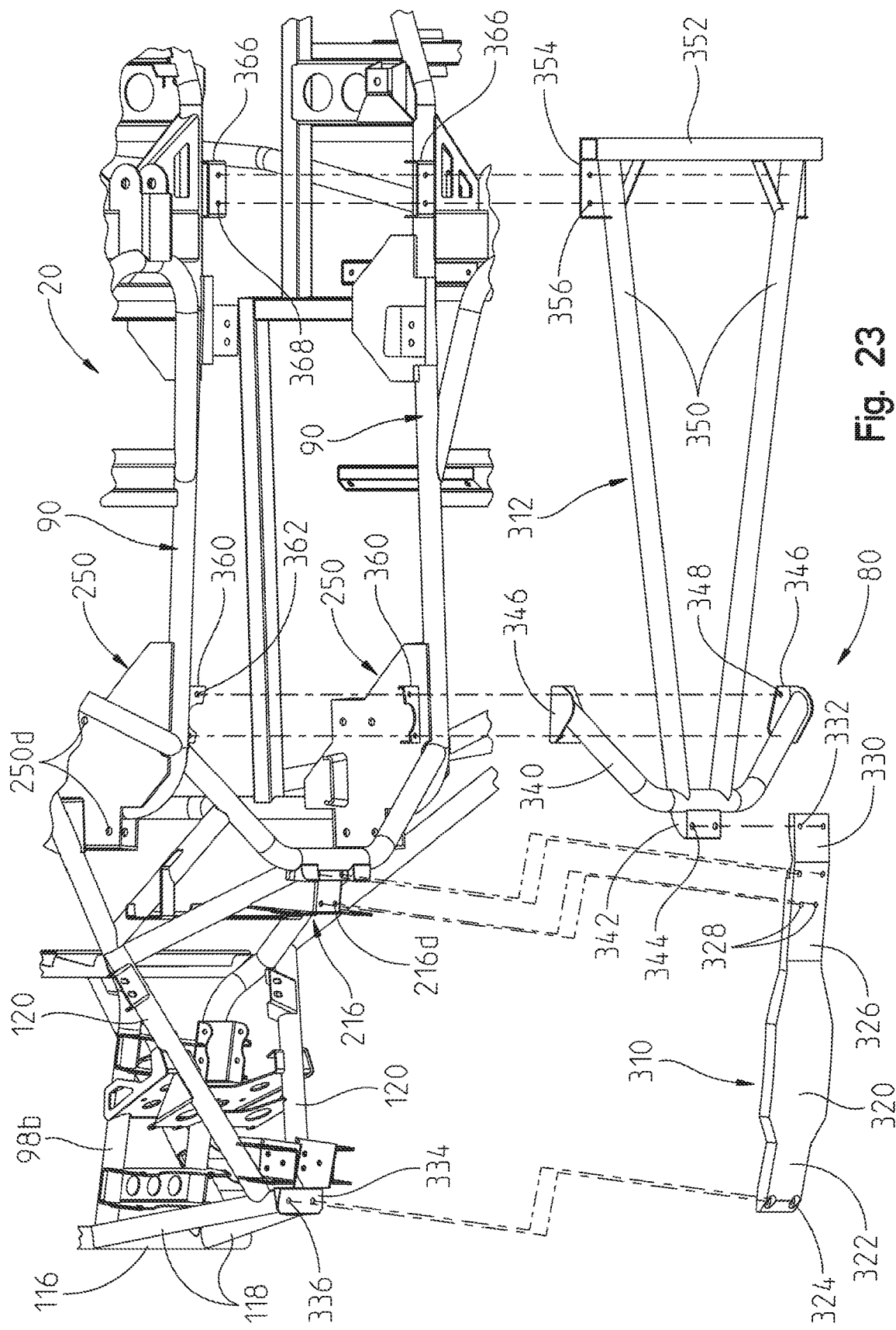
FIG. 23 shows a view similar to that of FIG. 22 with the removable frame exploded away from the remainder of the frame.

With reference now to FIGS. 22 and 23, the frame removable portion 80 will be described in greater detail. As shown, the removable portion 80 includes a front most portion 310 and a rearward portion 312. As shown best in FIG. 23, the front portion 310 includes a skid plate portion 320 having a front connector portion 322 having apertures 324. Portion 310 includes a mid connector portion 326 having apertures 328. A rearward most connector part 330 has apertures 332. As shown best in FIG. 23, the front of frame 20 includes a bracket 334 attached to a lower portion of frame tubes 118 having threaded apertures 336.

Removable frame portion 312 includes a U-shaped tube 340 having a front bracket 342 having apertures 344. Brackets 346 are positioned at opposite ends of tube 340 and include mounting apertures at 348. Rearwardly extending tubes 350 extend from tube 340 and include a rear cross tube 352 and mounting brackets 354 having mounting apertures at 356. Mounting brackets 360 are coupled to inside surfaces of bracket 250 and includes apertures 362. Finally, brackets 366 are mounted to frame tubes 90 and include mounting apertures at 368.

Thus as shown best in FIG. 23, removable frame portion 312 may be positioned with brackets 346 aligned with brackets 360; and with brackets 354 aligned with brackets 366. The removable portion 312 may be fixed to frame tubes 90 by way of fasteners (not shown) through apertures 348, 362; and 356, 368. Removable portion 310 may then be positioned with apertures 324 aligned with apertures 336 in bracket 334; with apertures 328 aligned with apertures 216d; and with apertures 332 aligned with apertures 344 in removable portion 312. Again, fasteners may be used to hold removable portion 310 in position.

Figure 24:
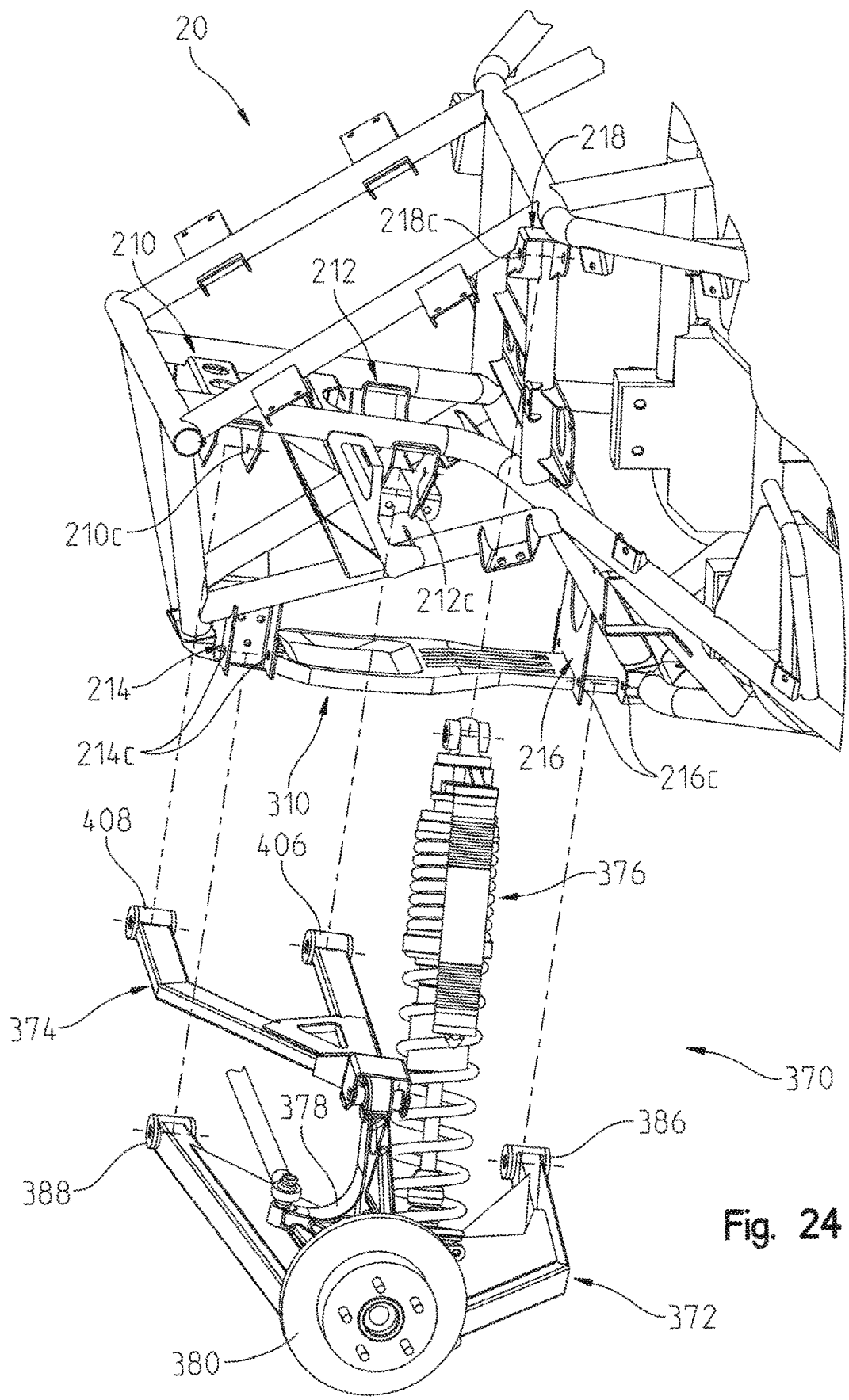
FIG. 24 shows an exploded view of the front suspension system.
Figure 25:
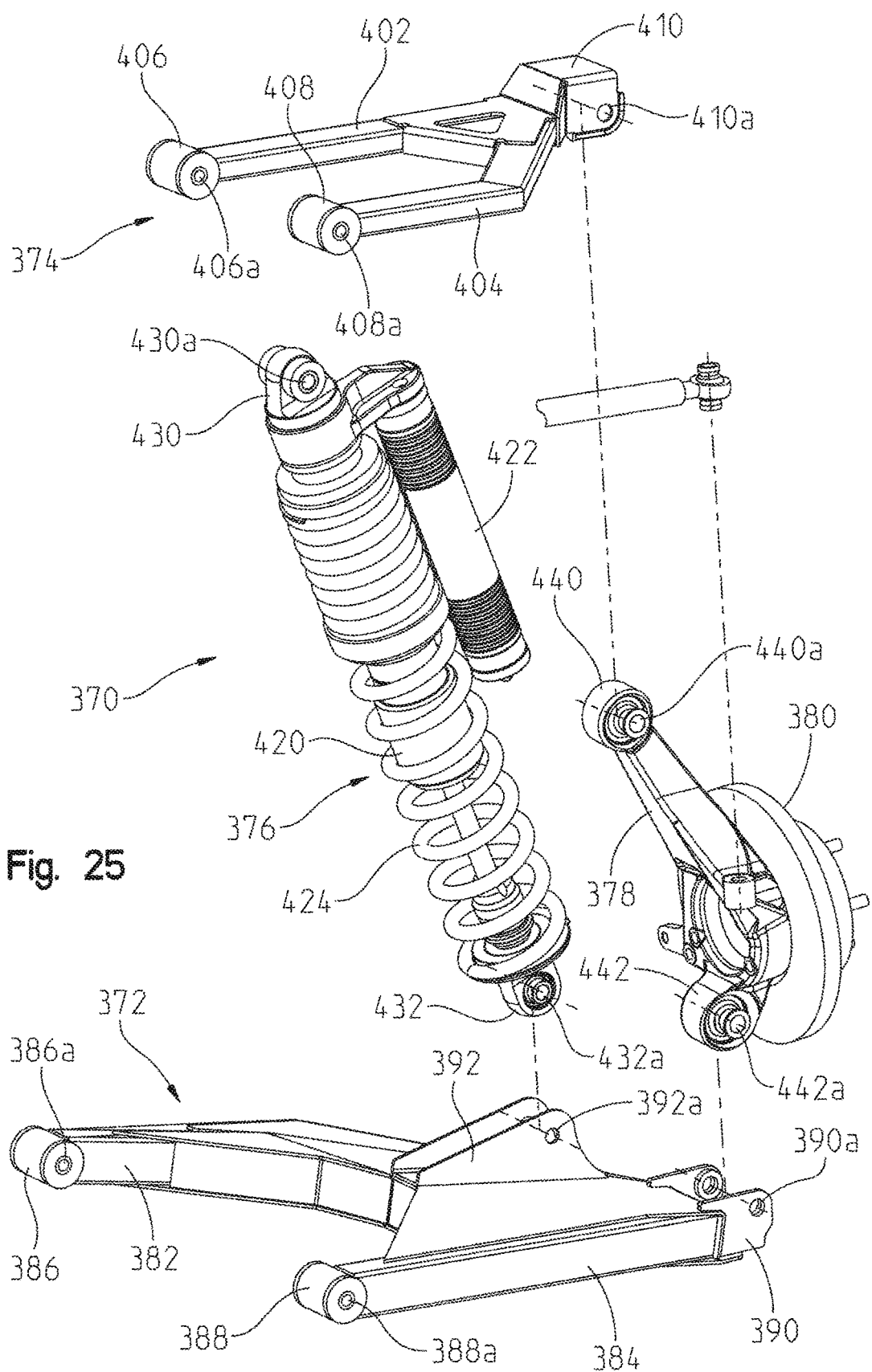
FIG. 25 shows an exploded view of the suspension components of FIG. 24.

With reference now to FIGS. 24 and 25, front suspension 370 will be described in greater detail. As shown, front suspension 370 is generally comprised of a lower control arm 372, upper control arm 374, and shock absorber 376; where upper and lower control arms 374, 372 are coupled to a wheel spindle 378, which in turn is coupled to wheel hub 380. As shown best in FIG. 25, lower control arm 372 is comprised of arm portions 382 and 384 having couplers 386 and 388 at respective ends thereof. Couplers 386 and 388 include mounting apertures at 386a and 388a. Lower control arm 372 further includes a bracket at 390 having a mounting aperture 390a; and an upper bracket at 392 having a mounting aperture 392a.

Upper control arm 374 is similar in nature to lower control arm 372 including arm portions 402 and 404; couplers 406, 408 and mounting apertures at 406a and 408a. A bracket 410 is positioned at an outer most part of control arm 374 and includes apertures at 410a.

Shock absorber 376 includes a gas shock portion 420 having a gas canister at 422 together with an over spring at 424. Shock 376 includes an upper coupler 430 having an aperture at 430a and a lower coupler 432 having an aperture at 432a.

Wheel spindle 378 includes an upper coupler at 440 having an aperture at 440a and a lower coupler 442 having an aperture at 442a.

It should be appreciated that couplers 386, 388 couple with brackets 216, 214, respectively, as best shown in FIG. 24. Fasteners are received through apertures 386a, 216c; and 388a, 214c. It should also be appreciated that upper control arm 374 is coupled to frame 20 by positioning couplers 408, 406 in brackets 210, 212 and by positioning fasteners through respective apertures 210c, 408a; and 212c, 406a. Wheel spindle 378 is thereafter coupled to upper and lower control arms 374, 372 by way of fasteners through apertures 410a, 440a; and 390a, 442a. Finally, shock absorber is coupled to frame by positioning a fastener through apertures 218c (FIG. 24), 430a, and through 392a, 432a.

As shown best in FIG. 24, upper control arm 374 is substantially narrower than lower control arm 372. In fact, the linear distance between a center of couplers 406-408, is approximately one-half the same distance between couplers 386-388. Thus, the narrowed width of upper control arm 374 allows shock absorber 376 to be attached to lower control arm 372 rather than upper control arm 374. Also the shock mount brackets 218 are positioned high in the frame 20. This allows shock absorber 376 to be substantially longer than shock absorbers on prior vehicles and has an increased shock stroke length. In the embodiment shown, the shock 376 is a 3-inch internal bypass shock available from Fox Shox.

Figure 26:
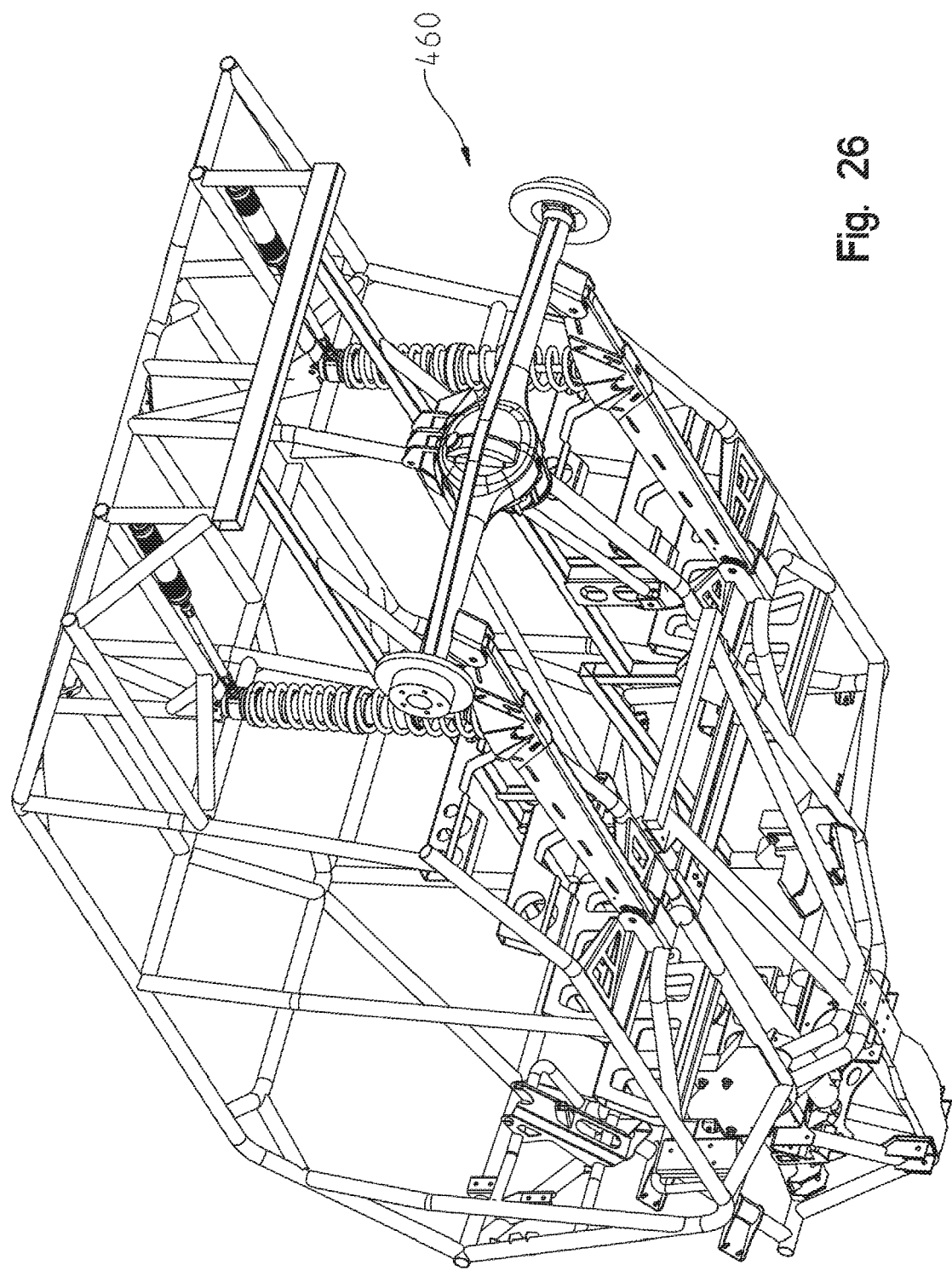
FIG. 26 shows a rear perspective view of the rear suspension.
Figure 27:
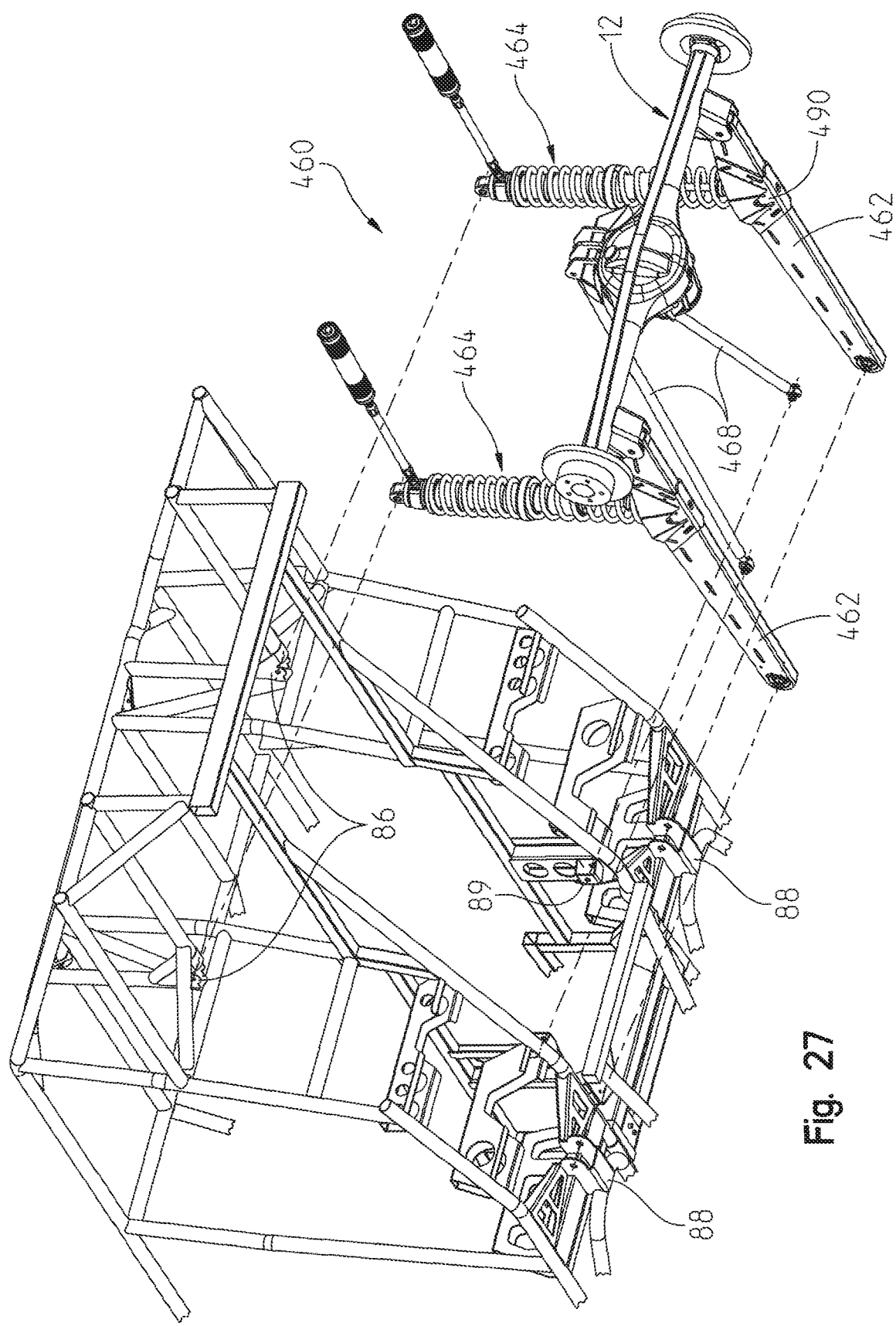
FIG. 27 shows the rear suspension exploded away from the frame.
Figure 28:
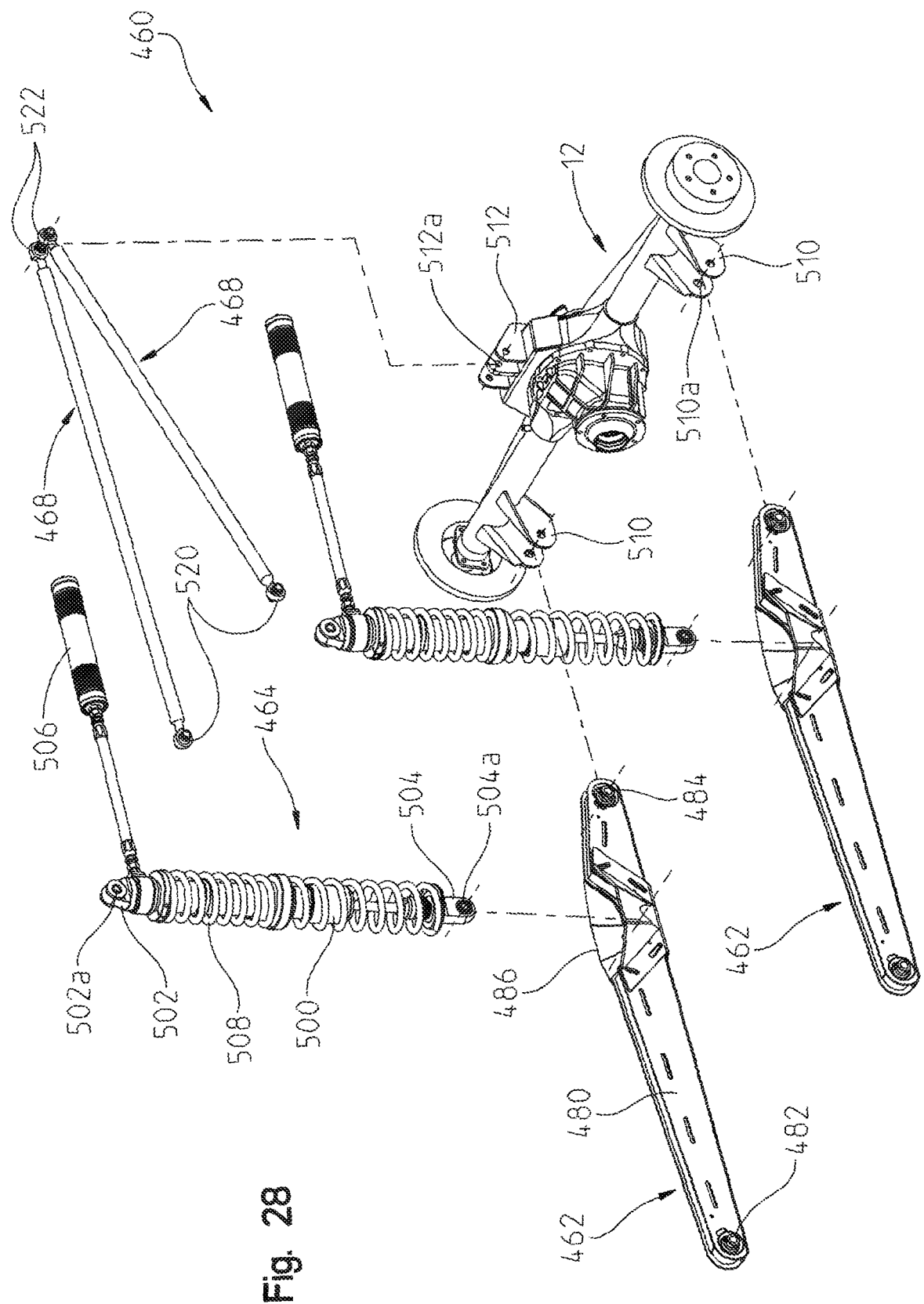
FIG. 28 shows an exploded view of the rear suspension components.

With reference now to FIGS. 26-28, rear suspension 460 will be described in greater detail. As shown best in FIGS. 27 and 28, rear suspension 460 generally includes rear trailing arms 462, shock absorbers 464, and rear alignment arms 468 coupled to rear axle 12. As shown in FIG. 28, trailing arms 462 include elongate arm portions 480 having a front coupler 482 and rear coupler 484. Trailing arm 462 further includes a funnel-shaped receiving area 486 having an internal connecting point 490 (FIG. 27).

Shock absorbers 464 are similar to front shock absorbers and include a gas shock portion 500 having an upper coupler 502 with mounting aperture 502a, and a lower coupler 504 having a mounting aperture 504a. Shock 464 further includes a gas canister 506 and an overspring at 508.

Rear axle 12 includes a first set of brackets 510 having mounting apertures 510a and a second set of brackets 512 having mounting apertures at 512a. Rear control arms 468 include front couplers 520 and rear couplers 522.

Figure 28A:
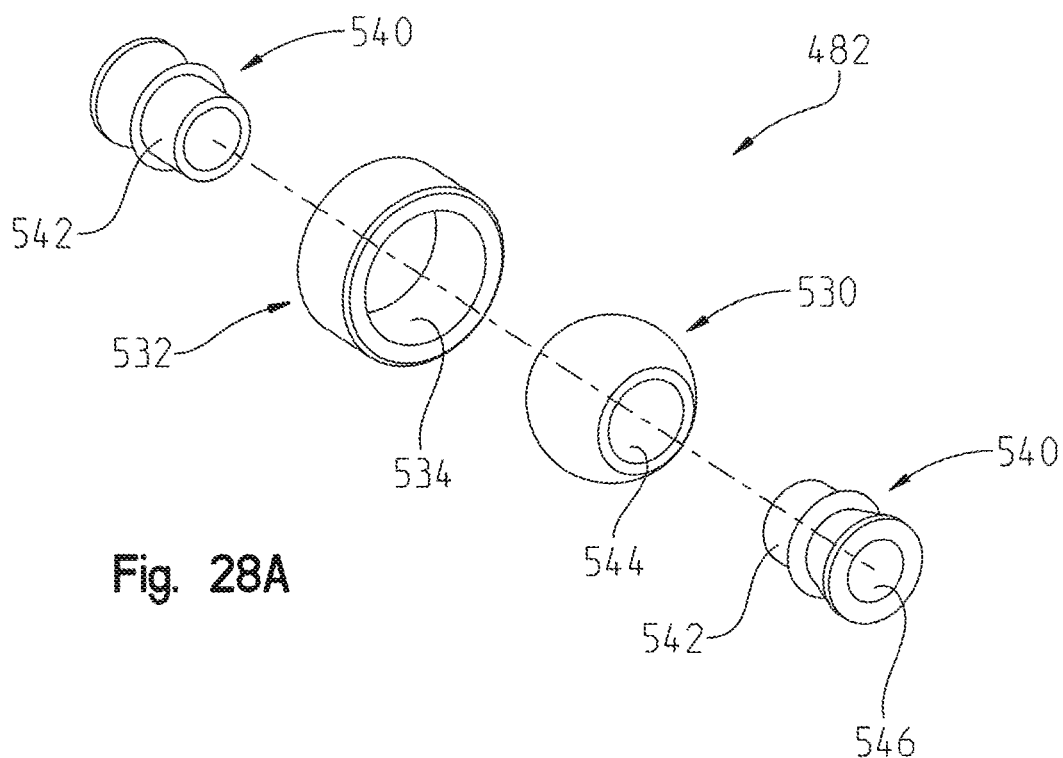
FIG. 28A is an exploded view of a first coupler of the rear suspension of FIG. 26.

With reference now to FIG. 28A, the front coupler and rear couplers 482, 484 will be described in greater detail. Front coupler 482 is comprised of a ball joint portion 530 which is profiled for receipt within a ball race 532, where the race 532 includes an interior spherical surface 534 matching a spherical profile of ball 530. Front coupler 482 further includes a mounting insert 540 having a cylindrical surface 542 receivable within aperture 544 of ball 530. Inserts 540 include apertures 546. Rear coupler 484 is substantially similar to front couplers 482.

Figure 28B:
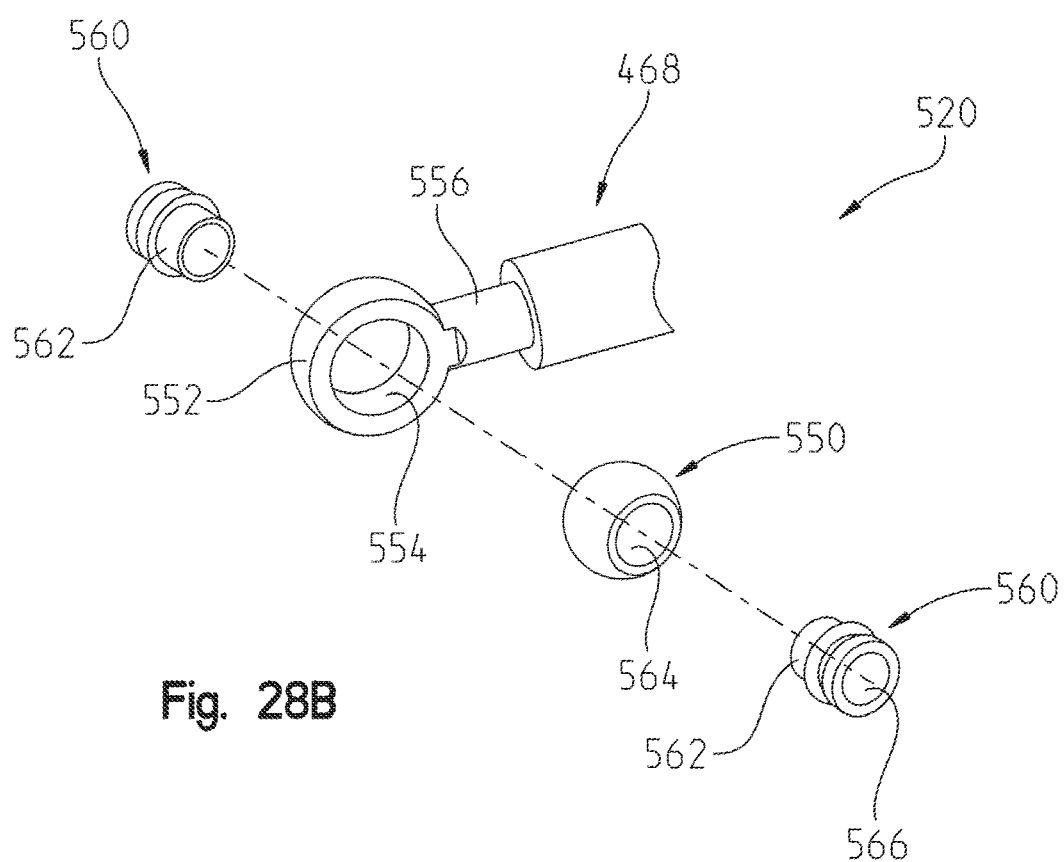
FIG. 28B is an exploded view of a second coupler of the rear suspension of FIG. 26.

With reference now to FIG. 28B, the front coupler and rear couplers 520, 522 will be described in greater detail. Coupler 520 is comprised of a ball joint portion 550 which is profiled for receipt within a ball race 552, where the race 552 includes an interior spherical surface 554 matching a spherical profile of ball 550. In this case, race 552 is profiled like a tie rod having a threaded end 556, so as to allow the overall length of the rear alignment arm to be adjustable. Coupler 520 further includes a mounting insert 560 having a cylindrical surface 562 receivable within aperture 564 of ball 550. Inserts 560 include apertures 566.

Thus, it should be appreciated that trailing arms 462 may be attached to frame 20 by way of connection of ball joints 482 with couplers 88 and by way of couplers 484 with brackets 510. Alternatively, trailing arms 462 may be attached to frame 20 with polymeric bushings. Rear alignment arms 468 are also attached to frame 20 by way of couplers 520 attached to brackets 89 (FIG. 27) and with couplers 522 coupled to brackets 512 on axle 12. Top coupler 502 of shock absorber 500 is then attached to bracket 86 on frame 20 (FIG. 27) and lower couplers 504 of shock absorber 464 is connected to connection point 490 (FIG. 27) of trailing arms 462. In the embodiment shown, the shock 376 is a 3-inch internal bypass shock available from Fox Shox.

Figure 29:
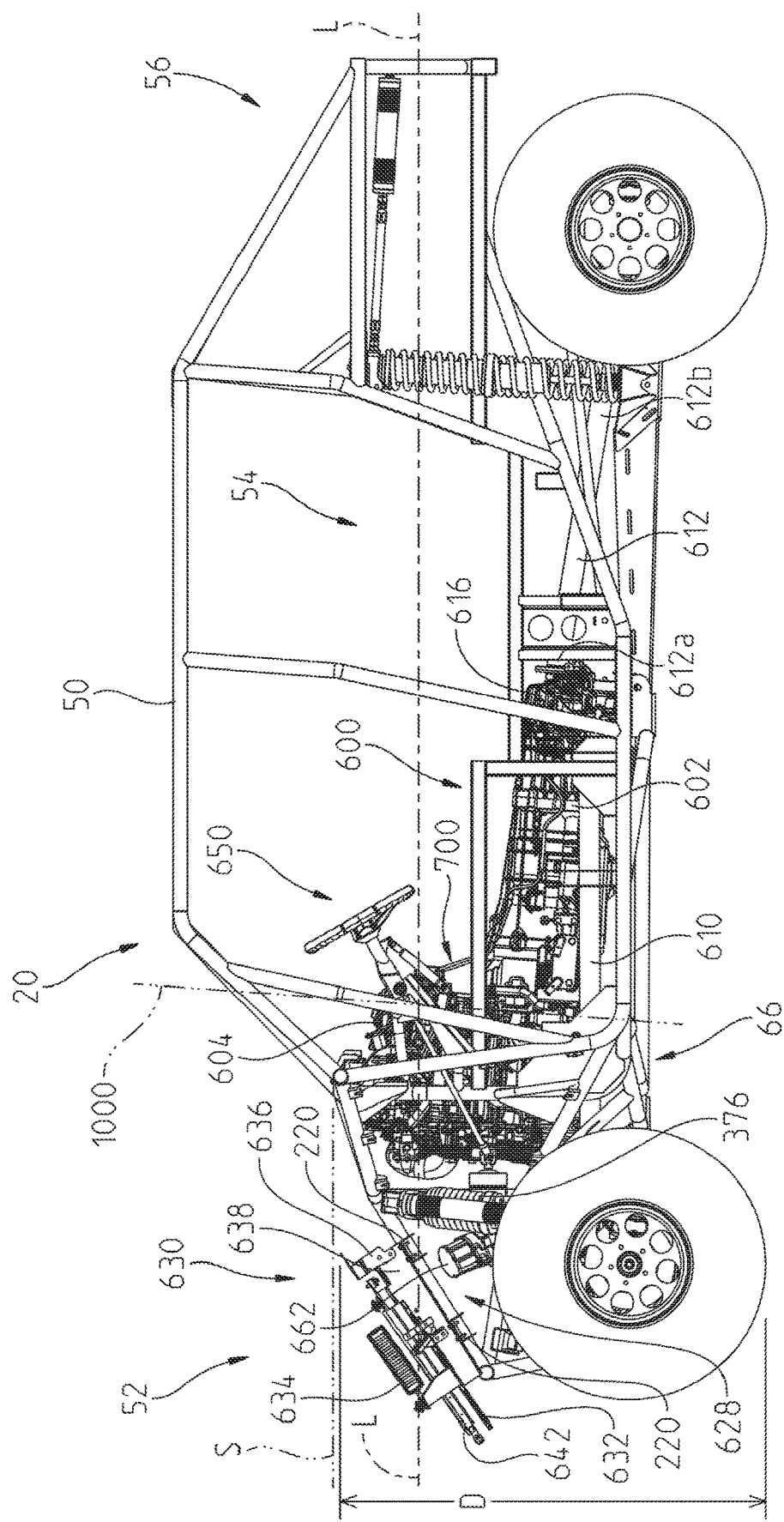
FIG. 29 is a side view of the frame, a drivetrain assembly, a cooling assembly, and a steering assembly of the vehicle of FIG. 1.
Figure 30:
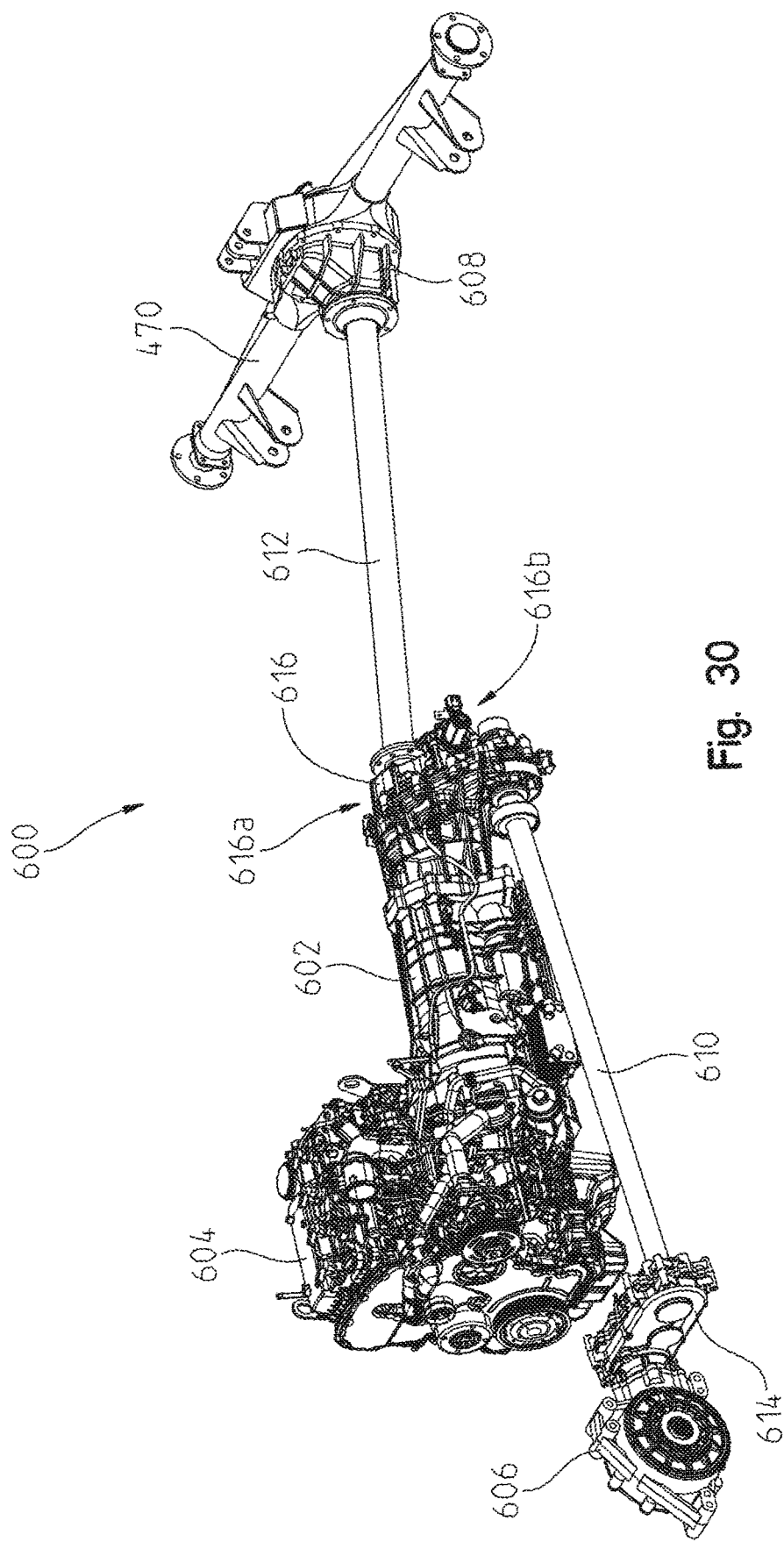
FIG. 30 is a front perspective view of the drivetrain assembly of FIG. 29.

Referring to FIGS. 29 and 30, frame 20 further supports a drivetrain assembly 600, a cooling assembly 630, a steering assembly 650, and a brake assembly 700. Drivetrain assembly 600 is generally positioned at the centerline of vehicle 2 along a longitudinal axis L and extends from front section 52 to rear section 56. Drivetrain assembly 600 illustratively includes a transmission 602, an engine 604, a front differential 606, a rear differential 608, a front drive shaft 610, a rear drive shaft 612, a front transfer case 614, and a rear transfer case 616. Drivetrain assembly 600 also may include a turbocharger operably coupled to engine 604. In operation, engine 604 is operably coupled to transmission 602 at interface 1000 in order to drive front wheels 6 via front drive shaft 610 and rear wheels 10 via rear drive shaft 612.

Illustrative transmission 602 is rearward of engine 602 at interface 1000. Transmission 602 is positioned at midsection 54 of frame 20 between front seats 44 of operator area 30 and may be coupled to a cross-member 590 (FIG. 6).

Cross-member 590 may be coupled to frame 20 and transmission 602 with conventional fasteners (not shown), such as bolts, welds, and/or rivets. Illustratively, cross-member 590 is removable in order to facilitate assembly of transmission 602 with frame 20. Transmission 602 may be an automatic transmission or, alternatively, may be another type of transmission, for example a sequential transmission having a manual shift lever, an electric shift lever, or paddle levers.

Engine 604 is operably coupled to transmission 602 forward of interface 1000 and is a front-mid engine, i.e., engine 604 is supported between front section 52 and midsection 54 of frame 20. As shown in FIG. 29, engine 602 is positioned within operator area 30 and extends upwardly from the footwell area for the operator and passenger. Additionally, engine 602 is forward of steering wheel 36 and rearward of front suspension 370 and front axle 8, thereby allowing sufficient space for front suspension 370, a portion of steering assembly 650, and other components of vehicle 2, as is detailed further herein.

Brackets 252 support engine 604 on frame 20 at engine mount section 66. As shown in FIG. 19, engine 604 is supported on support plate 252c of bracket 252 through conventional coupling means, such as bolts, welds, or rivets. For example, a bolt (not shown) may be received through aperture 252d of support plate 252c in order to couple engine 604 to frame 20. Rubber bushings (not shown) also may be used to mount engine 604 to engine mount section 66.

Engine 604 is positioned between frame tubes 104 and removable section 80 (FIG. 6). Removable section 80 supports engine 604 at engine mount section 66, however, section 80 may be removed in order to install engine 604 through the bottom of frame 20, rather than from above frame 20. The position of engine 604 may be adjusted to accommodate various cargo loads and uniformly distribute the weight of vehicle 2. Engine 604 contributes to the weight load near the front of vehicle 2 such that the weight distribution of vehicle 2 may be biased towards the front. However, by positioning engine 604 in a front-mid position, the cargo space at the rear of vehicle 2 is increased, which contributes to a uniform weight distribution for vehicle 2.

Engine 604 also is assembled with an air intake assembly, including an airbox 624, in order to operate engine 604. Airbox 624 is illustratively supported by front section 52 of frame 20 along a passenger side of vehicle 2.

As shown in FIG. 30, engine 604 is operably coupled to rear differential 608 through transmission 602 and rear drive shaft 612. Rear differential 608 is supported on rear axle 470 and drive rear wheels 10 according to an output from transmission 602. Rear drive shaft 612 generally extends in the direction of longitudinal axis L of vehicle 2 (see FIG. 6). Also, as best shown in FIG. 29, rear drive shaft 612 extends at a generally downward angle toward rear differential 608, such that a front portion 612a of rear drive shaft 612 is elevated relative a rear portion 612b of rear drive shaft 612.

Referring to FIG. 30, rear transfer case 616 is operably coupled to front portion 612a of rear drive shaft 612 and transmission 602. In particular, rear transfer case 616 is positioned intermediate transmission 602 and rear drive shaft 612 and operably couples rear drive shaft 612 to front drive shaft 610. Rear transfer case 616 allows front drive shaft 610 to be off-center, i.e., laterally spaced apart from longitudinal axis L of vehicle 2 and rear drive shaft 612. Rear drive shaft 612 is perpendicular to an inner end 616a of rear transfer case 616, and front drive shaft 610 is perpendicular to an outer end 616b of rear transfer case 616. Illustrative vehicle 2 may be configured for four-wheel drive operation and, as such, rear transfer case 616 allows output from transmission 602 to drive both front and rear drive shafts 610, 612, as is detailed further herein.

Front drive shaft 610 extends between rear transfer case 616 and front transfer case 614. Front transfer case 614 includes an input shaft 618 for engaging front drive shaft 610. Input shaft 618 may be splined to engage with front drive shaft 610. Illustratively, as shown in FIGS. 6 and 30, front drive shaft 610 is positioned below the operator seat, rather than along longitudinal axis L. In other words, front drive shaft 610 is off-center.

Figure 31:
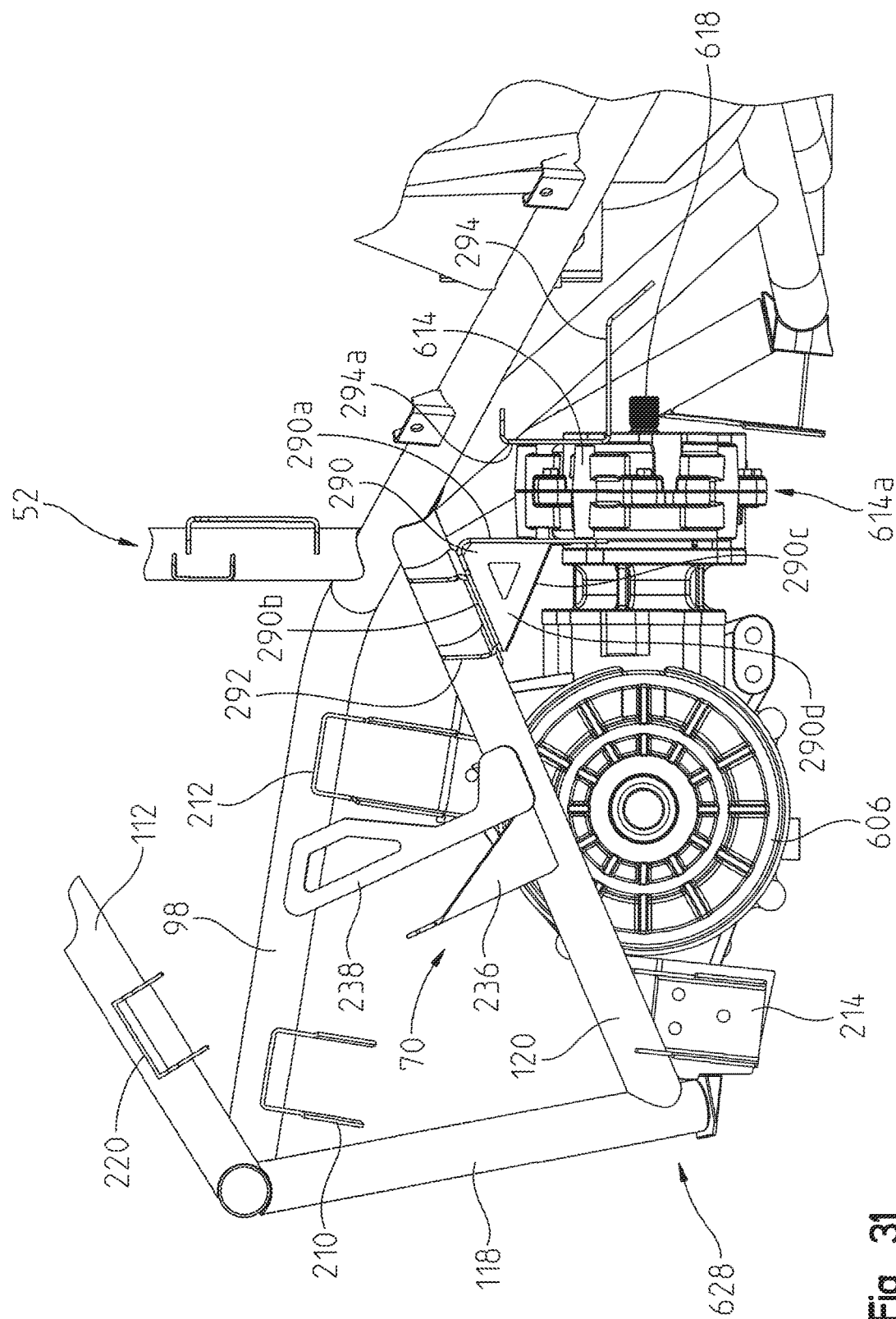
FIG. 31 is a side view of a front differential of the drivetrain assembly of FIG. 30 coupled to the frame.
Figure 32:
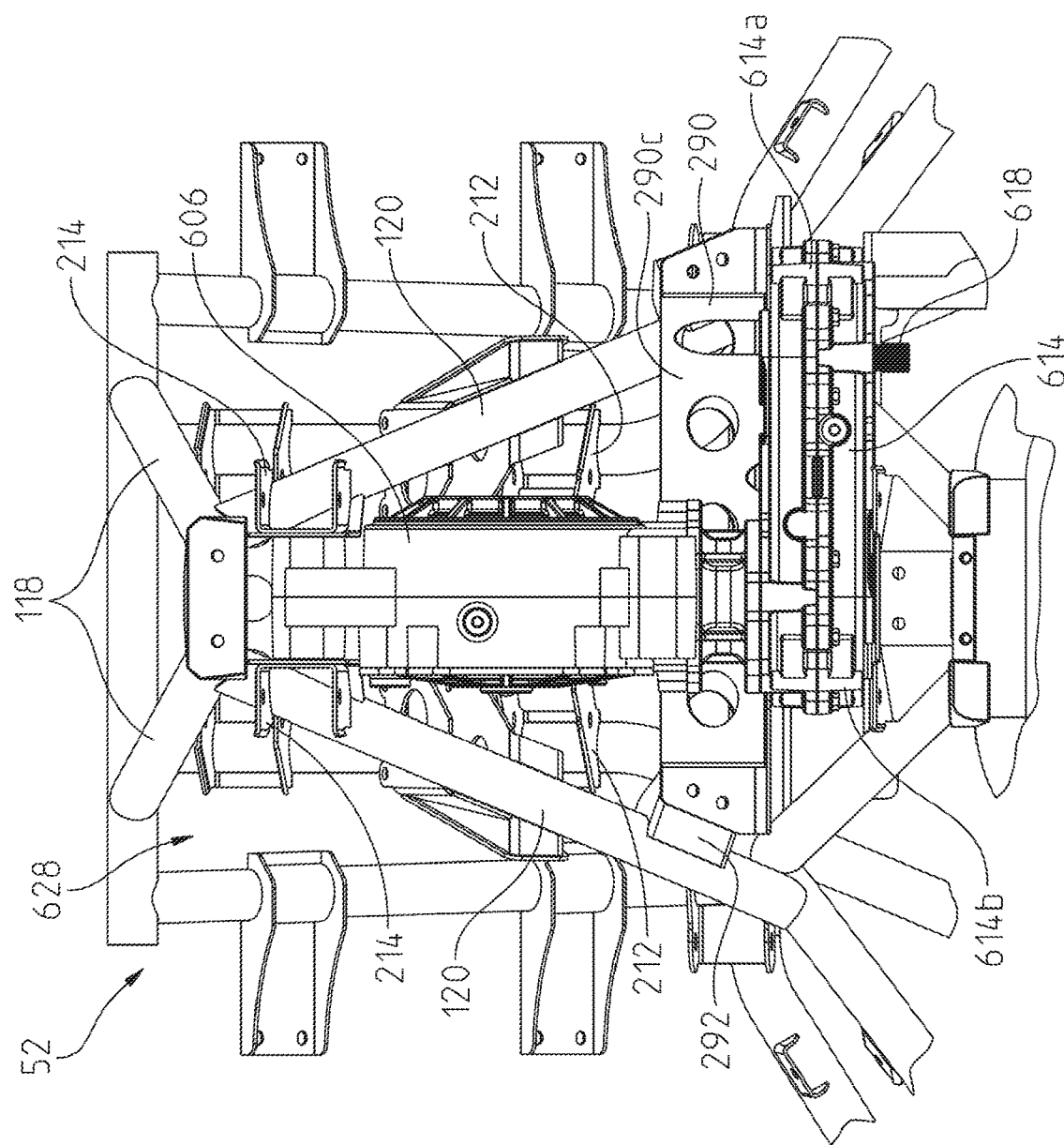
FIG. 32 is a bottom elevational view of the front differential of the drivetrain assembly coupled to the frame.

Referring to FIGS. 31-33, front transfer case 614 is supported on front section 52 of frame 20 by front transfer case mount 72 and is positioned intermediate engine 604 and front differential 606. Front transfer case 614 is generally perpendicular to front drive shaft 610, front differential 606, and longitudinal axis L of vehicle 2. Front transfer case 614 includes an outer end 614a and an inner end 614b. Outer end 614a extends laterally outward in a generally perpendicular direction from longitudinal axis L of vehicle 2 and, more particularly, extends toward an operator side of vehicle 2 in order to engage input shaft 618 with front drive shaft 610. Inner end 614b is positioned along longitudinal axis L in order to engage with front differential 606, which also is positioned along longitudinal axis L. As such, front transfer case 614 transfers power from front drive shaft 610 to front differential 606 in order to drive front wheels 6.

Front transfer case 614 is coupled to rear wall 290a of bracket 290 with conventional fasteners (not shown), which are received through apertures 290f. Additionally, front transfer case 614 is coupled to a bracket 294, and in particular to a front wall 294a of bracket 294, with conventional fasteners (not shown), which are received through apertures 296. Front transfer case 614 extends downwardly from front section 52 of frame 20 and is generally suspended from brackets 290, 294.

Front differential 606 is positioned forward of front transfer case 614 and is coupled to front section 52 of frame 20 by front differential mount 70. Portion 310 also may support front differential 606 and may be removed from frame 20 when drivetrain assembly 600 is assembled with frame 20. As shown in FIG. 33, an upper mounting portion 622 of front differential 606 is coupled to brackets 212, 280 with conventional fasteners (not shown). A lower mounting portion 620 of front differential 606 is coupled to an inner surface of plate portion 282 of lower brackets 214 with conventional fasteners (not shown), which are received through apertures 282a. Additionally, an outer portion of plate portion 282 is coupled with lower control arms 372 of front suspension 370, thereby maximizing the coupling surfaces of lower brackets 214.

Front differential 606 generally extends along longitudinal axis L of vehicle 2. As such, front differential 606 is aligned with inner end 614b of front transfer case 614, rather than outer end 614a of front transfer case 614. As shown best in FIG. 30, front differential 606 is not aligned with front drive shaft 610. Front differential 606 is operably coupled to front drive shaft 610 via front transfer case 614. In addition to driving front wheels 6, front differential 606 may assist with suspension travel of front suspension 370 and increase stability and control of the movement of wheel 6.

As detailed above, lower brackets 214 are coupled to both front differential 606 and lower control arms 372 of front suspension 370. Front differential extends below lower brackets 214 and, as such, extends below a generally horizontal plane defined by lower control arms 372. In general, front suspension 370 is positioned around front differential 606 such that front suspension 370 defines an envelope 628 for supporting various components of vehicle 2 on frame 20. Front differential 606 is positioned within an opening defined by lower control arms 372 (see FIG. 6). Portion 310 may be positioned below front differential 606 in order to cover and protect front differential 606.

Front and rear differentials 606, 608 may be selectively locking differentials configured for at least approximately 7,000 lb-ft of torque. Illustratively, front differential 606 is a locking differential available from The Hilliard Corporation of Elmira, N.Y. Additionally, rear differential 608 also may be a locking differential available from The Hilliard Corporation of Elmira, N.Y. The configuration of frame 20 and differential mount 70 allows other types of front differentials to be used for vehicle 2, such as positive traction differentials, limited-slip differentials, open differentials, automatic torque biasing differentials, high-friction differentials, and other embodiments thereof. Because vehicle 2 is able to support various types of differentials, drivetrain assembly 600 may be selectively customized to operator needs and preferences. Other components of drivetrain assembly 600 also may be interchanged to allow for additional customization of vehicle 2.

During operation of drivetrain assembly 600 in two-wheel drive mode, engine 604 and transmission 602 operate according to user inputs, such as a user input on first foot pedal 38. The output from transmission 602 is transmitted to rear drive shaft 612 in order to operate rear differential 608 and drive rear wheels 10. Rear drive shaft 612 also drives front drive shaft 610. Alternatively, when four-wheel drive mode is selected by the user from operator controls 34, the output of transmission 602 is transmitted to both front and rear drive shafts 610, 612 via rear transfer case 616. As such, both front and rear drive shafts 610, 612 drive the operation of the respective front and rear differentials 606, 608 and front and rear wheels 6, 10. Front transfer case 614 is engaged in order to operably align the output from front drive shaft 610 with the input of front differential 606. Vehicle 2 may be configured with selective drive modes, such as all-wheel drive, two-wheel drive, four-wheel drive, and others. Alternatively, vehicle 2 may automatically change the drive mode or may continuously operate in one particular mode.

Figure 34:
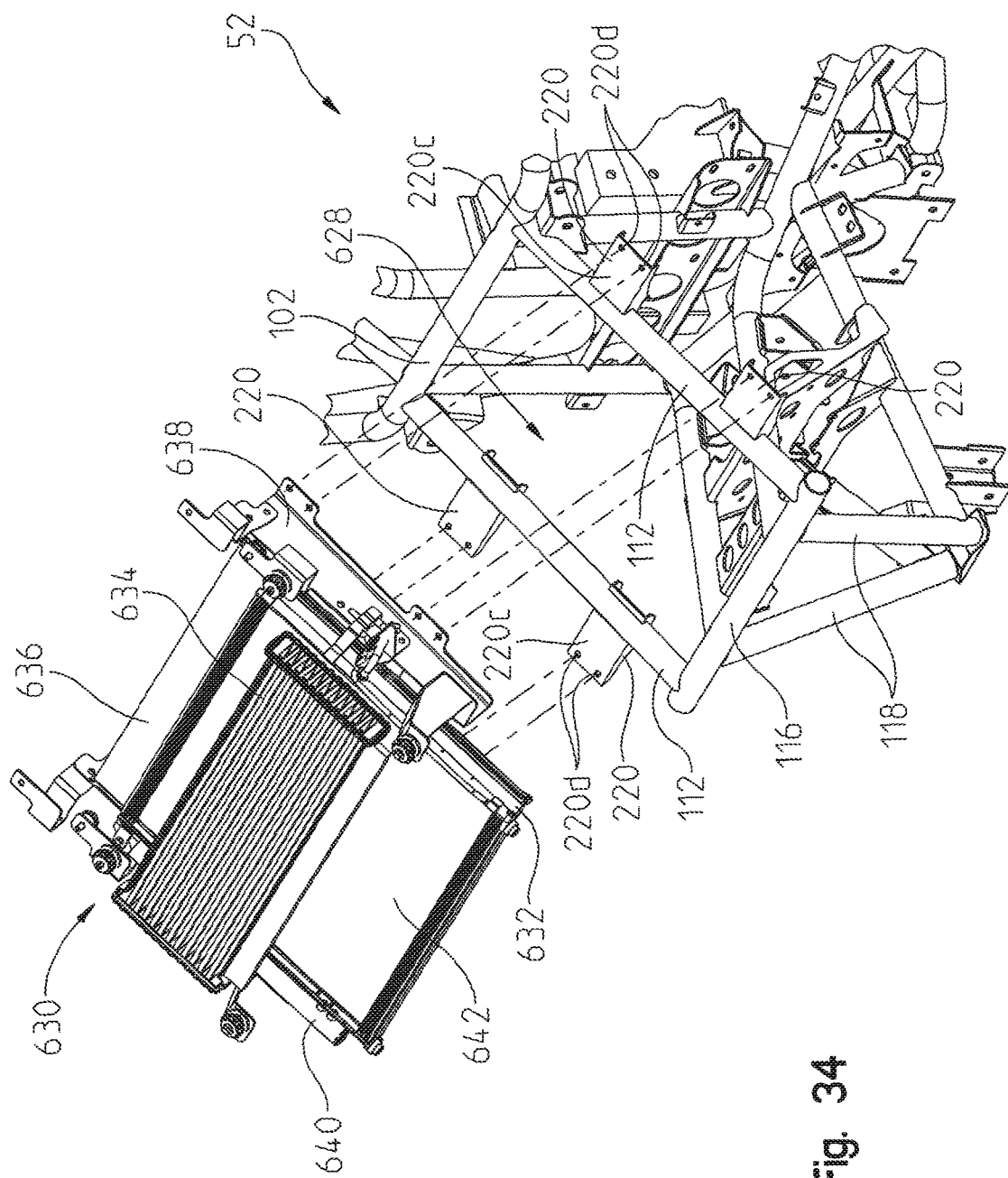
FIG. 34 is an exploded view of the front portion of the frame and the cooling assembly of FIG. 29.

Frame 20 also supports a cooling assembly 630 to control the temperature of engine 604. Cooling assembly 630 also may control the temperature of other components of vehicle 2. As shown in FIGS. 29 and 34, cooling assembly 630 includes a first heat exchanger, illustratively a radiator 632, a second heat exchanger, illustratively an intercooler 634 for the turbocharger, an air conditioning condenser 642 of the HVAC system, a cooling assembly frame 636 having side panels 638 and 640, and at least one fan (not shown). In one embodiment, cooling assembly 630 includes two fans in a side-by-side arrangement, i.e., both fans are adjacent the rear surface of radiator 632. Illustrative air conditioning condenser 642 is intermediate turbocharger intercooler 634 and radiator 632, and more particularly, is positioned rearward of turbocharger intercooler 634 and forward of radiator 632.

Cooling assembly frame 636 supports radiator 632, turbocharger intercooler 634, air conditioning condenser 642, and the fans on front section 52 of frame 20. In particular, as shown in FIG. 34, side panels 638, 640 of frame 636 couple with top face 220c of brackets 220. Conventional fasteners (not shown) extend through apertures in side panels 638, 640 and apertures 220d of bracket 220 in order to support cooling assembly 630 on frame 20. Frame 636 may be configured as a shroud generally surrounding radiator 632.

Referring to FIG. 29, cooling assembly 630 is coupled to the top surface of frame tubes 112. In particular, an uppermost portion of frame 636 is a vertical distance D from the ground and is positioned above engine 604. Illustratively, distance D may be approximately 45-55 inches from the ground, and more particularly, may be approximately 51.5 inches from the ground. Despite being positioned above front section 52 of frame 20, cooling assembly 630 is positioned below a line of sight S of the operator and passenger and, therefore, does not cause the hood of vehicle body 22 to interfere with line of sight S.

Also, because cooling assembly 630 is coupled to the top of frame tubes 112, cooling assembly 630 is angled relative to longitudinal axis L. As such, the approach angle of the air flowing into cooling assembly 630 may be approximately 35 degrees. Cooling assembly 630 is positioned to receive sufficient air flow to control the temperature of engine 604. Alternatively, cooling assembly 630 also may be angled such that the approach angle of the air is less than approximately 35 degrees, or may be between approximately 35 degrees and 90 degrees. Other embodiments of cooling assembly 630 may include ducting or a baffle assembly to further control the approach angle and the air flow through turbocharger intercooler 642, air conditioning condenser 634, and radiator 632.

As is apparent from FIG. 29, cooling assembly 630 is positioned forward of, and generally above, front suspension 370. As such, cooling assembly 630 does not interfere with the suspension travel, and in particular the displacement of shock absorber 376. Additionally, cooling assembly is positioned generally forward of steering assembly 650 and extends above envelope 628. Cooling lines and tubes (not shown) may extend into envelope 628 at front section 52.

Air flowing into cooling assembly 630 and across radiator 632 is exhausted from cooling assembly 630 by the fans. The air from cooling assembly 630 may be directed towards the wheel well area in order to exit vehicle 2.

Figure 35:
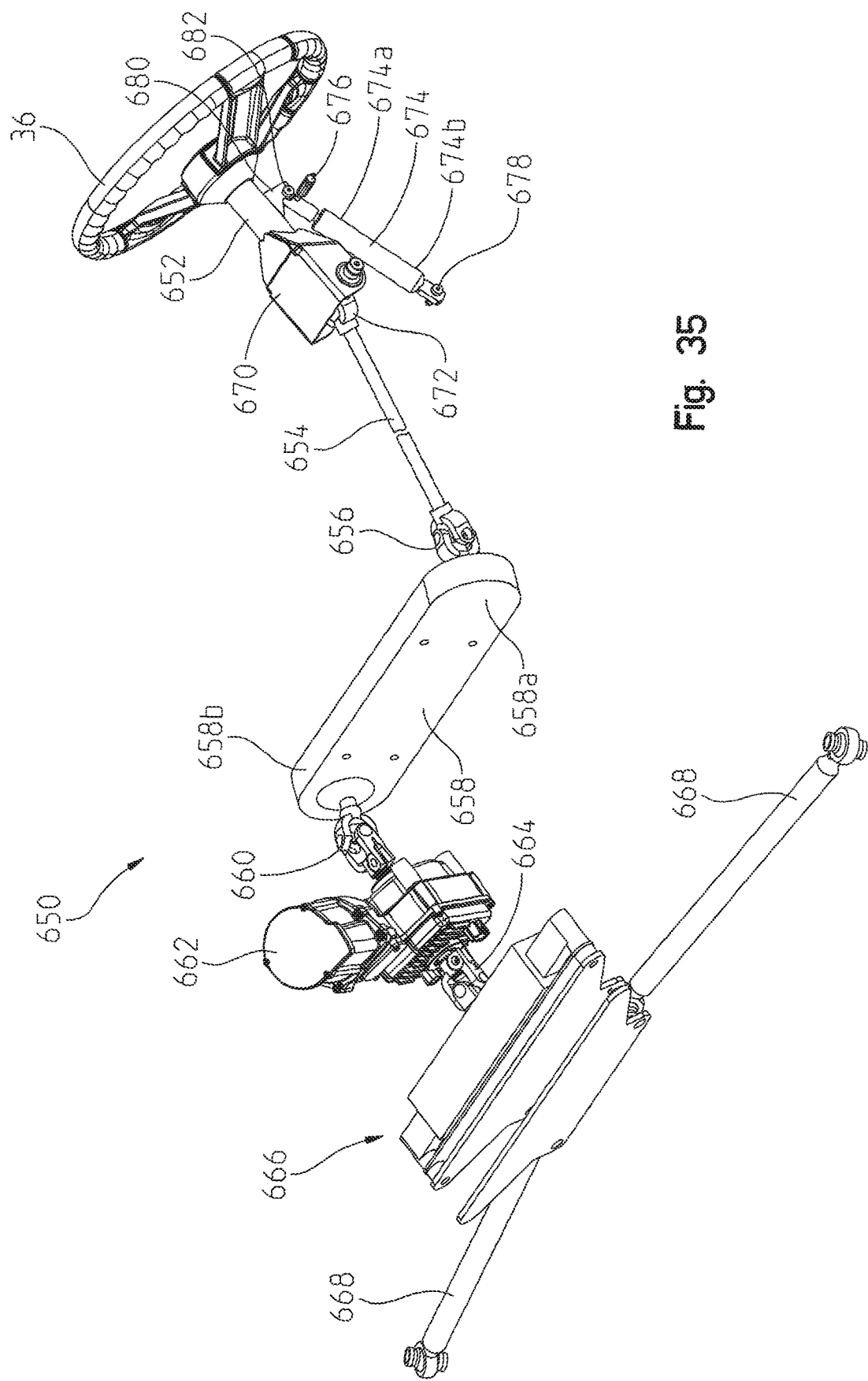
FIG. 35 is a front perspective view of a steering assembly of the vehicle.

Referring now to FIGS. 35-38, steering assembly 650 extends between front section 52 and midsection 54 of frame 20. At least a portion of steering assembly 650 is positioned below cooling assembly 630, and at least a portion of steering assembly 650 is rearward of cooling assembly 630. Steering assembly 650 includes an operator control, illustratively a steering wheel 36, a steering column 652, a steering shaft 654, a steering transfer case 658 having an outer end 658a and an inner end 658b, a power assist unit, illustratively an electric power steering unit 662, a gearbox assembly 666, tie rods 668, and knuckles 290. Referring to FIG. 35, steering wheel 36 is operably coupled to steering column 652. Steering column 652 is rotatably coupled to steering shaft 654 via a joint 672, illustratively a U-joint. A torque sensor may be positioned within a housing 670 near a joint 672. Steering shaft 654 is coupled to steering transfer case 658 via a joint 656, illustratively a U-joint, in order to transfer the output of steering shaft 654 to power steering unit 662. Power steering unit 662 is operably coupled to transfer case 658 via a joint 660, and is operably coupled to gearbox assembly 666 via a joint 664. Joints 660 and 664 are illustratively U-joints. Gearbox assembly 666 is positioned forward of power steering unit 662 and is operably coupled to tie rods 668 in order to move front wheels 6.

Figure 37:
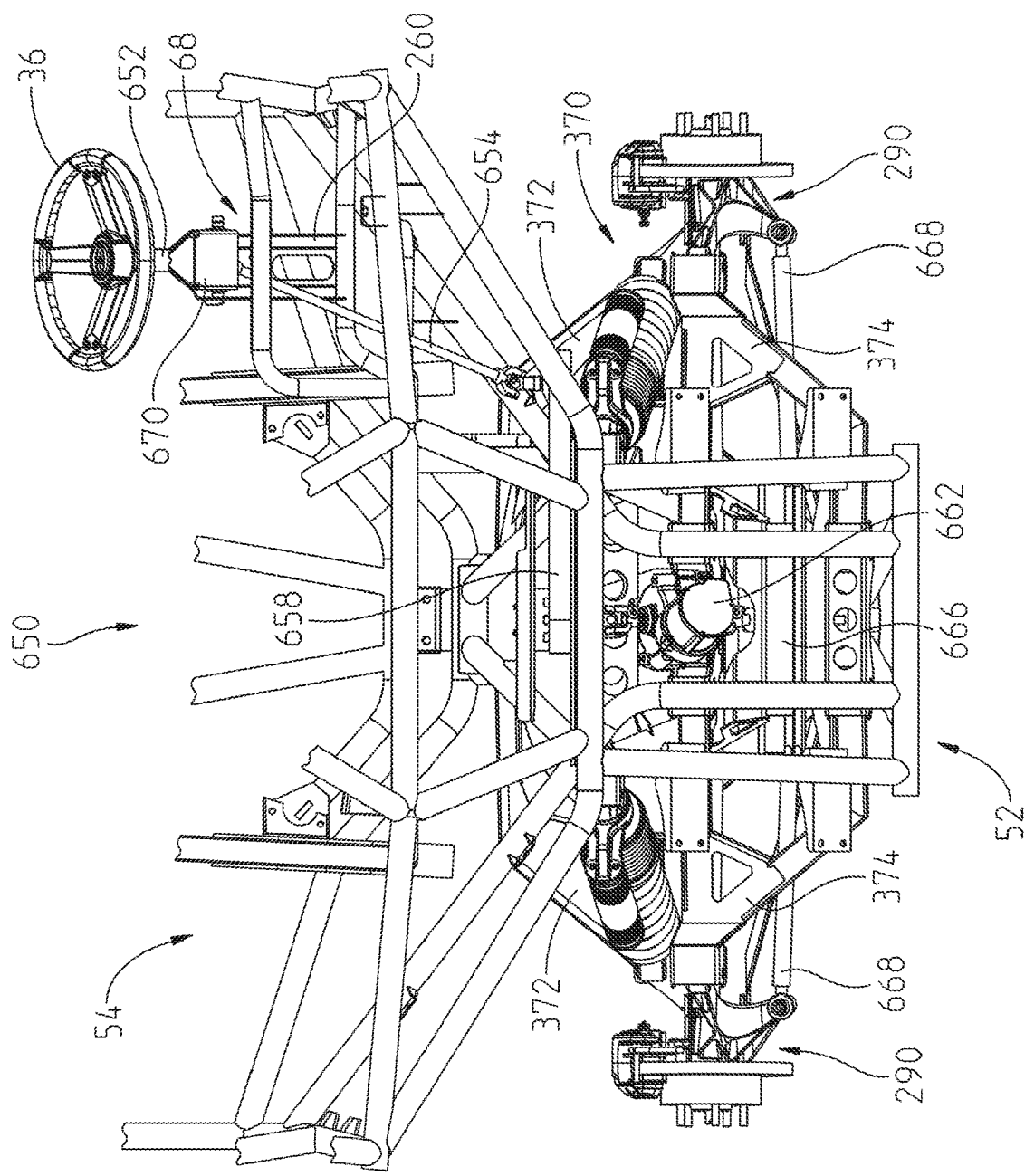
FIG. 37 is a top elevational view of the front section of the frame and the steering assembly of FIG. 36.
Figure 38:
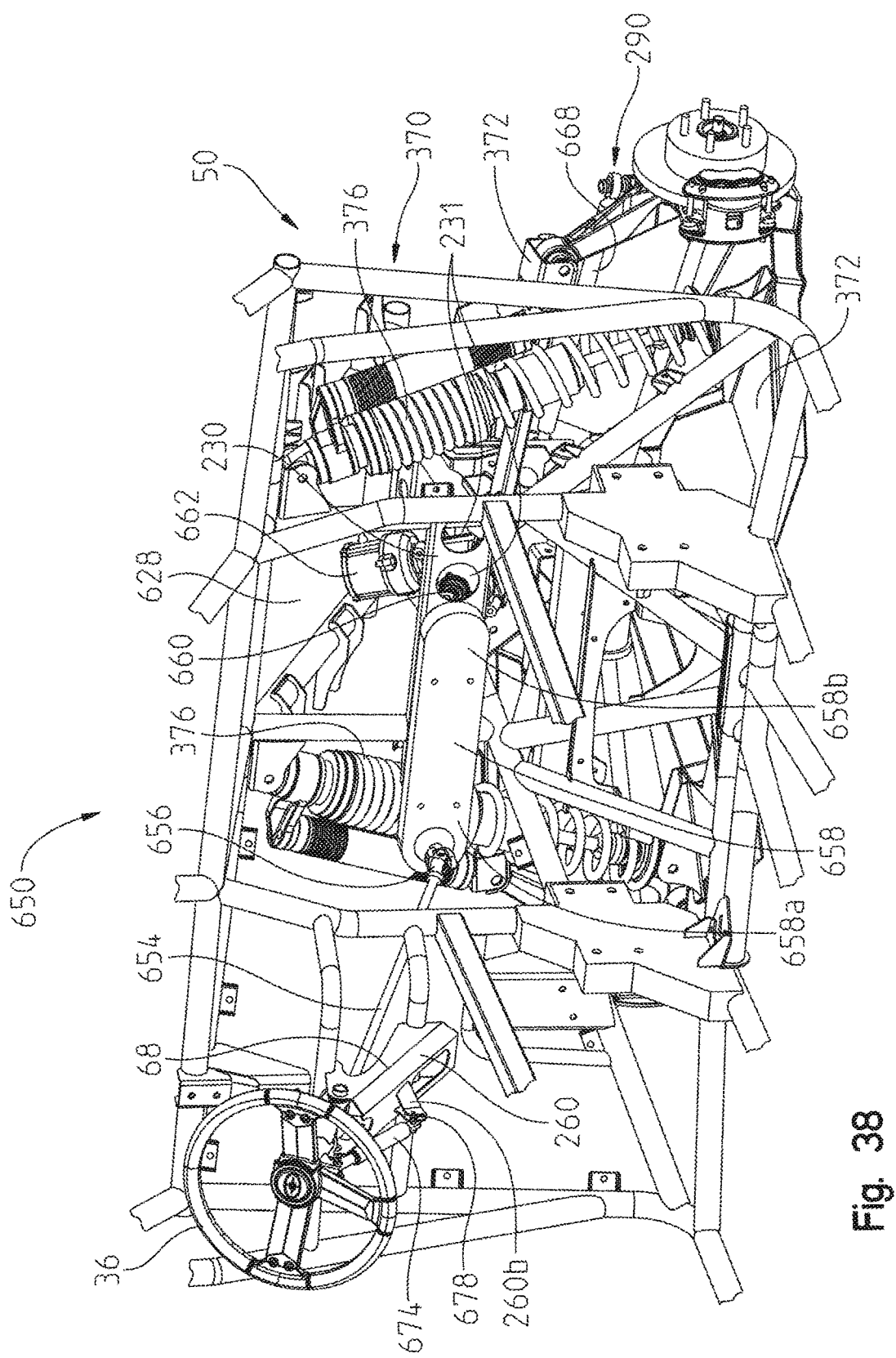
FIG. 38 is a rear perspective view of the steering assembly of FIG. 36 coupled to the front section of the frame.

Steering assembly 650 is supported by both front section 52 and midsection 54 of frame 20. Referring to FIGS. 37 and 38, steering column 652 extends along channel 260. Steering shaft 654 is angled inwardly and downwardly from steering column 652 toward steering transfer case 658. Steering shaft 654 and transfer case 658 are positioned rearward of front suspension 370 and are elevated relative to lower and upper control arms 372, 374 of front suspension.

As shown best in FIG. 38, steering transfer case 658 is coupled to bracket 230 of steering mount 64 at front section 52 of frame 20. Both bracket 230 and steering transfer case 658 may be positioned rearward of shock absorbers 376 of front suspension 370 (see FIG. 29). Joint 660 extends through one of apertures 231 on bracket 230 in order to couple with power steering unit 662, which is centrally positioned on front section 52. Inner end 658b of transfer case 658 is coupled to power steering unit 662 at approximately the vehicle centerline. However, outer end 658a extends laterally outward from the vehicle centerline because steering wheel 36, steering column 652, and steering shaft 654 are off-center from the vehicle centerline, i.e., laterally spaced apart from the centerline. As such, transfer case 658 operably couples steering shaft 654 to power steering unit 662 by routing the output of steering shaft 654 inwardly toward longitudinal axis L in order to align with the input of power steering unit 662. In particular, steering transfer case 658 may be a chaincase, a combination of gears, or any other type of device to transmit the output from steering shaft 654 to power steering unit 662.

As shown in FIGS. 29 and 36-38, power steering unit 662 is positioned within envelope 628 defined by front section 52 and front suspension 370. A lower portion of power steering unit 662 is generally positioned between upper control arms 374 of front suspension 370. An upper portion of power steering unit 662 extends upwardly such that the upper portion of power steering unit 662 is elevated relative to lower and upper control arms 372, 374. Additionally, as shown in FIG. 29, power steering unit 662 may be positioned forward of shock absorbers 376. While power steering unit 662 is illustratively shown as an electric power steering unit but also may be a hydraulic power steering unit or other device that assists steering assembly 650.

Gearbox assembly 666 is positioned within envelope 628 and is forward of power steering unit 662 and shock absorbers 376. In particular, gearbox assembly 666 is generally positioned between upper control arms 374, thereby leaving an open area between lower control arms 372 and below gearbox assembly 666 for front differential 606. Gearbox assembly 666 also is positioned along the vehicle centerline such that the output of power steering unit 662 is directly aligned with the input of gearbox assembly 666. Gearbox assembly 666 may be a rack and pinion assembly or may be other assemblies for controlling the movement of tie rods 668 and front wheels 6.

Figure 36:
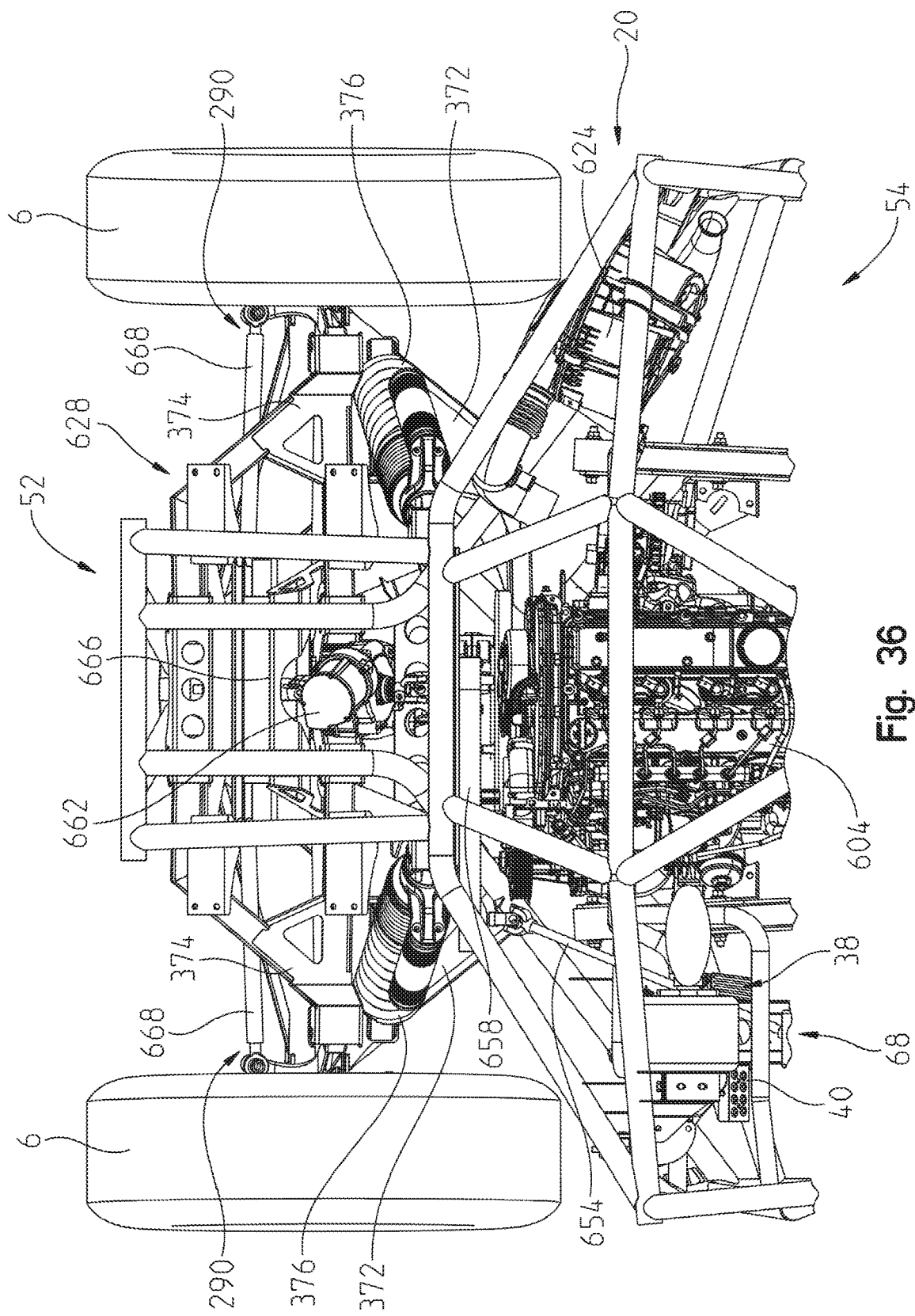
FIG. 36 is a top view of the front end of the vehicle with a vehicle body removed and showing a portion of the drivetrain assembly, the steering assembly, and the front suspension.

Tie rods 668 extend between gearbox assembly 666 and knuckles 290 at hubs 380 in order to control the movement of front wheels 6. Because tie rods 668 are positioned near the centerline of vehicle 2, the length of tie rods 668 may be increased to approximately 21 inches. As shown in FIGS. 36-38, tie rods 668 are positioned between lower and upper control arms 372, 374 of front suspension 370.

As shown in FIGS. 35 and 38, a tilt adjuster 674 is coupled to steering wheel 36 in order to adjust the position of steering wheel 36. Tilt adjuster 674 includes an inner rod 674a that telescopes within an outer portion 674b. An operator may activate a lever 676 to move inner rod 674a relative to outer portion 674b. Tilt adjuster 674 is coupled to steering wheel 36 via a bracket 680 attached to steering column 652. Fasteners, such as bolts 682, secure inner rod 674a of tilt adjuster 674 to bracket 680. Additionally, fasteners, such as bolts 678, couple outer portion 674b of tilt adjuster 674 to mounting leg 260b of controls mount 68.

The position of steering assembly 650 may increase suspension travel of front suspension 370. For example, by bringing the output from steering shaft 654 to the centerline of vehicle 2, i.e., aligning the output with longitudinal axis L, steering transfer case 658 may increase suspension travel. Additionally, by positioning at least gearbox assembly 666, power steering unit 662, and a portion of transfer case 658 along the centerline of the vehicle, the travel of front suspension 370 may be increased. Also, the length of tie rods 668 may be increased which may contribute increased suspension travel.

Steering assembly 650 also cooperates with front suspension 370 in order to minimize the turning radius of vehicle 2 by maximizing the steering angle. Lower control arms 372 and/or upper control arms 374 of front suspension 370 may include a "stop" to prevent front wheels 6 from overturning in a particular direction and damaging front wheels 6, front suspension 370, and/or steering assembly 650. The "stops" are positioned to prevent wheels 6 from contacting other components of vehicle 2 when steering assembly 650 is at full lock and front suspension 370 is at full jounce or rebound.

An alternative embodiment of steering assembly 650 may be a "drive-by-wire" arrangement, which may eliminate steering components such as steering column 652 and steering shaft 654 from steering assembly 650. Drive-by-wire steering assemblies operate through an electronic control system, thereby eliminating at least a portion of the mechanical components and connections between steering wheel 36 and front wheels 6. Additionally, drive-by-wire steering embodiments may allow vehicle 2 to be operated and controlled remotely. An exemplary drive-by-wire arrangement is electronic throttle control.

Figure 2:
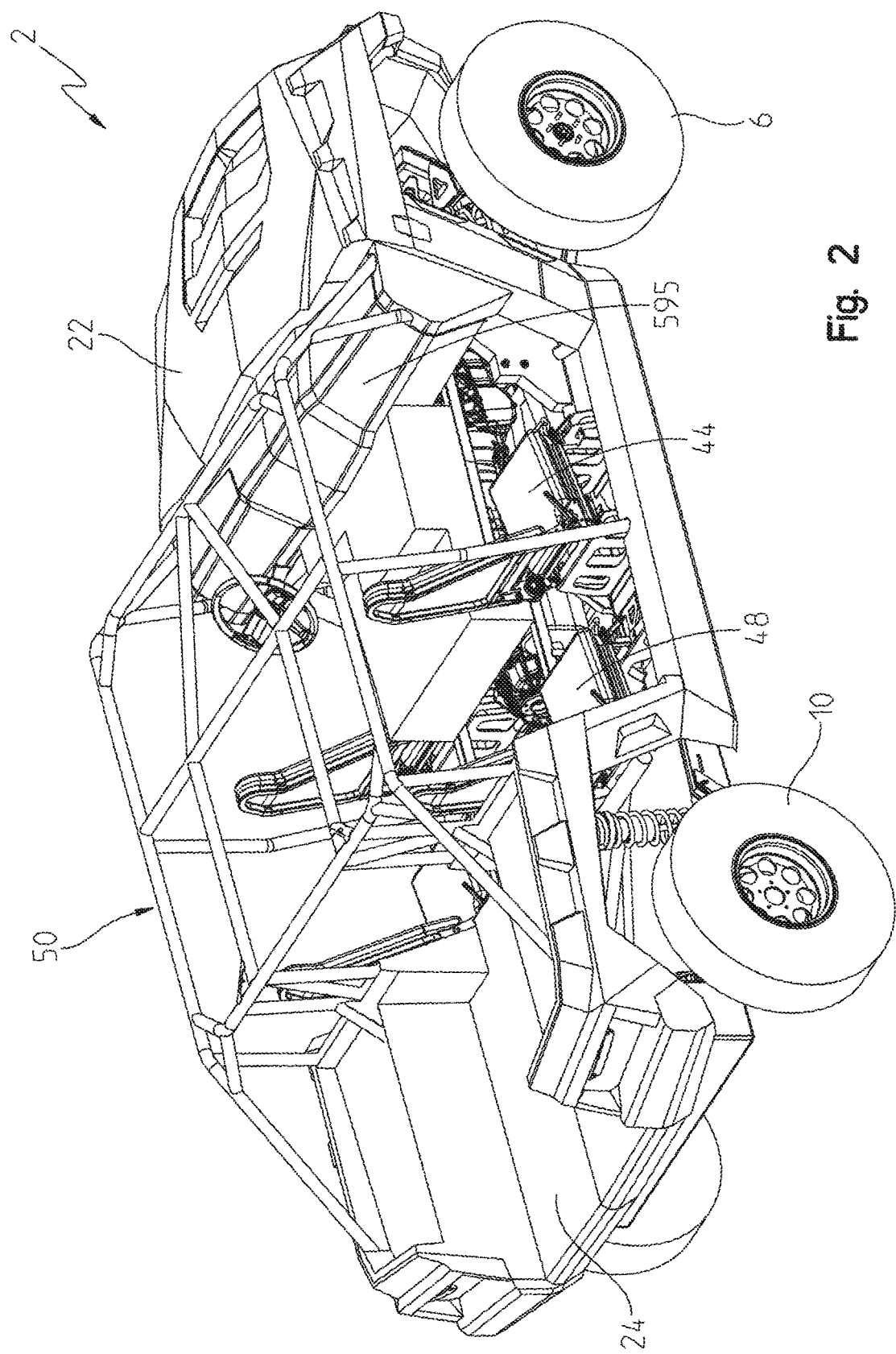
FIG. 2 is a rear right perspective view of the vehicle of FIG. 1.
Figure 39:
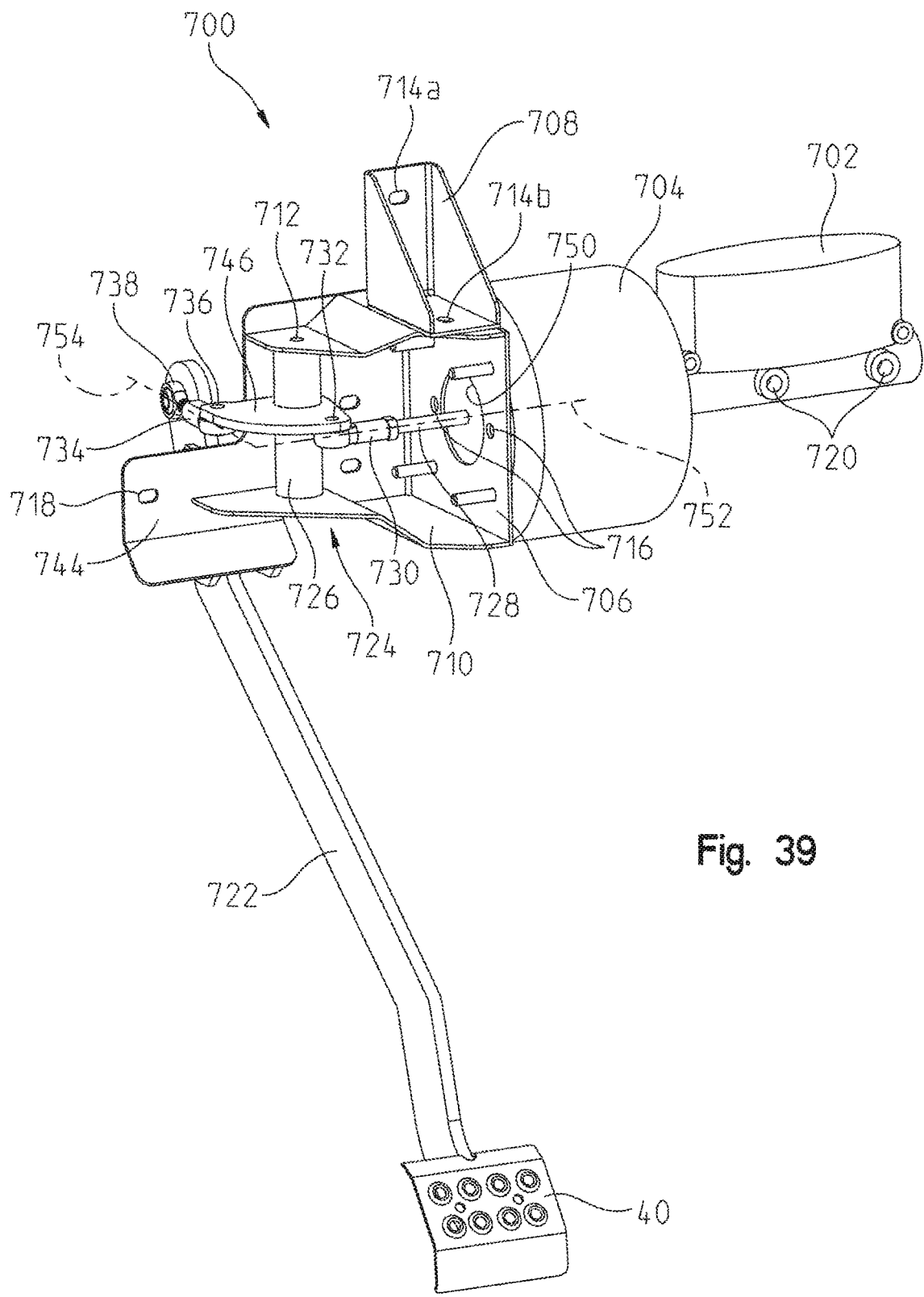
FIG. 39 is a rear perspective view of a brake assembly.
Figure 40:
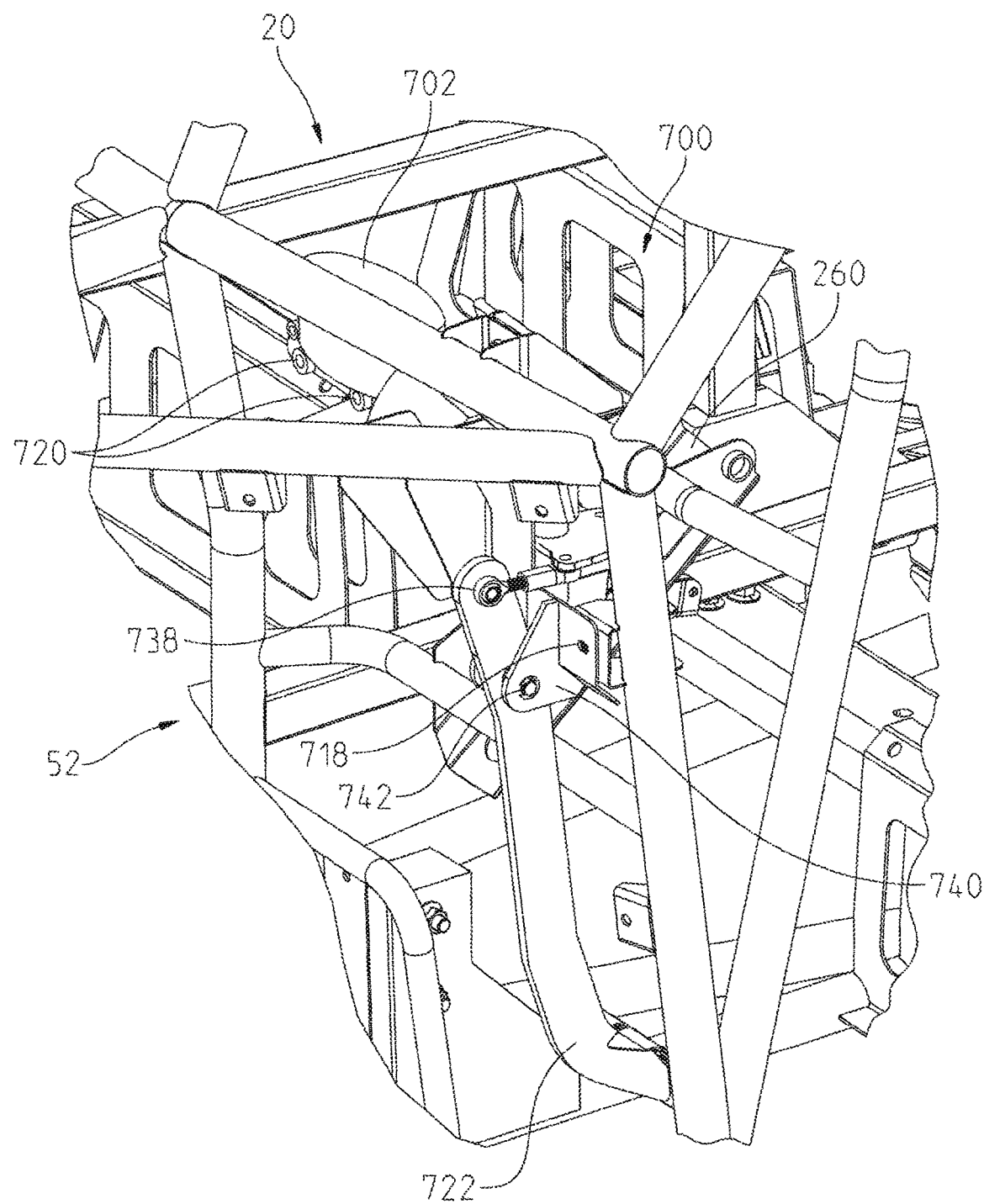
FIG. 40 is a front perspective view of the brake assembly of FIG. 39.
Figure 41:
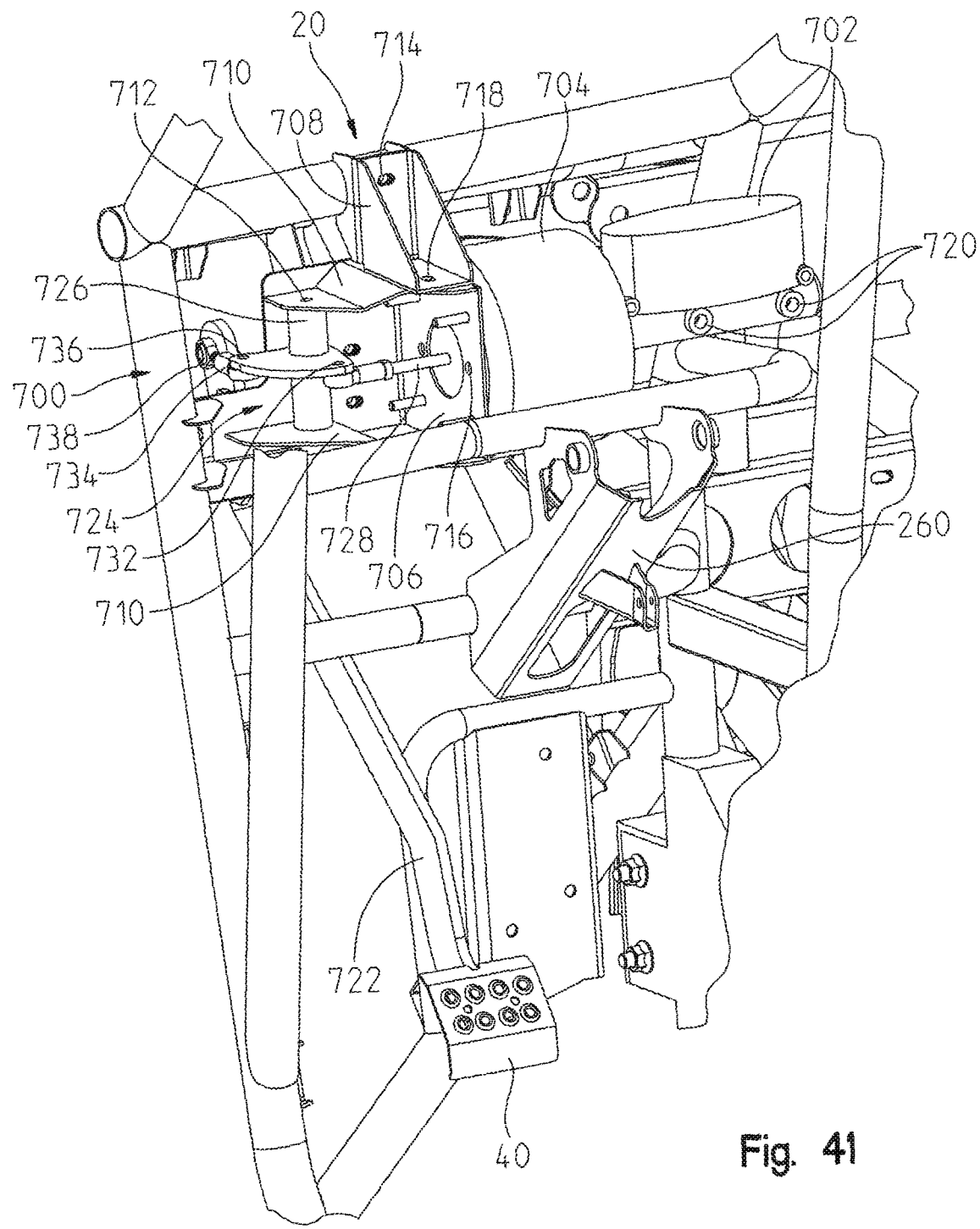
FIG. 41 is a rear perspective view of the brake assembly of FIG. 39 coupled to the front section of the frame.

Referring to FIGS. 39-41, brake assembly 700 is disclosed. Brake assembly 700 includes a master cylinder 702, a brake booster 704, a linkage assembly 724, a lever arm 722, and brake pedal 40. Brake assembly 700 is positioned above channel 260 for steering assembly 650 and is coupled to frame 20, as shown in FIG. 41. Additionally, brake assembly 700 is housed within a dashboard 595 of operator area 30 (FIGS. 1-3). A portion of brake assembly 700, such as lever arm 722 and pedal 40, extend below dashboard 595 and into operator cab 30 to provide access thereto for the operator. By housing brake assembly 700 within and under dashboard 595, front section 52 of frame 20 has additional space for other components of vehicle 2, such as front wheels 6, front suspension 370, and steering assembly 650.

As is apparent from FIGS. 39-41, master cylinder 702 extends laterally from brake booster 704. In particular, master cylinder 702 extends inwardly toward the centerline of vehicle 2. As such, master cylinder 702 does not extend in a forward direction from brake booster 704, but rather, is turned 90 degrees in order to extend laterally. Illustratively, master cylinder 702 is generally perpendicular to the centerline of vehicle 2. By positioning master cylinder 702 to the side of brake booster 704, rather than forward of booster 704, front section 52 of frame 20 has additional space for supporting additional components of vehicle 2. Master cylinder 702 is coupled to ports 720 with hoses (not shown) to allow fluid, for example hydraulic fluid, to flow to and from master cylinder 702 during operation of brake assembly 700.

Brake booster 704 is positioned intermediate master cylinder 702 and linkage assembly 724 and is operably coupled to both master cylinder 702 and linkage assembly 724. As shown in FIG. 39, brake booster is coupled to bracket 706 with conventional fasteners (not shown) that extend through apertures 716. Brake booster 704 includes an input shaft 728, which extends through an opening 750 of bracket 706, and is operably coupled to linkage assembly 724. A braking force is transmitted from the operator to brake booster 704 via linkage assembly 724 and input shaft 728. To facilitate deceleration and stopping of vehicle 2, brake booster 704 receives an input braking force from input shaft 728 and increases the braking force transmitted from master cylinder 702 to the brake calipers at wheels 6, 10.

Bracket 706 is coupled to frame 20 via extensions 708, 710, 744. As shown in FIGS. 39-41, extension 708 includes an aperture 714*a*, which receives a conventional fastener, for example a bolt, for coupling bracket 706 to frame 20. Similarly, extension 710 may include an aperture (not shown) for a conventional fastener in order to further secure bracket 706 to frame 20. Extension 744 includes an aperture 718 which secures bracket 706 to frame 20. Extensions 708, 710, 744 may be separate from bracket 706 and coupled thereto with fasteners, which are received through apertures, for example an aperture 714*b* on extension 708. Alternatively, extensions 708, 710, 744 may be integrally formed with bracket 706.

Bracket 706 also houses linkage assembly 724, which includes a first link 730, a second link 734, a pivot plate 746, and a support member 726. Support member 726 may be coupled to extensions 708, 710 with conventional fasteners (not shown). For example, as shown in FIG. 39, a conventional fastener may be received through aperture 712 on extension 708 in order to couple bracket 706 to support member 726.

Pivot plate 746 is pivotably coupled to support member 726. Pivot plate 746 also includes an aperture 732 for coupling with first link 730, and an aperture 736 for coupling with second link 734. In particular, first link 730 is positioned below pivot plate 746 and is coupled to input shaft 728 of brake booster 704. Additionally, second link 734 is positioned below pivot plate 746 and is coupled to lever arm 722 through fastener 738. As such, pivot plate 746 moves relative to support member 726 in response to pivotal motion from first link 730 and second link 734. As is detailed further herein and shown best in FIG. 39, first link 730 moves along a line 752 in a generally lateral motion and second link 734 moves along a line 754 in a generally fore and aft motion. Therefore, pivot plate 746 facilitates motion in at least two perpendicular directions.

Second link 734 is coupled to lever arm 722 through fastener 738. Lever arm 722 extends below bracket 706 and under dashboard 595 (FIGS. 1-3) and is coupled to brake pedal 40. Lever arm 722 has as curved or bent shape which allows lever arm 722 to extend below bracket 706 and dashboard 595.

In operation, when the operator depresses pedal 40, movement in lever arm 722 is transmitted to second link 734. Second link moves along line 754, which causes pivot plate 746 to rotate relative to support member 726. The rotational movement of pivot plate 746 causes first link 730 to move along line 752, which is generally perpendicular to line 754. The movement of first link 730 moves input shaft 728 relative to brake booster 704. Input shaft 728 engages brake booster 704 in order increase the braking force from master cylinder 702. Through ports 720, master cylinder 702 transmits a braking force to the brake calipers to slow the rolling movement of front wheels 6 and rear wheels 10.

Similar to steering assembly 650, an alternative embodiment of brake assembly 700 also may be operated electronically by wires, thereby eliminating various mechanical components and connections. A brake-by-wire arrangement also may allow vehicle 2 to be operated and controlled remotely.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
a frame extending along a centerline of the utility vehicle and having a front section, a midsection, and a rear section, the frame defining a cab rearward of the front section;
a plurality of ground engaging members operably coupled to the frame;
an engine supported by the frame along the centerline;
a drive shaft spaced apart from the engine;
a transfer case operably coupled to the drive shaft and supported by the front section of the frame; and
a front differential operably coupled to the transfer case and supported by the frame, the differential being positioned along the centerline.

2. The utility vehicle of claim 1, wherein the drive shaft is a front drive shaft including a rear end positioned rearward of the engine and a front end positioned forward of the engine.

3. The utility vehicle of claim 2, further comprising:
a transmission operably coupled to the engine;
a rear drive shaft operably coupled to the transmission and spaced apart from the front drive shaft; and
a rear differential operably coupled to the rear drive shaft and extending along the centerline of the utility vehicle.

4. The utility vehicle of claim 3, further comprising a rear transfer case operably coupled to the transmission, the rear drive shaft, and the front drive shaft.

5. The utility vehicle of claim 1, wherein an inner end of the transfer case is positioned at the centerline of the utility vehicle and an outer end of the transfer case extends laterally outward from the centerline toward the front end of the drive shaft.

6. The utility vehicle of claim 1, wherein the transfer case transmits an output from the drive shaft to an input of the front differential.

7. The utility vehicle of claim 1, wherein the frame is configured to support more than one type of the front differential.

8. The utility vehicle of claim 1, wherein the front differential is configured for approximately 7,000 lb-ft of torque.

9. A utility vehicle, comprising:
a frame extending along a centerline of the utility vehicle;
a plurality of ground engaging members operably coupled to the frame;
a front suspension assembly operably coupled to a portion of the plurality of ground engaging members; and
a drivetrain assembly supported by the frame and including:
an engine supported by the frame;
a drive shaft off-center from the centerline, the drive shaft having an input end operably coupled to the engine and an output end;

a differential positioned along the centerline and having an input end operably coupled to the drive shaft and an output end operably coupled to the ground engaging members; and a transfer case operably coupled to the differential, the transfer case and the differential being positioned within an envelope of the front suspension assembly.

10. The utility vehicle of claim 9, wherein the engine is positioned along the centerline and the drive shaft is positioned laterally outward from a side of the engine.

11. The utility vehicle of claim 9, wherein the transfer case is supported at a front portion of the frame and extends outward from the centerline toward the drive shaft.

12. The utility vehicle of claim 9, wherein the differential extends below a lower plane of the envelope of the front suspension assembly.

13. The utility vehicle of claim 9, wherein the frame includes a frame member coupled to a suspension mount for supporting the front suspension assembly and a transfer case mount for supporting the transfer case.

14. The utility vehicle of claim 13, wherein the transfer case extends laterally outward beyond the suspension mount.

15. The utility vehicle of claim 9, wherein the front suspension assembly includes at least a first control arm and a shock absorber, and at least a portion of the shock absorber is longitudinally forward of the transfer case.

16. The utility vehicle of claim 15, wherein the shock absorber is longitudinally intermediate the differential and the transfer case.

17. The utility vehicle of claim 15, wherein the first control arm includes a front leg and a rear leg, and the differential and the transfer case are positioned longitudinally intermediate the front and rear legs.

18. The utility vehicle of claim 15, wherein the front suspension further includes a second control arm, and the second control arm is longitudinally forward of the transfer case.

19. The utility vehicle of claim 18, wherein the second control is longitudinally forward of at least a portion of the differential.

20. A utility vehicle, comprising:
a frame extending along a centerline of the utility vehicle and having a front section, a midsection, and a rear section, the frame defining a cab rearward of the front section;
a plurality of ground engaging members operably coupled to the frame;
a front suspension assembly operably coupled to a portion of the ground engaging members;
a steering assembly operable coupled to the portion of the ground engaging members and comprising at least a steering arm;
an engine supported by the frame along the centerline at a position generally forward of the rear section;
a drive shaft spaced apart from the engine;
a transfer case operably coupled to the drive shaft and supported by the front section of the frame; and
a front differential operably coupled to the transfer case and supported by the frame, the differential being positioned along the centerline, wherein the steering arm is positioned forward of the front differential.

21. The utility vehicle of claim 20, wherein the steering assembly further comprises a power steering unit, and the power steering unit is positioned within an envelope of the front suspension assembly.

22. The utility vehicle of claim 21, wherein the front suspension assembly includes lower control arms, upper control arms, and shock absorbers, and the power steering unit is positioned generally along the centerline and vertically intermediate the upper and lower control arms.

23. The utility vehicle of claim 22, wherein the power steering unit and the front differential are positioned forward of the shock absorbers.

24. The utility vehicle of claim 22, wherein the steering assembly further comprises a gearbox, and the gearbox and the power steering unit are positioned forward of the shock absorbers.

25. The utility vehicle of claim 22, wherein each of the lower control arms includes a front leg and a rear leg, and the differential and the transfer case are positioned longitudinally intermediate the front and rear legs.

* * * * *